US011388461B2

(12) United States Patent
Britt et al.

(10) Patent No.: US 11,388,461 B2
(45) Date of Patent: Jul. 12, 2022

(54) METHODS AND APPARATUS FOR PROVIDING VIRTUAL CONTENT OVER A NETWORK

(71) Applicant: Time Warner Cable Enterprises LLC, St. Louis, MO (US)

(72) Inventors: Glenn Britt, St. Louis, MO (US); Michael L. LaJoie, Treasure Island, FL (US)

(73) Assignee: TIME WARNER CABLE ENTERPRISES LLC, St. Louis, MO (US)

( * ) Notice: Subject to any disclaimer, the term of this patent is extended or adjusted under 35 U.S.C. 154(b) by 54 days.

(21) Appl. No.: 16/186,269

(22) Filed: Nov. 9, 2018

(65) Prior Publication Data

US 2019/0149864 A1 May 16, 2019

Related U.S. Application Data

(60) Division of application No. 13/773,477, filed on Feb. 21, 2013, now Pat. No. 10,129,576, which is a
(Continued)

(51) Int. Cl.
*H04N 21/254* (2011.01)
*H04N 21/472* (2011.01)
(Continued)

(52) U.S. Cl.
CPC ....... *H04N 21/2541* (2013.01); *H04N 7/1675* (2013.01); *H04N 7/17318* (2013.01);
(Continued)

(58) Field of Classification Search
CPC ............ H04N 21/222; H04N 21/2223; H04N 21/2225; H04N 21/2312; H04N 21/232; H04N 21/2541; H04N 21/26291
(Continued)

(56) References Cited

U.S. PATENT DOCUMENTS 3,388,376 A 6/1968 Magee
4,355,415 A 10/1982 George et al.
(Continued)

FOREIGN PATENT DOCUMENTS

CA 2376550 A1 12/2000
CA 2438497 A1 8/2002
(Continued)

OTHER PUBLICATIONS

3 Point Digital to Showcase Revolutionary Video-On-Demand at Streaming Media West '99, http://www.vsoftcom/press 1999nhtm, Dec. 3, 1999.
(Continued)

*Primary Examiner* — Dominic D Saltarelli
(74) *Attorney, Agent, or Firm* — Gazdzinski & Associates, PC

(57) ABSTRACT

Methods and apparatus for selecting, purchasing and delivering content to users of a network so that the user has "virtual" ownership of and access to the content, thereby obviating the need for physical media (e.g., DVDs or CDs). In an exemplary embodiment, the network comprises a hybrid fiber coax (HFC) network, and on-demand (OD) sessions or broadcast modes are used to deliver the virtual content stored at the head-end (or hub site) to the requesting owner. The purchased content is associated with one or more users when stored, thereby providing the owner(s) unlimited access thereto, without the costs and effort associated with renting/purchasing and maintaining DVDs. The content may also comprise new release content, which would otherwise not be available over the network at that time but for the purchase and delivery mechanisms of the invention. Various other complementary features for enhancing the user's virtual ownership experience are also disclosed.

20 Claims, 19 Drawing Sheets

Related U.S. Application Data continuation of application No. 13/400,524, filed on Feb. 20, 2012, now Pat. No. 9,021,535, which is a continuation of application No. 12/764,761, filed on Apr. 21, 2010, now Pat. No. 8,122,479, which is a continuation of application No. 11/811,953, filed on Jun. 11, 2007, now Pat. No. 8,024,762.

(60) Provisional application No. 60/813,479, filed on Jun. 13, 2006.

(51) Int. Cl.
*H04N 21/478* (2011.01)
*H04N 21/482* (2011.01)
*H04N 21/643* (2011.01)
*H04N 7/167* (2011.01)
*H04N 7/173* (2011.01)
*H04N 21/4788* (2011.01)

(52) U.S. Cl.
CPC ..... *H04N 7/17336* (2013.01); *H04N 21/4788* (2013.01); *H04N 21/47202* (2013.01); *H04N 21/482* (2013.01); *H04N 21/64322* (2013.01)

(58) Field of Classification Search
USPC .............................. 725/87, 93, 105, 115, 116
See application file for complete search history.

(56) References Cited

U.S. PATENT DOCUMENTS

| | | |
|---|---|---|
| 4,384,610 A | 5/1983 | Cook et al. |
| 4,534,056 A | 8/1985 | Feilchenfeld et al. |
| 4,546,382 A | 10/1985 | McKenna et al. |
| 4,577,177 A | 3/1986 | Marubashi |
| 4,602,279 A | 7/1986 | Freeman |
| 4,694,490 A | 9/1987 | Harvey et al. |
| 4,696,578 A | 9/1987 | Mansuria et al. |
| 4,708,224 A | 11/1987 | Schrooder |
| 4,749,062 A | 6/1988 | Tsuji et al. |
| 4,902,732 A | 2/1990 | Itoh et al. |
| 4,905,080 A | 2/1990 | Watanabe et al. |
| 4,908,707 A | 3/1990 | Kinghorn |
| 4,930,120 A | 5/1990 | Baxter et al. |
| 4,930,158 A | 5/1990 | Vogel |
| 4,959,720 A | 9/1990 | Duffield et al. |
| 4,975,909 A | 12/1990 | Masson et al. |
| 4,977,455 A | 12/1990 | Young |
| 4,979,593 A | 12/1990 | Watanabe et al. |
| 4,995,479 A | 2/1991 | Fujiwara et al. |
| 5,042,620 A | 8/1991 | Yoneda et al. |
| 5,047,867 A | 9/1991 | Strubbe et al. |
| 5,056,629 A | 10/1991 | Tsuji et al. |
| 5,086,450 A | 2/1992 | Kitagawa et al. |
| 5,155,591 A | 10/1992 | Wachob |
| 5,159,163 A | 10/1992 | Bahjat et al. |
| 5,172,413 A | 12/1992 | Bradley et al. |
| 5,200,583 A | 4/1993 | Kupersmith et al. |
| 5,200,822 A | 4/1993 | Bronfin et al. |
| 5,253,066 A | 10/1993 | Vogel et al. |
| 5,255,341 A | 10/1993 | Nakajima |
| 5,285,272 A | 2/1994 | Bradley et al. |
| 5,287,266 A | 2/1994 | Malec et al. |
| 5,290,710 A | 3/1994 | Haj-Ali-Ahmadi et al. |
| 5,295,064 A | 3/1994 | Malec et al. |
| 5,335,277 A | 8/1994 | Harvey et al. |
| 5,357,276 A | 10/1994 | Banker et al. |
| 5,371,532 A | 12/1994 | Gelman et al. |
| 5,371,551 A | 12/1994 | Logan et al. |
| 5,373,315 A | 12/1994 | Dufresne et al. |
| 5,394,182 A | 2/1995 | Klappert et al. |
| 5,412,720 A | 5/1995 | Hoarty |
| 5,414,455 A | 5/1995 | Hooper et al. |
| 5,442,389 A | 8/1995 | Blahut et al. |
| 5,461,415 A | 10/1995 | Wolf et al. |
| 5,463,209 A | 10/1995 | Figh et al. |
| 5,479,266 A | 12/1995 | Young et al. |
| 5,479,268 A | 12/1995 | Young et al. |
| 5,481,294 A | 1/1996 | Thomas et al. |
| 5,485,897 A | 1/1996 | Matsumoto et al. |
| 5,497,185 A | 3/1996 | Dufresne et al. |
| 5,512,934 A | 4/1996 | Kochanski |
| 5,515,510 A | 5/1996 | Kikinis |
| 5,517,257 A | 5/1996 | Dunn et al. |
| 5,524,195 A | 6/1996 | Clanton, III et al. |
| 5,528,282 A | 6/1996 | Voeten et al. |
| 5,528,284 A | 6/1996 | Iwami et al. |
| 5,534,911 A | 7/1996 | Levitan |
| 5,535,206 A | 7/1996 | Bestler et al. |
| 5,541,738 A | 7/1996 | Mankovitz |
| 5,551,532 A | 9/1996 | Kupersmith |
| 5,583,561 A | 12/1996 | Baker et al. |
| 5,583,563 A | 12/1996 | Wanderscheid et al. |
| 5,585,838 A | 12/1996 | Lawler et al. |
| 5,589,892 A | 12/1996 | Knee et al. |
| 5,592,551 A | 1/1997 | Lett et al. |
| 5,600,364 A | 2/1997 | Hendricks et al. |
| 5,606,154 A | 2/1997 | Doigan et al. |
| 5,610,653 A * | 3/1997 | Abecassis .............. A63F 13/10 348/170 |
| 5,619,247 A | 4/1997 | Russo |
| 5,619,249 A | 4/1997 | Billock et al. |
| 5,625,405 A | 4/1997 | Dulac et al. |
| 5,652,615 A | 7/1997 | Bryant et al. |
| 5,657,072 A | 8/1997 | Aristides et al. |
| 5,659,350 A | 8/1997 | Hendricks et al. |
| 5,671,225 A | 9/1997 | Hooper et al. |
| 5,675,647 A | 10/1997 | Garneau et al. |
| 5,682,597 A | 10/1997 | Ganek et al. |
| 5,684,714 A | 11/1997 | Yogeshwar et al. |
| 5,684,963 A | 11/1997 | Clement |
| 5,689,094 A | 11/1997 | Friedli et al. |
| 5,701,383 A | 12/1997 | Russo et al. |
| 5,708,961 A | 1/1998 | Hylton et al. |
| 5,710,970 A | 1/1998 | Walters et al. |
| 5,721,878 A | 2/1998 | Ottesen et al. |
| 5,724,646 A | 3/1998 | Ganek et al. |
| 5,729,280 A | 3/1998 | Inoue et al. |
| 5,729,648 A | 3/1998 | Boyce et al. |
| 5,748,254 A | 5/1998 | Harrison et al. |
| 5,749,443 A | 5/1998 | Romao |
| 5,751,282 A | 5/1998 | Girard et al. |
| 5,758,257 A | 5/1998 | Herz et al. |
| 5,761,607 A | 6/1998 | Gudesen |
| 5,771,354 A | 6/1998 | Crawford |
| 5,771,435 A | 6/1998 | Brown |
| 5,774,170 A | 6/1998 | Hite et al. |
| 5,778,181 A | 7/1998 | Hidary et al. |
| 5,778,187 A | 7/1998 | Monteiro et al. |
| 5,781,228 A | 7/1998 | Sposato |
| 5,793,409 A | 8/1998 | Tetsumura |
| 5,793,971 A | 8/1998 | Fujita et al. |
| 5,794,217 A | 8/1998 | Allen |
| 5,805,154 A | 9/1998 | Brown |
| 5,805,155 A | 9/1998 | Allibhoy et al. |
| 5,805,763 A | 9/1998 | Lawler et al. |
| 5,805,804 A | 9/1998 | Laursen et al. |
| 5,808,608 A | 9/1998 | Young et al. |
| 5,809,204 A | 9/1998 | Young et al. |
| 5,812,642 A | 9/1998 | Leroy |
| 5,815,146 A | 9/1998 | Youden et al. |
| 5,815,148 A | 9/1998 | Tanaka |
| 5,818,438 A | 10/1998 | Howe et al. |
| 5,818,440 A | 10/1998 | Allibhoy et al. |
| 5,818,510 A | 10/1998 | Cobbley et al. |
| 5,819,034 A | 10/1998 | Joseph et al. |
| 5,822,530 A | 10/1998 | Brown |
| 5,826,168 A | 10/1998 | Inoue et al. |
| 5,832,231 A | 11/1998 | Raman et al. |
| 5,835,125 A | 11/1998 | Bhagavath |
| 5,841,468 A | 11/1998 | Wright |
| 5,844,181 A | 12/1998 | Amo et al. |
| 5,844,897 A | 12/1998 | Asamizuya |

(56) References Cited

U.S. PATENT DOCUMENTS

| | | |
|---|---|---|
| 5,847,703 A | 12/1998 | Teicher et al. |
| 5,850,218 A | 12/1998 | LaJoie et al. |
| 5,861,881 A | 1/1999 | Freeman et al. |
| 5,864,176 A | 1/1999 | Babock et al. |
| 5,887,139 A | 3/1999 | Madison, Jr. et al. |
| 5,887,243 A | 3/1999 | Harvey et al. |
| 5,892,535 A | 4/1999 | Allen et al. |
| 5,892,900 A * | 4/1999 | Ginter .................. G06F 21/78 726/26 |
| 5,892,915 A | 4/1999 | Duso et al. |
| 5,896,454 A | 4/1999 | Cookson et al. |
| 5,897,635 A | 4/1999 | Torres et al. |
| 5,909,638 A | 6/1999 | Allen |
| 5,914,945 A | 6/1999 | Abu-Amara et al. |
| 5,917,538 A | 6/1999 | Asamizuya |
| 5,918,222 A | 6/1999 | Fukui et al. |
| 5,918,665 A | 7/1999 | Babcock et al. |
| 5,930,473 A | 7/1999 | Teng et al. |
| 5,930,893 A | 8/1999 | Eaton |
| 5,932,853 A | 8/1999 | Friedli et al. |
| 5,940,370 A | 8/1999 | Curtis et al. |
| 5,955,710 A | 9/1999 | DiFranza |
| 5,956,716 A | 9/1999 | Kenner et al. |
| 5,960,411 A | 9/1999 | Hartman et al. |
| 5,970,206 A | 10/1999 | Yuen et al. |
| 5,974,299 A | 10/1999 | Massetti |
| 5,979,757 A | 11/1999 | Tracy et al. |
| 5,984,051 A | 11/1999 | Morgan et al. |
| 5,991,308 A | 11/1999 | Fuhrmann et al. |
| 5,995,708 A | 11/1999 | Corey |
| 6,002,393 A | 12/1999 | Hite et al. |
| 6,005,603 A | 12/1999 | Flavin |
| 6,005,643 A | 12/1999 | Morimoto et al. |
| 6,006,265 A | 12/1999 | Rangan et al. |
| 6,009,098 A | 12/1999 | Asamizuya |
| 6,011,839 A | 1/2000 | Friedli et al. |
| 6,016,509 A | 1/2000 | Dedrick |
| 6,018,509 A | 1/2000 | Itoh et al. |
| 6,029,045 A | 2/2000 | Picco et al. |
| 6,047,327 A | 4/2000 | Tso et al. |
| 6,052,145 A | 4/2000 | Macrae et al. |
| 6,057,832 A | 5/2000 | Lev et al. |
| 6,058,380 A | 5/2000 | Anderson et al. |
| 6,069,023 A | 5/2000 | Bernier et al. |
| 6,073,160 A | 6/2000 | Grantham et al. |
| 6,073,727 A | 6/2000 | DiFranza et al. |
| 6,078,928 A | 6/2000 | Schnase et al. |
| 6,081,830 A | 6/2000 | Schindler |
| 6,082,500 A | 7/2000 | Amo et al. |
| 6,088,722 A | 7/2000 | Herz et al. |
| 6,091,883 A | 7/2000 | Artigalas et al. |
| 6,092,197 A | 7/2000 | Coueignoux |
| 6,097,431 A | 8/2000 | Anderson et al. |
| 6,112,192 A | 8/2000 | Capek |
| 6,122,647 A | 9/2000 | Horowitz et al. |
| 6,134,532 A | 10/2000 | Lazarus et al. |
| 6,137,793 A | 10/2000 | Gorman et al. |
| 6,144,401 A | 11/2000 | Casement et al. |
| 6,160,989 A | 12/2000 | Hendricks et al. |
| 6,161,142 A | 12/2000 | Wolfe et al. |
| 6,167,188 A | 12/2000 | Young et al. |
| 6,167,432 A | 12/2000 | Jiang |
| 6,169,570 B1 | 1/2001 | Suzuki |
| 6,177,931 B1 | 1/2001 | Alexander et al. |
| 6,181,697 B1 | 1/2001 | Nurenberg et al. |
| 6,182,050 B1 | 1/2001 | Ballard |
| 6,202,008 B1 | 3/2001 | Beckert et al. |
| 6,202,210 B1 | 3/2001 | Ludtke |
| 6,202,799 B1 | 3/2001 | Drop |
| 6,206,142 B1 | 3/2001 | Meacham |
| 6,208,335 B1 | 3/2001 | Gordon et al. |
| 6,216,129 B1 | 4/2001 | Eldering |
| 6,219,710 B1 | 4/2001 | Gray et al. |
| 6,223,160 B1 | 4/2001 | Kostka et al. |
| 6,233,389 B1 | 5/2001 | Barton et al. |
| 6,236,968 B1 | 5/2001 | Kanevsky et al. |
| 6,240,401 B1 | 5/2001 | Oren et al. |
| 6,259,701 B1 | 7/2001 | Shur et al. |
| 6,286,041 B1 | 9/2001 | Collins, III et al. |
| 6,292,624 B1 | 9/2001 | Saib et al. |
| 6,321,257 B1 | 11/2001 | Kotola et al. |
| 6,324,338 B1 | 11/2001 | Wood et al. |
| 6,327,418 B1 | 12/2001 | Barton |
| 6,341,668 B1 | 1/2002 | Fayette et al. |
| 6,343,313 B1 | 1/2002 | Salesky et al. |
| 6,343,647 B2 | 2/2002 | Kim et al. |
| 6,349,797 B1 | 2/2002 | Newville et al. |
| 6,369,840 B1 | 4/2002 | Barnett et al. |
| 6,378,035 B1 | 4/2002 | Parry et al. |
| 6,378,129 B1 | 4/2002 | Zetts |
| 6,397,976 B1 | 6/2002 | Hale et al. |
| 6,421,305 B1 | 7/2002 | Gioscia et al. |
| 6,434,562 B1 | 8/2002 | Pennywitt et al. |
| 6,446,261 B1 | 9/2002 | Rosser |
| RE37,881 E | 10/2002 | Haines |
| 6,460,036 B1 | 10/2002 | Herz |
| 6,463,585 B1 | 10/2002 | Hendricks et al. |
| 6,466,232 B1 | 10/2002 | Newell et al. |
| 6,467,089 B1 | 10/2002 | Aust et al. |
| 6,470,378 B1 | 10/2002 | Tracton et al. |
| 6,504,571 B1 | 1/2003 | Narayanaswami et al. |
| 6,519,062 B1 | 2/2003 | Yoo |
| 6,523,696 B1 | 2/2003 | Saito et al. |
| 6,549,718 B1 | 4/2003 | Grooters et al. |
| 6,553,178 B2 | 4/2003 | Abecassis |
| 6,560,203 B1 | 5/2003 | Beser et al. |
| 6,560,578 B2 | 5/2003 | Eldering |
| 6,567,980 B1 * | 5/2003 | Jain .................. G06F 16/7844 725/61 |
| 6,571,279 B1 | 5/2003 | Herz et al. |
| 6,574,617 B1 | 6/2003 | Immerman et al. |
| 6,578,054 B1 * | 6/2003 | Hopmann ............ G06Q 10/107 707/625 |
| 6,587,835 B1 | 7/2003 | Treyz et al. |
| 6,588,015 B1 | 7/2003 | Eyer et al. |
| 6,591,420 B1 | 7/2003 | McPherson et al. |
| 6,598,228 B2 | 7/2003 | Hejna et al. |
| 6,604,138 B1 | 8/2003 | Virine et al. |
| 6,611,654 B1 | 8/2003 | Shteyn |
| 6,615,039 B1 | 9/2003 | Eldering |
| 6,615,175 B1 | 9/2003 | Gazdzinski |
| 6,615,251 B1 | 9/2003 | Klug et al. |
| 6,622,305 B1 | 9/2003 | Willard |
| 6,640,145 B2 | 10/2003 | Hoffberg et al. |
| 6,647,548 B1 | 11/2003 | Lu et al. |
| 6,651,045 B1 | 11/2003 | Macaulay |
| 6,671,736 B2 | 12/2003 | Virine et al. |
| 6,671,879 B1 | 12/2003 | Schlarb et al. |
| 6,681,393 B1 | 1/2004 | Bauminger et al. |
| 6,687,735 B1 | 2/2004 | Logston et al. |
| 6,694,145 B2 | 2/2004 | Riikonen et al. |
| 6,704,930 B1 | 3/2004 | Eldering et al. |
| 6,718,551 B1 | 4/2004 | Swix et al. |
| 6,738,978 B1 | 5/2004 | Hendricks et al. |
| 6,741,980 B1 | 5/2004 | Langseth et al. |
| 6,757,796 B1 | 6/2004 | Hofmann |
| 6,760,918 B2 | 7/2004 | Rodriguez et al. |
| 6,769,127 B1 | 7/2004 | Bonomi et al. |
| 6,771,290 B1 | 8/2004 | Hoyle |
| 6,772,434 B1 | 8/2004 | Godwin |
| 6,774,926 B1 * | 8/2004 | Ellis .................. H04N 5/44543 348/14.01 |
| 6,775,778 B1 | 8/2004 | Laczko, Sr. et al. |
| 6,782,550 B1 | 8/2004 | Cao |
| 6,785,704 B1 | 8/2004 | McCanne |
| 6,788,676 B2 | 9/2004 | Partanen et al. |
| 6,792,577 B1 | 9/2004 | Kimoto |
| 6,801,792 B1 | 10/2004 | Schuster et al. |
| 6,802,077 B1 | 10/2004 | Schlarb |
| 6,810,528 B1 | 10/2004 | Chatani |
| 6,813,776 B2 | 11/2004 | Chernock et al. |
| 6,817,028 B1 | 11/2004 | Jerding et al. |
| 6,826,267 B2 | 11/2004 | Daum et al. |
| 6,832,259 B2 | 12/2004 | Hymel et al. |

(56) References Cited

U.S. PATENT DOCUMENTS

| | | | |
|---|---|---|---|
| 6,851,063 B1 | 2/2005 | Boyle et al. |
| 6,853,731 B1 | 2/2005 | Boyle et al. |
| 6,857,132 B1 | 2/2005 | Rakib et al. |
| 6,859,845 B2 | 2/2005 | Mate |
| 6,898,762 B2 | 5/2005 | Ellis et al. |
| 6,909,726 B1 | 6/2005 | Sheeran |
| 6,909,837 B1 | 6/2005 | Unger |
| 6,910,064 B1 | 6/2005 | Astarabadi et al. |
| 6,914,446 B1 | 7/2005 | Tustaniwskyj et al. |
| 6,915,528 B1 | 7/2005 | McKenna, Jr. |
| 6,925,257 B2 | 8/2005 | Yoo |
| 6,934,880 B2 | 8/2005 | Hofner |
| 6,944,150 B1 | 9/2005 | McConnell et al. |
| 6,959,288 B1 | 10/2005 | Medina et al. |
| 6,975,850 B1 | 12/2005 | Hurtta et al. |
| 6,978,370 B1 | 12/2005 | Kocher |
| 6,990,312 B1 | 1/2006 | Gioscia et al. |
| 6,990,680 B1 | 1/2006 | Wugofski |
| 7,004,243 B1 | 2/2006 | Babcock et al. |
| 7,006,881 B1 | 2/2006 | Hoffberg et al. |
| 7,009,972 B2 | 3/2006 | Maher et al. |
| 7,016,376 B2 | 3/2006 | Goldenberg et al. |
| 7,017,179 B1 | 3/2006 | Asamoto et al. |
| 7,020,892 B2 | 3/2006 | Levesque et al. |
| 7,024,466 B2 | 4/2006 | Russell et al. |
| 7,024,678 B2 | 4/2006 | Gordon et al. |
| 7,025,209 B2 | 4/2006 | Hawkins |
| 7,027,460 B2 | 4/2006 | Iyer et al. |
| 7,028,009 B2 | 4/2006 | Wang et al. |
| 7,028,329 B1 | 4/2006 | Mizutani |
| 7,039,048 B1 | 5/2006 | Monta et al. |
| 7,039,928 B2 | 5/2006 | Kamada et al. |
| 7,054,843 B2 | 5/2006 | Charas |
| 7,054,902 B2 | 5/2006 | Toporek et al. |
| 7,058,685 B1 | 6/2006 | Van et al. |
| 7,058,810 B2 | 6/2006 | Kumazawa et al. |
| 7,068,639 B1 | 6/2006 | Varma et al. |
| 7,069,577 B2 | 6/2006 | Geile et al. |
| 7,073,189 B2 | 7/2006 | McElhatten et al. |
| 7,073,193 B2 | 7/2006 | Marsh |
| 7,075,945 B2 | 7/2006 | Arsenault et al. |
| 7,080,397 B2 | 7/2006 | Cochran et al. |
| 7,080,400 B1 | 7/2006 | Navar |
| 7,099,308 B2 | 8/2006 | Merrill et al. |
| 7,100,183 B2 | 8/2006 | Kunkel et al. |
| 7,103,905 B2 * | 9/2006 | Novak | H04N 7/17318 348/E7.071 |
| 7,103,906 B1 | 9/2006 | Katz et al. |
| 7,106,382 B2 | 9/2006 | Shiotsu |
| 7,109,848 B2 | 9/2006 | Schybergson |
| 7,124,195 B2 | 10/2006 | Roach et al. |
| 7,136,573 B2 | 11/2006 | Kikuchi et al. |
| 7,136,853 B1 | 11/2006 | Kohda et al. |
| 7,137,728 B2 | 11/2006 | Witham et al. |
| 7,143,431 B1 | 11/2006 | Eager et al. |
| 7,146,627 B1 | 12/2006 | Ismail et al. |
| 7,146,630 B2 | 12/2006 | Dravida et al. |
| 7,149,772 B1 | 12/2006 | Kalavade |
| 7,152,237 B2 | 12/2006 | Flickinger et al. |
| 7,155,226 B1 | 12/2006 | Oh et al. |
| 7,155,508 B2 | 12/2006 | Sankuratripati et al. |
| 7,159,235 B2 | 1/2007 | Son et al. |
| 7,171,485 B2 | 1/2007 | Roach et al. |
| 7,174,126 B2 | 2/2007 | McElhatten et al. |
| 7,174,127 B2 | 2/2007 | Otten et al. |
| 7,174,385 B2 | 2/2007 | Li |
| 7,184,526 B1 | 2/2007 | Cook |
| 7,191,244 B2 | 3/2007 | Jennings et al. |
| 7,194,001 B2 | 3/2007 | Leatherbury et al. |
| 7,194,009 B2 | 3/2007 | Eng |
| 7,197,472 B2 | 3/2007 | Conkwright et al. |
| 7,203,185 B1 | 4/2007 | Dhara et al. |
| 7,203,311 B1 | 4/2007 | Kahn et al. |
| 7,209,458 B2 | 4/2007 | Ahvonen et al. |
| 7,209,892 B1 | 4/2007 | Galuten et al. |
| 7,212,543 B1 | 5/2007 | Arwald et al. |
| 7,213,742 B1 | 5/2007 | Birch et al. |
| 7,216,170 B2 | 5/2007 | Ludvig et al. |
| 7,222,078 B2 | 5/2007 | Abelow |
| 7,222,163 B1 | 5/2007 | Girouard et al. |
| 7,228,359 B1 | 6/2007 | Monteiro |
| 7,228,555 B2 | 6/2007 | Schlack |
| 7,231,669 B2 | 6/2007 | Leung et al. |
| 7,233,948 B1 | 6/2007 | Shamoon et al. |
| 7,237,017 B1 | 6/2007 | Pecus et al. |
| 7,237,250 B2 | 6/2007 | Kanojia et al. |
| 7,240,196 B2 | 7/2007 | Cooper et al. |
| 7,242,960 B2 | 7/2007 | Van Rooyen et al. |
| 7,246,150 B1 | 7/2007 | Donoho et al. |
| 7,246,172 B2 | 7/2007 | Yoshiba et al. |
| 7,254,608 B2 | 8/2007 | Yeager et al. |
| 7,257,308 B2 | 8/2007 | Plourde et al. |
| 7,260,564 B1 | 8/2007 | Lynn et al. |
| 7,263,187 B2 | 8/2007 | Pedlow et al. |
| 7,263,188 B2 | 8/2007 | Kohno |
| 7,266,198 B2 | 9/2007 | Medvinsky |
| 7,266,832 B2 | 9/2007 | Miller |
| 7,266,836 B2 | 9/2007 | Anttila et al. |
| 7,269,854 B2 | 9/2007 | Simmons et al. |
| 7,280,737 B2 | 10/2007 | Smith |
| 7,281,261 B2 | 10/2007 | Jaff et al. |
| 7,301,944 B1 | 11/2007 | Redmond |
| 7,305,357 B2 | 12/2007 | Hamilton |
| 7,305,691 B2 | 12/2007 | Cristofalo |
| 7,315,886 B1 | 1/2008 | Meenan et al. |
| 7,317,728 B2 | 1/2008 | Acharya et al. |
| 7,320,134 B1 | 1/2008 | Tomsen et al. |
| 7,321,923 B1 | 1/2008 | Rosenberg et al. |
| 7,325,073 B2 | 1/2008 | Shao et al. |
| 7,327,692 B2 | 2/2008 | Ain et al. |
| 7,330,483 B1 | 2/2008 | Peters, Jr. et al. |
| 7,330,875 B1 | 2/2008 | Parasnis et al. |
| 7,337,147 B2 | 2/2008 | Chen et al. |
| 7,337,459 B2 | 2/2008 | Tsutsui et al. |
| 7,340,510 B1 | 3/2008 | Liskov et al. |
| 7,340,760 B2 | 3/2008 | Wachtfogel et al. |
| 7,346,558 B2 | 3/2008 | Rosenberg |
| 7,346,630 B2 | 3/2008 | Eichstaedt et al. |
| 7,352,775 B2 | 4/2008 | Powell |
| 7,355,980 B2 | 4/2008 | Bauer et al. |
| 7,356,751 B1 | 4/2008 | Levitan |
| 7,360,233 B2 | 4/2008 | Russ et al. |
| 7,363,371 B2 | 4/2008 | Kirby et al. |
| 7,363,643 B2 | 4/2008 | Drake et al. |
| 7,367,043 B2 | 4/2008 | Dudkiewicz et al. |
| 7,369,750 B2 | 5/2008 | Cheng et al. |
| 7,373,594 B1 | 5/2008 | Lopez et al. |
| 7,376,386 B2 | 5/2008 | Phillips et al. |
| 7,383,228 B2 | 6/2008 | Lisanke et al. |
| 7,386,621 B1 | 6/2008 | Hlasny |
| 7,406,099 B2 | 7/2008 | Schlagintweit |
| 7,438,233 B2 | 10/2008 | Leiper |
| 7,441,037 B2 | 10/2008 | Saxena |
| 7,486,869 B2 | 2/2009 | Alexander et al. |
| 7,496,647 B2 | 2/2009 | Karaoguz et al. |
| 7,512,638 B2 * | 3/2009 | Jhaveri | G06F 16/1834 |
| 7,533,376 B2 | 5/2009 | Anwar et al. |
| 7,558,837 B1 | 7/2009 | Denny |
| 7,565,672 B2 * | 7/2009 | Yun | H04N 5/765 386/239 |
| 7,567,262 B1 | 7/2009 | Clemens et al. |
| 7,567,988 B2 | 7/2009 | Wolf et al. |
| 7,577,118 B2 | 8/2009 | Haumonte et al. |
| 7,602,820 B2 | 10/2009 | Helms et al. |
| 7,603,321 B2 | 10/2009 | Gurvey |
| 7,603,529 B1 | 10/2009 | Machardy et al. |
| 7,627,492 B2 | 12/2009 | Nishizawa et al. |
| 7,634,546 B1 | 12/2009 | Strickholm et al. |
| 7,636,792 B1 | 12/2009 | Ho |
| 7,640,581 B1 | 12/2009 | Brenton et al. |
| 7,647,618 B1 | 1/2010 | Hunter et al. |
| 7,653,689 B1 | 1/2010 | Champagne et al. |
| 7,673,004 B1 | 3/2010 | Sherstinsky et al. |
| 7,693,171 B2 | 4/2010 | Gould |

(56) References Cited

U.S. PATENT DOCUMENTS

| | | | |
|---|---|---|---|
| 7,707,644 B2 | 4/2010 | Choi et al. |
| 7,711,605 B1 | 5/2010 | Santeufemia et al. |
| 7,712,125 B2 | 5/2010 | Herigstad et al. |
| 7,720,432 B1 | 5/2010 | Colby et al. |
| 7,721,314 B2 | 5/2010 | Sincaglia et al. |
| 7,730,509 B2 | 6/2010 | Boulet et al. |
| 7,742,074 B2 | 6/2010 | Minatogawa |
| 7,769,629 B1 | 8/2010 | Kriza et al. |
| 7,787,416 B2 | 8/2010 | Gidwani |
| 7,793,334 B2 | 9/2010 | Lewis |
| 7,805,515 B2 | 9/2010 | Riley |
| 7,809,942 B2 | 10/2010 | Baran et al. |
| 7,814,119 B2 * | 10/2010 | Sato ............... G06F 21/6254 707/705 |
| 7,843,876 B2 | 11/2010 | Holt et al. |
| 7,849,491 B2 | 12/2010 | Perlman |
| 7,878,908 B2 | 2/2011 | Sloate et al. |
| 7,900,229 B2 | 3/2011 | Dureau |
| 7,908,626 B2 | 3/2011 | Williamson et al. |
| 7,984,473 B1 | 7/2011 | Casile et al. |
| 7,986,686 B2 | 7/2011 | Nadeau et al. |
| 8,006,262 B2 | 8/2011 | Rodriguez et al. |
| 8,006,273 B2 | 8/2011 | Rodriguez |
| 8,015,583 B2 | 9/2011 | Bates et al. |
| 8,024,762 B2 | 9/2011 | Britt |
| 8,028,322 B2 | 9/2011 | Riedl et al. |
| 8,042,131 B2 | 10/2011 | Flickinger |
| 8,055,585 B2 | 11/2011 | Wu |
| 8,065,703 B2 | 11/2011 | Wilson et al. |
| 8,127,331 B2 | 2/2012 | Heilbron et al. |
| 8,150,757 B1 | 4/2012 | Sieffert et al. |
| 8,181,206 B2 | 5/2012 | Hasek |
| 8,205,226 B2 | 6/2012 | Ko et al. |
| 8,250,034 B2 * | 8/2012 | Manousos ............ H04N 1/2141 707/638 |
| 8,272,020 B2 | 9/2012 | Watson et al. |
| 8,280,982 B2 | 10/2012 | La et al. |
| 8,291,101 B1 * | 10/2012 | Yan ................. H04L 67/1095 709/236 |
| 8,396,055 B2 | 3/2013 | Patel et al. |
| 8,424,048 B1 | 4/2013 | Lyren et al. |
| 8,438,243 B2 | 5/2013 | Lajoie et al. |
| 8,527,602 B1 | 9/2013 | Rasmussen et al. |
| 8,561,113 B2 | 10/2013 | Cansler et al. |
| 8,583,758 B2 | 11/2013 | Casey et al. |
| 8,584,182 B2 | 11/2013 | Berberet et al. |
| 8,848,969 B2 | 9/2014 | Ramsdell et al. |
| 9,215,423 B2 | 12/2015 | Kimble et al. |
| 9,317,241 B2 | 4/2016 | Tranchina |
| 9,325,710 B2 | 4/2016 | Lajoie et al. |
| 9,578,288 B2 | 2/2017 | Chen et al. |
| 9,832,246 B2 | 11/2017 | Lajoie et al. |
| 2001/0001160 A1 | 5/2001 | Shoff et al. |
| 2001/0003194 A1 | 6/2001 | Shimura et al. |
| 2001/0004768 A1 | 6/2001 | Hodge et al. |
| 2001/0013123 A1 | 8/2001 | Freeman et al. |
| 2001/0013173 A1 | 8/2001 | Mertens et al. |
| 2001/0030975 A1 | 10/2001 | Limb et al. |
| 2001/0037223 A1 | 11/2001 | Beery et al. |
| 2001/0049705 A1 | 12/2001 | Murase et al. |
| 2001/0054181 A1 | 12/2001 | Corvin |
| 2002/0003789 A1 | 1/2002 | Kim et al. |
| 2002/0004870 A1 | 1/2002 | Kobayashi |
| 2002/0013940 A1 | 1/2002 | Tsukamoto et al. |
| 2002/0019984 A1 | 2/2002 | Rakib |
| 2002/0026496 A1 | 2/2002 | Boyer et al. |
| 2002/0027883 A1 | 3/2002 | Belaiche |
| 2002/0032754 A1 | 3/2002 | Logston et al. |
| 2002/0038296 A1 | 3/2002 | Margolus et al. |
| 2002/0042921 A1 | 4/2002 | Ellis |
| 2002/0046286 A1 | 4/2002 | Caldwell et al. |
| 2002/0046406 A1 | 4/2002 | Chelehmal et al. |
| 2002/0046407 A1 | 4/2002 | Franco |
| 2002/0049800 A1 | 4/2002 | Kobayashi et al. |
| 2002/0049902 A1 | 4/2002 | Rhodes |
| 2002/0054754 A1 | 5/2002 | Kikuchi et al. |
| 2002/0056118 A1 | 5/2002 | Hunter et al. |
| 2002/0056125 A1 | 5/2002 | Hodge et al. |
| 2002/0056175 A1 | 5/2002 | Magarino et al. |
| 2002/0059619 A1 | 5/2002 | Lebar |
| 2002/0059621 A1 | 5/2002 | Thomas et al. |
| 2002/0059635 A1 | 5/2002 | Hoang |
| 2002/0066033 A1 | 5/2002 | Dobbins et al. |
| 2002/0069404 A1 | 6/2002 | Copeman et al. |
| 2002/0073327 A1 | 6/2002 | Vellandi |
| 2002/0073419 A1 | 6/2002 | Yen et al. |
| 2002/0077984 A1 | 6/2002 | Ireton |
| 2002/0078176 A1 | 6/2002 | Nomura et al. |
| 2002/0078444 A1 | 6/2002 | Krewin et al. |
| 2002/0082858 A1 | 6/2002 | Heddaya et al. |
| 2002/0083456 A1 | 6/2002 | Bates et al. |
| 2002/0085516 A1 | 7/2002 | Bridgelall |
| 2002/0087661 A1 | 7/2002 | Matichuk et al. |
| 2002/0087976 A1 | 7/2002 | Kaplan et al. |
| 2002/0099642 A1 | 7/2002 | Schwankl et al. |
| 2002/0100055 A1 | 7/2002 | Zeidman |
| 2002/0104019 A1 | 8/2002 | Chatani et al. |
| 2002/0104083 A1 | 8/2002 | Hendricks et al. |
| 2002/0104099 A1 * | 8/2002 | Novak .............. H04N 21/4622 725/136 |
| 2002/0112186 A1 | 8/2002 | Ford et al. |
| 2002/0112240 A1 | 8/2002 | Bacso et al. |
| 2002/0120498 A1 | 8/2002 | Gordon et al. |
| 2002/0123928 A1 | 9/2002 | Eldering et al. |
| 2002/0124182 A1 | 9/2002 | Bacso et al. |
| 2002/0138854 A1 | 9/2002 | Desai et al. |
| 2002/0143565 A1 | 10/2002 | Headings et al. |
| 2002/0144262 A1 | 10/2002 | Plotnick et al. |
| 2002/0144263 A1 | 10/2002 | Eldering et al. |
| 2002/0147771 A1 | 10/2002 | Traversat et al. |
| 2002/0147984 A1 | 10/2002 | Tomsen et al. |
| 2002/0151271 A1 | 10/2002 | Tatsuji et al. |
| 2002/0152299 A1 | 10/2002 | Traversat et al. |
| 2002/0152318 A1 * | 10/2002 | Menon .............. H04N 21/2225 709/231 |
| 2002/0152458 A1 | 10/2002 | Eyer et al. |
| 2002/0161835 A1 | 10/2002 | Ball et al. |
| 2002/0166121 A1 | 11/2002 | Rovira |
| 2002/0169961 A1 | 11/2002 | Giles et al. |
| 2002/0174430 A1 | 11/2002 | Ellis et al. |
| 2002/0178445 A1 | 11/2002 | Eldering et al. |
| 2002/0178447 A1 | 11/2002 | Plotnick et al. |
| 2002/0184629 A1 | 12/2002 | Sie et al. |
| 2002/0184634 A1 | 12/2002 | Cooper |
| 2002/0184635 A1 | 12/2002 | Istvan |
| 2002/0188689 A1 | 12/2002 | Michael |
| 2002/0188744 A1 | 12/2002 | Mani |
| 2002/0188869 A1 | 12/2002 | Patrick |
| 2002/0191950 A1 | 12/2002 | Wang |
| 2002/0194498 A1 | 12/2002 | Blight et al. |
| 2002/0196940 A1 | 12/2002 | Isaacson et al. |
| 2003/0004810 A1 | 1/2003 | Eldering |
| 2003/0005447 A1 | 1/2003 | Rodriguez |
| 2003/0005453 A1 | 1/2003 | Rodriguez et al. |
| 2003/0018977 A1 | 1/2003 | McKenna |
| 2003/0022990 A1 | 1/2003 | Hirota et al. |
| 2003/0023690 A1 | 1/2003 | Lohtia |
| 2003/0028893 A1 | 2/2003 | H. Addington et al. |
| 2003/0030751 A1 | 2/2003 | Lupulescu et al. |
| 2003/0033199 A1 | 2/2003 | Coleman |
| 2003/0037330 A1 | 2/2003 | Makofka |
| 2003/0037335 A1 | 2/2003 | Gatto et al. |
| 2003/0037338 A1 | 2/2003 | Suzuki |
| 2003/0046689 A1 * | 3/2003 | Gaos ................. H04N 21/454 725/34 |
| 2003/0049021 A1 | 3/2003 | Kamieniecki |
| 2003/0053476 A1 | 3/2003 | Sorenson et al. |
| 2003/0056217 A1 | 3/2003 | Brooks |
| 2003/0058887 A1 | 3/2003 | Dworkin et al. |
| 2003/0070052 A1 | 4/2003 | Lai |
| 2003/0074661 A1 | 4/2003 | Krapf et al. |
| 2003/0093311 A1 | 5/2003 | Knowlson |
| 2003/0093515 A1 | 5/2003 | Kauffman |
| 2003/0093784 A1 | 5/2003 | Dimitrova et al. |

(56) References Cited

U.S. PATENT DOCUMENTS

| | | |
|---|---|---|
| 2003/0093790 A1 | 5/2003 | Logan et al. |
| 2003/0093792 A1 | 5/2003 | Labeeb et al. |
| 2003/0093806 A1 | 5/2003 | Dureau et al. |
| 2003/0097574 A1 | 5/2003 | Upton |
| 2003/0101449 A1 | 5/2003 | Bentolila et al. |
| 2003/0101451 A1 | 5/2003 | Bentolila et al. |
| 2003/0101454 A1 | 5/2003 | Ozer et al. |
| 2003/0110499 A1 | 6/2003 | Knudson et al. |
| 2003/0110503 A1 | 6/2003 | Perkes |
| 2003/0115267 A1 | 6/2003 | Hinton et al. |
| 2003/0115601 A1 | 6/2003 | Palazzo et al. |
| 2003/0130008 A1 | 7/2003 | Rajaniemi et al. |
| 2003/0135513 A1 | 7/2003 | Quinn et al. |
| 2003/0143984 A1 | 7/2003 | Umeda |
| 2003/0145323 A1 | 7/2003 | Hendricks et al. |
| 2003/0149581 A1 | 8/2003 | Chaudhri et al. |
| 2003/0149884 A1 | 8/2003 | Hernandez et al. |
| 2003/0149975 A1 | 8/2003 | Eldering et al. |
| 2003/0149988 A1 | 8/2003 | Ellis et al. |
| 2003/0149993 A1 | 8/2003 | Son et al. |
| 2003/0151621 A1 | 8/2003 | McEvilly et al. |
| 2003/0163832 A1 | 8/2003 | Tsuria et al. |
| 2003/0165241 A1 | 9/2003 | Fransdonk |
| 2003/0166401 A1 | 9/2003 | Combes et al. |
| 2003/0177490 A1 | 9/2003 | Hoshino et al. |
| 2003/0182551 A1 | 9/2003 | Frantz et al. |
| 2003/0188023 A1 | 10/2003 | Grecco et al. |
| 2003/0208768 A1 | 11/2003 | Urdang et al. |
| 2003/0217137 A1 | 11/2003 | Roese et al. |
| 2003/0217365 A1 | 11/2003 | Caputo |
| 2003/0223450 A1 | 12/2003 | Bender et al. |
| 2003/0225777 A1 | 12/2003 | Marsh |
| 2003/0226150 A1 | 12/2003 | Berberet et al. |
| 2003/0229898 A1 | 12/2003 | Babu et al. |
| 2003/0229900 A1 | 12/2003 | Reisman |
| 2003/0231661 A1 | 12/2003 | Depietro et al. |
| 2003/0236839 A1 | 12/2003 | Demsky et al. |
| 2003/0237090 A1 | 12/2003 | Boston et al. |
| 2004/0006694 A1 | 1/2004 | Heelan et al. |
| 2004/0015608 A1 | 1/2004 | Ellis et al. |
| 2004/0015989 A1 | 1/2004 | Kaizu et al. |
| 2004/0025181 A1 | 2/2004 | Addington et al. |
| 2004/0025190 A1 | 2/2004 | McCalla et al. |
| 2004/0034873 A1 | 2/2004 | Zenoni |
| 2004/0034877 A1 | 2/2004 | Nogues |
| 2004/0039911 A1 | 2/2004 | Oka et al. |
| 2004/0045032 A1 | 3/2004 | Cummings et al. |
| 2004/0045035 A1 | 3/2004 | Cummings et al. |
| 2004/0045037 A1 | 3/2004 | Cummings et al. |
| 2004/0047599 A1 | 3/2004 | Grzeczkowski |
| 2004/0049694 A1 | 3/2004 | Candelore |
| 2004/0060076 A1 | 3/2004 | Song |
| 2004/0078371 A1 | 4/2004 | Worrall et al. |
| 2004/0078809 A1 | 4/2004 | Drazin |
| 2004/0093394 A1 | 5/2004 | Weber et al. |
| 2004/0103120 A1 | 5/2004 | Fickle et al. |
| 2004/0103429 A1 | 5/2004 | Carlucci et al. |
| 2004/0103479 A1 | 6/2004 | Mossbeck et al. |
| 2004/0104842 A1 | 6/2004 | Drury et al. |
| 2004/0113936 A1 | 6/2004 | Dempski |
| 2004/0114539 A1 | 6/2004 | Beshai et al. |
| 2004/0117817 A1 | 6/2004 | Kwon et al. |
| 2004/0117846 A1 | 6/2004 | Karaoguz et al. |
| 2004/0123125 A1 | 6/2004 | Zuili |
| 2004/0133467 A1 | 7/2004 | Siler |
| 2004/0133923 A1 | 7/2004 | Watson et al. |
| 2004/0137918 A1 | 7/2004 | Varonen et al. |
| 2004/0148625 A1 | 7/2004 | Eldering et al. |
| 2004/0153525 A1 | 8/2004 | Borella |
| 2004/0162900 A1 | 8/2004 | Bucher et al. |
| 2004/0163111 A1 | 8/2004 | Palazzo et al. |
| 2004/0163129 A1 | 8/2004 | Chapman et al. |
| 2004/0172531 A1 | 9/2004 | Little et al. |
| 2004/0177383 A1 | 9/2004 | Martinolich et al. |
| 2004/0181811 A1 | 9/2004 | Rakib |
| 2004/0184432 A1 | 9/2004 | Gateva et al. |
| 2004/0185856 A1 | 9/2004 | McKenna et al. |
| 2004/0193712 A1 | 9/2004 | Benenati et al. |
| 2004/0198386 A1 | 10/2004 | Dupray |
| 2004/0221305 A1 | 11/2004 | Broussard et al. |
| 2004/0246933 A1 | 12/2004 | Valko et al. |
| 2004/0250273 A1 | 12/2004 | Swix et al. |
| 2004/0255139 A1 | 12/2004 | Giobbi |
| 2004/0255335 A1 | 12/2004 | Fickle et al. |
| 2004/0261099 A1 | 12/2004 | Durden et al. |
| 2004/0264511 A1 | 12/2004 | Futch et al. |
| 2004/0264551 A1 | 12/2004 | Eidson |
| 2004/0266336 A1 | 12/2004 | Patsiokas et al. |
| 2004/0268386 A1 | 12/2004 | Logan et al. |
| 2005/0021940 A1 | 1/2005 | Ma |
| 2005/0022237 A1 | 1/2005 | Nomura |
| 2005/0022242 A1 | 1/2005 | Rosetti et al. |
| 2005/0022247 A1 | 1/2005 | Bitran et al. |
| 2005/0027696 A1 | 2/2005 | Swaminathan et al. |
| 2005/0028208 A1 | 2/2005 | Ellis et al. |
| 2005/0034171 A1 | 2/2005 | Benya |
| 2005/0034173 A1 | 2/2005 | Hatanaka |
| 2005/0038904 A1 | 2/2005 | Dougall |
| 2005/0039205 A1 | 2/2005 | Riedl |
| 2005/0049886 A1 | 3/2005 | Grannan et al. |
| 2005/0055220 A1 | 3/2005 | Lee et al. |
| 2005/0060742 A1 | 3/2005 | Riedl et al. |
| 2005/0060745 A1 | 3/2005 | Riedl et al. |
| 2005/0071882 A1 | 3/2005 | Rodriguez et al. |
| 2005/0080330 A1 | 4/2005 | Masuzawa et al. |
| 2005/0086683 A1 | 4/2005 | Meyerson |
| 2005/0086691 A1 | 4/2005 | Dudkiewicz et al. |
| 2005/0091539 A1 | 4/2005 | Wang et al. |
| 2005/0091681 A1 | 4/2005 | Borden et al. |
| 2005/0097006 A1 | 5/2005 | Nyako |
| 2005/0102529 A1 | 5/2005 | Buddhikot et al. |
| 2005/0108529 A1 | 5/2005 | Juneau |
| 2005/0108763 A1 | 5/2005 | Baran et al. |
| 2005/0111467 A1 | 5/2005 | Ng et al. |
| 2005/0114900 A1 | 5/2005 | Ladd et al. |
| 2005/0132191 A1 | 6/2005 | Joshi et al. |
| 2005/0138357 A1 | 6/2005 | Swenson et al. |
| 2005/0144333 A1 | 6/2005 | Kotzin |
| 2005/0144635 A1 | 6/2005 | Boortz et al. |
| 2005/0153778 A1 | 7/2005 | Nelson et al. |
| 2005/0166224 A1 | 7/2005 | Ficco |
| 2005/0177855 A1 | 8/2005 | Maynard et al. |
| 2005/0179938 A1 | 8/2005 | Kayashima et al. |
| 2005/0183120 A1 | 8/2005 | Jain et al. |
| 2005/0204019 A1 | 9/2005 | Flynn et al. |
| 2005/0210502 A1 | 9/2005 | Flickinger et al. |
| 2005/0216942 A1 | 9/2005 | Barton |
| 2005/0223032 A1 | 10/2005 | Shan et al. |
| 2005/0223409 A1 | 10/2005 | Rautila et al. |
| 2005/0229209 A1 | 10/2005 | Hildebolt et al. |
| 2005/0229213 A1 | 10/2005 | Ellis et al. |
| 2005/0233776 A1* | 10/2005 | Allen .................. H04W 84/08 455/567 |
| 2005/0235318 A1 | 10/2005 | Grauch et al. |
| 2005/0239402 A1 | 10/2005 | Gioscia et al. |
| 2005/0251454 A1 | 11/2005 | Wood |
| 2005/0261970 A1 | 11/2005 | Vucina et al. |
| 2005/0262418 A1 | 11/2005 | Gehrmann |
| 2005/0262542 A1 | 11/2005 | Deweese et al. |
| 2005/0267787 A1 | 12/2005 | Rose et al. |
| 2005/0273819 A1 | 12/2005 | Knudson et al. |
| 2005/0273828 A1 | 12/2005 | Barton |
| 2005/0278741 A1 | 12/2005 | Robarts et al. |
| 2005/0278760 A1 | 12/2005 | Dewar et al. |
| 2005/0289588 A1 | 12/2005 | Kinnear |
| 2005/0289618 A1 | 12/2005 | Hardin |
| 2006/0010226 A1 | 1/2006 | Hurtta et al. |
| 2006/0013557 A1 | 1/2006 | Poslinski |
| 2006/0015502 A1 | 1/2006 | Szucs |
| 2006/0015580 A1 | 1/2006 | Gabriel et al. |
| 2006/0015637 A1 | 1/2006 | Chung |
| 2006/0015925 A1 | 1/2006 | Logan |
| 2006/0019702 A1 | 1/2006 | Anttila et al. |
| 2006/0020786 A1 | 1/2006 | Helms et al. |

(56) References Cited

U.S. PATENT DOCUMENTS

| | | |
|---|---|---|
| 2006/0021004 A1 | 1/2006 | Moran et al. |
| 2006/0021019 A1 | 1/2006 | Hinton et al. |
| 2006/0031558 A1 | 2/2006 | Ortega et al. |
| 2006/0031883 A1 | 2/2006 | Ellis et al. |
| 2006/0031892 A1 | 2/2006 | Cohen |
| 2006/0036750 A1 | 2/2006 | Ladd et al. |
| 2006/0041910 A1 | 2/2006 | Hatanaka et al. |
| 2006/0047603 A1 | 3/2006 | Fontijn |
| 2006/0047745 A1 | 3/2006 | Knowles et al. |
| 2006/0047801 A1 | 3/2006 | Haag et al. |
| 2006/0047957 A1 | 3/2006 | Helms et al. |
| 2006/0053473 A1 | 3/2006 | Vau et al. |
| 2006/0075230 A1 | 4/2006 | Baird, III |
| 2006/0080408 A1 | 4/2006 | Istvan et al. |
| 2006/0088063 A1 | 4/2006 | Hartung et al. |
| 2006/0089911 A1 | 4/2006 | Dandekar et al. |
| 2006/0095940 A1 | 5/2006 | Yearwood |
| 2006/0107302 A1 | 5/2006 | Zdepski |
| 2006/0116966 A1 | 6/2006 | Pedersen et al. |
| 2006/0117341 A1 | 6/2006 | Park |
| 2006/0117365 A1 | 6/2006 | Ueda et al. |
| 2006/0117366 A1 | 6/2006 | Fries |
| 2006/0123147 A1 | 6/2006 | Yasuhara |
| 2006/0130099 A1 | 6/2006 | Rooyen |
| 2006/0130107 A1 | 6/2006 | Gonder et al. |
| 2006/0130113 A1 | 6/2006 | Carlucci et al. |
| 2006/0130120 A1 | 6/2006 | Brandyberry et al. |
| 2006/0136964 A1 | 6/2006 | Diez et al. |
| 2006/0137015 A1 | 6/2006 | Fahrny et al. |
| 2006/0149850 A1 | 7/2006 | Bowman |
| 2006/0153017 A1 | 7/2006 | Kim |
| 2006/0159048 A1 | 7/2006 | Han et al. |
| 2006/0161635 A1 | 7/2006 | Lamkin et al. |
| 2006/0163340 A1 | 7/2006 | Leiper |
| 2006/0167808 A1 | 7/2006 | Greene et al. |
| 2006/0168119 A1 | 7/2006 | Inoue et al. |
| 2006/0168219 A1 | 7/2006 | Ahluwalia et al. |
| 2006/0168616 A1 | 7/2006 | Candelore |
| 2006/0171390 A1 | 8/2006 | La |
| 2006/0173787 A1 | 8/2006 | Weber et al. |
| 2006/0173974 A1 | 8/2006 | Tang |
| 2006/0176884 A1 | 8/2006 | Fair et al. |
| 2006/0185004 A1 | 8/2006 | Song et al. |
| 2006/0187900 A1 | 8/2006 | Akbar |
| 2006/0190336 A1 | 8/2006 | Pisaris-Henderson et al. |
| 2006/0195553 A1 | 8/2006 | Nakamura |
| 2006/0200559 A1 | 9/2006 | Ling et al. |
| 2006/0200761 A1 | 9/2006 | Judd et al. |
| 2006/0200865 A1 | 9/2006 | Leake et al. |
| 2006/0206565 A1 | 9/2006 | Ganesan et al. |
| 2006/0206712 A1 | 9/2006 | Dillaway et al. |
| 2006/0209799 A1 | 9/2006 | Gallagher et al. |
| 2006/0212400 A1 | 9/2006 | Kamperman et al. |
| 2006/0212435 A1 | 9/2006 | Williams et al. |
| 2006/0218604 A1 | 9/2006 | Riedl et al. |
| 2006/0222321 A1 | 10/2006 | Russ |
| 2006/0242267 A1 | 10/2006 | Grossman |
| 2006/0248209 A1 | 11/2006 | Chiu et al. |
| 2006/0248355 A1 | 11/2006 | Thayer |
| 2006/0248553 A1 | 11/2006 | Mikkelson et al. |
| 2006/0248555 A1 | 11/2006 | Eldering |
| 2006/0253328 A1 | 11/2006 | Kohli et al. |
| 2006/0253545 A1 | 11/2006 | Lakamp |
| 2006/0253584 A1 | 11/2006 | Dixon et al. |
| 2006/0253864 A1 | 11/2006 | Easty |
| 2006/0253894 A1 | 11/2006 | Bookman et al. |
| 2006/0256814 A1 | 11/2006 | Caci |
| 2006/0259924 A1 | 11/2006 | Boortz et al. |
| 2006/0259927 A1 | 11/2006 | Acharya et al. |
| 2006/0272032 A1 | 11/2006 | Jogand-Coulomb et al. |
| 2006/0277569 A1 | 12/2006 | Smith |
| 2006/0277576 A1 | 12/2006 | Acharya et al. |
| 2006/0282319 A1 | 12/2006 | Maggio |
| 2006/0291506 A1 | 12/2006 | Cain |
| 2006/0291507 A1 | 12/2006 | Sarosi et al. |
| 2006/0293954 A1 | 12/2006 | Anderson et al. |
| 2006/0294259 A1 | 12/2006 | Matefi et al. |
| 2006/0294371 A1 | 12/2006 | Fanning |
| 2007/0005795 A1 | 1/2007 | Gonzalez |
| 2007/0011335 A1 | 1/2007 | Burns et al. |
| 2007/0019645 A1 | 1/2007 | Menon |
| 2007/0022032 A1 | 1/2007 | Anderson et al. |
| 2007/0022459 A1 | 1/2007 | Gaebel et al. |
| 2007/0022469 A1 | 1/2007 | Cooper et al. |
| 2007/0027809 A1 | 2/2007 | Alve |
| 2007/0033531 A1 | 2/2007 | Marsh |
| 2007/0038931 A1 | 2/2007 | Allaire et al. |
| 2007/0049245 A1 | 3/2007 | Lipman |
| 2007/0061331 A1 | 3/2007 | Ramer et al. |
| 2007/0061336 A1 | 3/2007 | Ramer et al. |
| 2007/0067851 A1 | 3/2007 | Fernando et al. |
| 2007/0076728 A1 | 4/2007 | Rieger et al. |
| 2007/0077921 A1 | 4/2007 | Hayashi et al. |
| 2007/0078714 A1 | 4/2007 | Ott et al. |
| 2007/0083899 A1 | 4/2007 | Compton et al. |
| 2007/0086372 A1 | 4/2007 | Lee et al. |
| 2007/0088801 A1 | 4/2007 | Levkovitz et al. |
| 2007/0088832 A1 | 4/2007 | Tsang et al. |
| 2007/0089127 A1 | 4/2007 | Flickinger et al. |
| 2007/0094691 A1 | 4/2007 | Gazdzinski |
| 2007/0101359 A1 | 5/2007 | Schiller et al. |
| 2007/0106814 A1 | 5/2007 | Son et al. |
| 2007/0107035 A1 | 5/2007 | Howe et al. |
| 2007/0112685 A1 | 5/2007 | Yamamichi |
| 2007/0113243 A1 | 5/2007 | Brey |
| 2007/0115389 A1 | 5/2007 | Mccarthy et al. |
| 2007/0115922 A1 | 5/2007 | Schneider et al. |
| 2007/0118857 A1 | 5/2007 | Chen et al. |
| 2007/0121612 A1 | 5/2007 | Nadeau et al. |
| 2007/0121678 A1 | 5/2007 | Brooks et al. |
| 2007/0123253 A1 | 5/2007 | Simongini et al. |
| 2007/0124416 A1 | 5/2007 | Casey et al. |
| 2007/0124488 A1 | 5/2007 | Baum et al. |
| 2007/0124781 A1* | 5/2007 | Casey ............... H04N 21/6125 725/94 |
| 2007/0129987 A1 | 6/2007 | Hauser et al. |
| 2007/0136743 A1 | 6/2007 | Hasek et al. |
| 2007/0136777 A1* | 6/2007 | Hasek ............... H04N 21/488 725/114 |
| 2007/0150919 A1 | 6/2007 | Morishita et al. |
| 2007/0157249 A1 | 7/2007 | Cordray et al. |
| 2007/0157260 A1 | 7/2007 | Walker |
| 2007/0162958 A1 | 7/2007 | Kao et al. |
| 2007/0166687 A1 | 7/2007 | Bell et al. |
| 2007/0168429 A1 | 7/2007 | Apfel et al. |
| 2007/0171274 A1 | 7/2007 | Yim |
| 2007/0186103 A1 | 8/2007 | Randle et al. |
| 2007/0204300 A1 | 8/2007 | Markley et al. |
| 2007/0204310 A1 | 8/2007 | Hua et al. |
| 2007/0204311 A1 | 8/2007 | Hasek et al. |
| 2007/0204314 A1 | 8/2007 | Hasek et al. |
| 2007/0209054 A1 | 9/2007 | Cassanova |
| 2007/0209059 A1 | 9/2007 | Moore et al. |
| 2007/0217436 A1* | 9/2007 | Markley ............ H04L 12/2834 370/401 |
| 2007/0219910 A1 | 9/2007 | Martinez |
| 2007/0220158 A1 | 9/2007 | Tolgu et al. |
| 2007/0220573 A1 | 9/2007 | Chiussi et al. |
| 2007/0220605 A1 | 9/2007 | Chien |
| 2007/0233857 A1 | 10/2007 | Cheng et al. |
| 2007/0237330 A1 | 10/2007 | Srivastava |
| 2007/0244760 A1 | 10/2007 | Bodnar et al. |
| 2007/0247395 A1 | 10/2007 | Barraclough |
| 2007/0250880 A1 | 10/2007 | Hainline |
| 2007/0260604 A1 | 11/2007 | Haeuser et al. |
| 2007/0261116 A1 | 11/2007 | Prafullchandra et al. |
| 2007/0265978 A1 | 11/2007 | Kahn et al. |
| 2007/0271388 A1 | 11/2007 | Bowra et al. |
| 2007/0276864 A1 | 11/2007 | Espelien |
| 2007/0276925 A1 | 11/2007 | La et al. |
| 2007/0276926 A1* | 11/2007 | LaJoie ............... G06F 21/10 709/219 |
| 2007/0279625 A1 | 12/2007 | Rzasa et al. |
| 2007/0280110 A1 | 12/2007 | Murphy et al. |

(56) References Cited

U.S. PATENT DOCUMENTS

| | | |
|---|---|---|
| 2007/0294178 A1 | 12/2007 | Pinder et al. |
| 2007/0294720 A1 | 12/2007 | Cohen et al. |
| 2008/0009268 A1 | 1/2008 | Ramer et al. |
| 2008/0040758 A1 | 2/2008 | Beetcher et al. |
| 2008/0052157 A1 | 2/2008 | Kadambi et al. |
| 2008/0059409 A1 | 3/2008 | Montpetit |
| 2008/0072249 A1 | 3/2008 | Hovnanian et al. |
| 2008/0090513 A1 | 4/2008 | Collins et al. |
| 2008/0098212 A1 | 4/2008 | Helms et al. |
| 2008/0098422 A1 | 4/2008 | Rodriguez et al. |
| 2008/0103977 A1 | 5/2008 | Khosravy et al. |
| 2008/0115161 A1 | 5/2008 | Kurzion |
| 2008/0115169 A1 | 5/2008 | Ellis et al. |
| 2008/0139193 A1 | 6/2008 | Hao et al. |
| 2008/0147497 A1 | 6/2008 | Tischer |
| 2008/0155589 A1 | 6/2008 | McKinnon et al. |
| 2008/0155600 A1 | 6/2008 | Klappert et al. |
| 2008/0155607 A1 | 6/2008 | Klappert |
| 2008/0155616 A1 | 6/2008 | Logan et al. |
| 2008/0162623 A1 | 7/2008 | Flynn et al. |
| 2008/0163305 A1 | 7/2008 | Johnson et al. |
| 2008/0171423 A1 | 7/2008 | Ieong et al. |
| 2008/0192820 A1 | 8/2008 | Brooks et al. |
| 2008/0195871 A1 | 8/2008 | Peinado et al. |
| 2008/0196056 A1 | 8/2008 | Bassett et al. |
| 2008/0209464 A1 | 8/2008 | Wright-Riley |
| 2008/0216106 A1* | 9/2008 | Maxwell ............ G06Q 20/1235 725/1 |
| 2008/0221986 A1 | 9/2008 | Soicher et al. |
| 2008/0229354 A1 | 9/2008 | Morris et al. |
| 2008/0263578 A1 | 10/2008 | Bayer et al. |
| 2008/0271068 A1 | 10/2008 | Ou et al. |
| 2008/0273591 A1 | 11/2008 | Brooks et al. |
| 2008/0282299 A1 | 11/2008 | Koat et al. |
| 2008/0289009 A1 | 11/2008 | Lee et al. |
| 2008/0313671 A1 | 12/2008 | Batrouny et al. |
| 2008/0313691 A1 | 12/2008 | Cholas et al. |
| 2009/0019134 A1 | 1/2009 | Bellifemine et al. |
| 2009/0019492 A1 | 1/2009 | Grasset |
| 2009/0030802 A1 | 1/2009 | Plotnick et al. |
| 2009/0034521 A1 | 2/2009 | Kato |
| 2009/0094652 A1 | 4/2009 | Al Adham et al. |
| 2009/0098861 A1 | 4/2009 | Kalliola et al. |
| 2009/0100459 A1 | 4/2009 | Riedl et al. |
| 2009/0132346 A1 | 5/2009 | Duggal et al. |
| 2009/0138922 A1 | 5/2009 | Thomas et al. |
| 2009/0187939 A1 | 7/2009 | Lajoie |
| 2009/0198794 A1 | 8/2009 | Beals |
| 2009/0210899 A1 | 8/2009 | Lawrence-Apfelbaum et al. |
| 2009/0235319 A1 | 9/2009 | Mao et al. |
| 2009/0248794 A1 | 10/2009 | Helms et al. |
| 2009/0249473 A1 | 10/2009 | Cohn |
| 2009/0282241 A1 | 11/2009 | Prafullchandra et al. |
| 2009/0317065 A1 | 12/2009 | Fyock et al. |
| 2009/0319379 A1 | 12/2009 | Joao |
| 2009/0320059 A1 | 12/2009 | Bolyukh |
| 2010/0042478 A1 | 2/2010 | Reisman |
| 2010/0083362 A1 | 4/2010 | Francisco et al. |
| 2010/0107194 A1 | 4/2010 | Mckissick et al. |
| 2010/0146539 A1 | 6/2010 | Hicks, III et al. |
| 2010/0175584 A1 | 7/2010 | Kusaka et al. |
| 2010/0251304 A1 | 9/2010 | Donoghue et al. |
| 2010/0251312 A1 | 9/2010 | Albano et al. |
| 2010/0287584 A1 | 11/2010 | Starikov et al. |
| 2010/0306369 A1 | 12/2010 | Riley |
| 2011/0015989 A1 | 1/2011 | Tidwell et al. |
| 2011/0016479 A1 | 1/2011 | Tidwell et al. |
| 2011/0016482 A1 | 1/2011 | Tidwell et al. |
| 2011/0040755 A1 | 2/2011 | Hindle et al. |
| 2011/0041146 A1 | 2/2011 | Lewis |
| 2011/0055347 A1 | 3/2011 | Hu et al. |
| 2011/0099593 A1 | 4/2011 | Kim et al. |
| 2011/0103374 A1 | 5/2011 | Lajoie et al. |
| 2012/0005756 A1 | 1/2012 | Hoefelmeyer et al. |
| 2012/0011567 A1 | 1/2012 | Cronk et al. |
| 2012/0117584 A1 | 5/2012 | Gordon |
| 2012/0158547 A1 | 6/2012 | Wood et al. |
| 2012/0284765 A1 | 11/2012 | Killick et al. |
| 2012/0291140 A1 | 11/2012 | Robert et al. |
| 2013/0036011 A1 | 2/2013 | Roberts et al. |
| 2013/0120570 A1 | 5/2013 | Stanley et al. |
| 2013/0219458 A1 | 8/2013 | Ramanathan |
| 2013/0227608 A1 | 8/2013 | Evans et al. |
| 2013/0239135 A1 | 9/2013 | Parker et al. |
| 2014/0283137 A1 | 9/2014 | Rebaud et al. |
| 2015/0348129 A1 | 12/2015 | Inoue et al. |
| 2020/0329260 A1 | 10/2020 | Mathur |

FOREIGN PATENT DOCUMENTS

| | | |
|---|---|---|
| EP | 1134951 A2 | 9/2001 |
| EP | 1691523 A1 | 8/2006 |
| JP | S5218653 A | 2/1977 |
| JP | S5239237 A | 3/1977 |
| JP | H01226681 A | 9/1989 |
| JP | H03272977 A | 12/1991 |
| JP | H0517083 A | 1/1993 |
| JP | H0558564 A | 3/1993 |
| JP | H05201624 A | 8/1993 |
| JP | 2002335507 A | 11/2002 |
| KR | 20060009376 A | 1/2006 |
| WO | WO-9617306 A2 | 6/1996 |
| WO | WO-9929107 A2 | 6/1999 |
| WO | WO-9963759 A2 | 12/1999 |
| WO | WO-0018120 A1 | 3/2000 |
| WO | WO-0072592 A1 | 11/2000 |
| WO | WO-0110125 A1 | 2/2001 |
| WO | WO-0160071 A2 | 8/2001 |

OTHER PUBLICATIONS

Almeroth, IEEE Journal on Selected Areas in Communications, The Use of Multicast Delivery to Provide a Scalable and Interactive Video-On-Demand Service, pp. 1110-1122, vol. 14: No. 6, 1996.

Bodzinga et al., "Enhancing the IPTV Service Architecture to Enable Service Innovation", International Engineering Consortium, May 1, 2006.

Butts, Tom, "Israeli Defense Technology Fuel's Vsoft's Software", pp. 1-2, http://www.vsoft.com/prints/israeli.sub.--defence.htm, Feb. 1, 1999.

Cantor, et al., Assertions and Protocols for the OASIS Security Assertion Markup Language (SAML) V2.0, OASIS Standard, Mar. 15, 2005. Document ID: saml-core-2.0-os (http://docs.oasis-open.org/security/saml/v2.0/saml-core-2.0-os.pdf).

Carnoy, David, "Anthony Wood and Mike Ramsey at War," Success, Mar. 1999, pp. 52-57.

David P.A., "The Beginnings and Prospective Ending of'End-to-End': An Evolutionary Perspective on the Internet's Architecture," Stanford Institute for Economic Policy Research, Aug. 2001, 34 pages.

Ford B., "Unmanaged Internet Protocol: Scalable Application-Friendly Internet Routing," Jul. 24, 2003, 6 pages.

Ford B., "Unmanaged Internet Protocol: Taming the Edge Network Management Crisis," ACM SIGCOMM Computer Communications Review, vol. 34 (1), Jan. 2004, pp. 93-98.

Furchgott, Roy, "Don't People Want to Control Their TV's?" The New York Times, Aug. 24, 2000, p. GI.

Hamilton, David P., "Driving Force", The Wall Street Journal, Jun. 26, 2000, p. R12.

Jacobs, Karen (Dec. 7, 1999) "Elevator Maker to Add Commercial Touch," The Wall Street Journal, pp. 1-2.

Kahaner, (Mar. 16, 1991) "Hitachi 1991 Technology Exhibition, Tokyo," Asian Technology Information Program, pp. 1-14.

Lewis M,, "Boom Box", The New York Times Magazine, Aug. 13, 2000, p. 36.

Lipschitz Sugarman, Margo "A Picture of the Future" pp. 1-2, http://vvww.vsoft.com/prints/picture.sub.--of.sub.--the.sub.--future.htm, Dec. 20, 1999.

(56) References Cited

OTHER PUBLICATIONS

Marusic, et al., "Share it!--Content Transfer in Home-to-Home Networks." IEEE MELECON 2004, May 12-15, 2004, Dubrovnik, Croatia.

Maxwell, Kim, Residential Broadband: An Insider's Guide to the Battle for the Last Mile, 1999, pp. 43-46, 308-312, John Wiley & Sons, Inc., New York.

Parsons, Patrick R., et al., The Cable and Satellite Televison Industries, 1998, pp. 162-163, 170-172, Allyn and Bacon, Boston.

Perdue, Lewis (Jul. 20, 1999) "Forget Elevator Music Here Comes Elevator Internet," Internet VCWatch, pp. 1-2.

Sadok D.H., et al., "Trends in Network and Device Composition," Topics in Internet Technology, IEEE Communications Magazine, Oct. 2006, pp. 112-118.

Stevens Institute of Technology, Spring 1999 Final Report, pp. 1-12.

Videodick 2.0 is Now Available on Sun Servers, p. 1, http://www.vsoft.com/press1999d.htm, Apr. 19, 1999.

Vsoft Launches Videoclick .COPYRGT. Home at IBC 2000, pp. 1-2, http:/www.vsoft.com/press2000o.htm, Sep. 8, 2000.

Vsoft to Implement Its Advanced Videoclick Interactive TV Software on Power TV Based Digital Cable Set-Top Boxes, pp. 1-2, http://www.vsoft.com/press1999m.htm, Dec. 13, 1999.

Vsoft to Present First Set-Top Box Implementation of Its Digital Video Software Platform, Targeted to Service Providers of Digital Video Services for Home Video, p. 1, http://www.vsoft.com/press1999j.htm, Sep. 8, 1999.

Yoneda, et al. (Dec. 1997) "Multi-Objective Elevator Supervisory-Control System with Individual Floor-Situation Control," Hitachi Review, p. 1.

Congdon P., et al., "IEEE 802.1 X Remote Authentication Dial-In User Service (RADIUS) Usage Guidelines," RFC 3580—IEEE 802.1X Remote Authentication Dial-In User Service, 2003, pp. 1-30.

McDevitt., et al., "Switched vs Broadcast Video for Fiber-To-The Home Systems", 1990, 11 pages.

Merriam Webster, "Apparatus", 2015.

Merriam Webster, "subscribe", 2015.

Merriam-Webster, "mapping", 2020 (Year: 2020).

Microsoft Computer Dictionary, "Device", Fifth edition, 2002, 648 pages.

Wikipedia, "Client (computing)", 2020, 2 pages.

Wikipedia, "Content delivery network", 2015.

Wikipedia, "Hybrid fibre-coaxial", 2015, 1 page.

Wikipedia, "Packet switching", 2015, 1 page.

Wikipedia, "switched", 2015.

Dictionary, "Recording", 2021.

Dictionary, "Recorded", 2021.

* cited by examiner

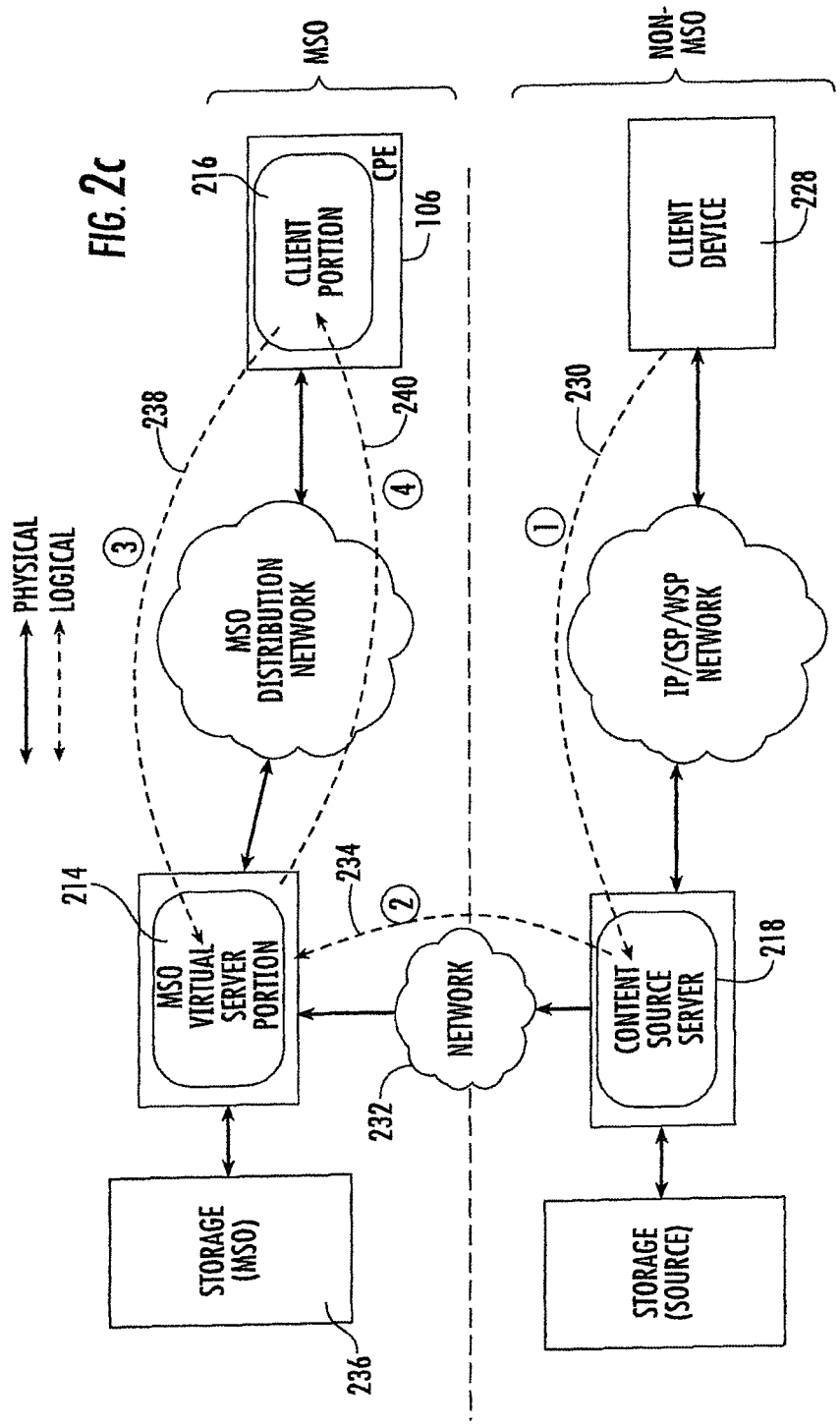

METHODS AND APPARATUS FOR PROVIDING VIRTUAL CONTENT OVER A NETWORK

PRIORITY

This application is a divisional of and claims priority to co-owned and co-pending U.S. patent application Ser. No. 13/773,477 filed Feb. 21, 2013 of the same title, issuing on Nov. 13, 2018 as U.S. Pat. No. 10,129,576, which is a continuation of and claims priority to co-owned U.S. patent application Ser. No. 13/400,524 filed Feb. 20, 2012 of the same title, and issued as U.S. Pat. No. 9,021,535 on Apr. 28, 2015, which is a continuation of and claims priority to co-owned U.S. patent application Ser. No. 12/764,761 filed Apr. 21, 2010 of the same title, and issued as U.S. Pat. No. 8,122,479 on Feb. 21, 2012, which is a continuation of and claims priority to co-owned U.S. patent application Ser. No. 11/811,953 filed Jun. 11, 2007 of the same title, and issued as U.S. Pat. No. 8,024,762 on Sep. 20, 2011, which claims priority to co-owned U.S. Provisional Patent Application Ser. No. 60/813,479 filed Jun. 13, 2006 also of the same title, each of the foregoing incorporated herein by reference in its entirety.

RELATED APPLICATIONS

This application is related to commonly owned U.S. patent application Ser. No. 11/440,490 filed May 24, 2006 and entitled "Personal Content Server Apparatus And Methods", commonly owned U.S. patent application Ser. No. 11/441,476 filed May 24, 2006 and entitled "Secondary Content Insertion Apparatus And Methods", commonly owned U.S. patent application Ser. No. 11/080,693 filed Mar. 14, 2005 and entitled "Method And Apparatus For Network Content Download and Recording", commonly owned U.S. patent application Ser. No. 10/182,307 filed Jul. 26, 2002 and entitled "System And Method For Providing Broadcast Programming, A Virtual VCR, And A Video Scrapbook To Programming Subscribers", and commonly owned U.S. patent application Ser. No. 10/626,051 filed Jul. 24, 2003 and entitled "Technique for Providing a Virtual Digital Video Recorder Service Through a Communications Network", each of the foregoing incorporated herein by reference in its entirety.

BACKGROUND OF THE INVENTION

1. Field of Invention

The present invention relates generally to the field of providing content over a network and other distribution channels, and specifically in one embodiment to the configuration, storage, and delivery of such content over a cable television network.

2. Description of Related Technology

Cable system and other content network operators have historically been at somewhat of a competitive disadvantage to retail and rental outlets for the delivery of certain content (such as new release movie titles) due to the latency inherent in the distribution of such content over cable as compared to these other distribution channels. New release DVDs will typically be available in the rental or retail stores such as Blockbuster® or NetFlix® well in advance of the availability of the same title on a VOD or similar service. This difference in distribution timing and availability is caused in part by the lack of any effective means for distributing the desired content to cable users in a hard (e.g., disc or other tangible media) form. Rather, under the prior art, such users must make use of third party rental or retail outlets if they desire to obtain a physical copy of the content (such as for unlimited personal use).

When content is newly created value related to its release is carefully controlled through various distribution channels in an effort to maximize revenue return for the content owner. For example, a new major motion picture is released through various distribution channels according to availability windows. A typical sequence of such availability windows might be: (1) three months in commercial theater release; (2) subsequent one month release for commercial airline viewing; (3) subsequent two month release for DVD/VCR retail and rental; (4) subsequent 2 month release in cable Video-On-Demand (VOD) or cable and satellite Pay-Per-View (PPV); (5) subsequent two month release for premium cable or satellite channel distribution (e.g., HBO, Showtime, etc.); and (6) subsequent release for non-premium channel broadcast (e.g., NBC, TBS, etc.). Distribution networks such as cable operators have sought to increase the value of distribution of such content through their networks by obtaining rights to earlier windows of availability, thereby increasing potential interest by cable subscribers and buy rates of content through VOD or PPV purchases. In particular, cable and satellite operators have sought availability of major motion picture releases through VOD and PPV on the same "day and date" terms as rental or purchase through retail outlets. However, conventional business models dictate that only after the rental and retail markets have at least partly saturated can the "new" release be distributed via cable or satellite.

One possible approach for cable or satellite system operators to overcome this competitive disadvantage is to offer to sell and ship a DVD or similar medium with the purchase of a viewing opportunity (e.g., on-demand movie purchase). Hence, if a subscriber wanted to purchase the content, they could be provided with this opportunity concurrent with viewing, or via a similar mechanism. Such an approach creates a certain billing and fulfillment requirements where the service provider may be required to use one or more third party providers (e.g., an on-line entity such as Amazon.com) to process the transaction, fill the order, and/or deliver the requested medium. Furthermore, if the DVD is to be shipped ground or some other reasonably inexpensive shipping option (which would be mandated in order to keep the costs competitive with other modalities), a protracted and potentially unpredictable delivery period may occur, thereby significantly reducing customer satisfaction. Such protracted or unpredictable period may also increase the user's propensity to return the merchandise, since they now have more time to consider the merits of the purchase. Stated simply, the more "impulsive" the opportunity for commerce (especially at a comparatively low price point), the smaller the likelihood of a return or cancellation of that purchase. Under the foregoing approach, the cable service provider would also have to pay the third party for providing the required billing and/or shipping services.

Recent advances in cable network and consumer premises equipment (CPE) technology have enabled a greater capability in terms of providing cable system and other network subscribers with both high-quality video and high-speed content/data download that is responsive to their personal needs.

Specifically, the advent of video-on-demand (VOD) technology has greatly increased the ability of a subscriber to utilize certain content (e.g., watch a movie) delivered over their cable system on their schedule. In a typical configuration, the VOD service makes available to its users a selection of multiple video programs that they can choose from and watch over a network connection with minimum setup delay. At a high level, a VOD system consists of one or more VOD servers that pass and/or store the relevant content; one or more network connections that are used for program selection and program delivery; and CPE to receive, decode and present the video on a display unit. The content is typically distributed to the CPE over a Hybrid Fiber Coaxial (HFC) network.

Depending on the type of content made available and rate structure for viewing, a particular VOD service could be called "subscription video-on-demand (SVOD)" that gives customers on-demand access to the content for a flat monthly fee, "free video-on-demand (FVOD)" that gives customers free on-demand access to some content, "movies on-demand" where VOD content consists of movies only, and so forth. Many of these services, although referred to by names different than VOD, still share many of the same basic attributes including storage, network and decoder technologies. Exemplary methods and apparatus are described in, e.g., co-owned U.S. application Ser. No. 09/876,677 filed Jun. 7, 2001 entitled "Hybrid Central/Distributed VOD Network With Tiered Content Structure", and issued as U.S. Pat. No. 7,690,020 on Mar. 30, 2010, which is incorporated herein by reference in its entirety.

Just as different varieties of VOD service offerings have evolved over time, several different network architectures have also evolved for deploying these services. These architectures range from fully centralized (e.g., VOD servers at a central location) to fully distributed (e.g., multiple copies of content distributed on VOD servers very close to customer premises), as well as various other network architectures there between. Since most cable television networks today consist of optical fiber towards the "core" of the network which are connected to coaxial cable networks towards the "edge", VOD transmission network architectures also consist of a mixture of optical fiber and coaxial cable portions.

The CPE for VOD often consists of a digital cable set-top box (DSTB) that provides the functions of receiving cable signals by tuning to the appropriate RF channel, processing the received signal and outputting VOD signals for viewing on a display unit. Such a digital set-top box also typically hosts a VOD application that enables user interaction for navigation and selection of VOD menu.

While the architectural details of how video is transported in the core HFC network can be different for each VOD deployment, each generally will have a transition point where the video signals are modulated, upconverted to the appropriate RF channel and sent over the coaxial segment(s) of the network. Depending on the topology of the individual cable plant, this could be performed at a node, hub or a headend. The coaxial cable portion of the network is variously referred to as the "access network" or "edge network" or "last mile network."

Similar to VOD technology, personal video recorder (PVR) functions allow the user a great degree of control over the playback and viewing of their selected content. The user can pause, fast-forward, rewind, and perform similar functions all via a unitary remote control or similar device.

Broadcast delivery models, while lacking the features and capability of VOD systems, are also none-the-less quite prevalent, and provide a more simplified and streamlined means of delivering content that is not personalized to any given user (e.g., live television programs, etc.). However, these broadcast models also have very significant latency of "new" content availability as compared to retail or rental distribution channels.

Hence in sum, a very salient downside to the use of "hard" media for delivering new content to consumers is the time and effort associated with obtaining it (whether by rental or purchase), and returning it (rental only), while a salient deficiency with VOD, broadcast, or similar cable distribution paradigms is the latency of the availability of new content as compared to the retail or rental (hard media) distribution channels.

Conversely, "hard" media has several desirable attributes, including (i) portability (i.e., the ability to physically transport the media and use it at any number of different locations); (ii) unlimited replay and control (i.e., the owner can replay, rewind, FF, etc. the media any way they want and as many times as they want); (iii) archival capability (i.e., the owner can back the content up onto another media, so that if one copy is lost or corrupted, it can be recovered without further purchase); and (iv) the ability to impose limitations on reproduction, and provide for copyright protection/enforcement, via physical limitations or configurations of the media.

Accordingly, it would be ideal to be able to merge all of the benefits of the hard media and network delivery paradigms, yet without the associated investments in time and effort in order to obtain (and return if necessary) the hard media, and also without the aforementioned content availability latency.

It would also be desirable for the subscriber or user to be able to preview the content before having to make a purchase decision, thereby allowing them to purchase only content they truly want to own. Ideally, such previewing would be temporally/spatially proximate to the purchase mechanism; i.e., done liked the preview, they could buy it immediately. Under the rental paradigm, the user must first rent the DVD (whether by going to a rental store or via mail), view it, and then make some additional arrangement to return the rented copy and then purchase a separate (new) copy retail, or keep the copy they have. Under the retail paradigm, the user must have some foreknowledge of the content and hence form their purchase decision based on another source (such as a good review from a friend or a critic).

A number of commercial products provide ostensibly "new" content to the user, yet do not provide all of the benefits of a hard media. For example. The ABC/Disney MovieBeam system receiver comes with a predetermined number (i.e., 100) movies already stored inside. Each week, up to 10 movies are replaced with new movies, thereby making this approach somewhat similar to the Netflix approach of a "rolling" population of available content. This approach has no ability to allow for remote viewing, and restricts the subscriber in terms of their content choices.

Alternatively, SeaChange provides a consumer product that gives a DVD-like experience run from the network head-end. The SeaChange "VODlink" product comprises a software application that provides set-top boxes with DVD player capability. VODlink is a software suite that is interoperable on Motorola and Scientific-Atlanta set-tops, as well as on VOD server platforms from SeaChange and others. VODlink, however, is a basically an extended VOD system, and hence limited to networks with VOD delivery capability.

It also is ostensibly affected by the same content latency issues described above with respect to traditional VOD services.

Furthermore, none of the foregoing solutions provide for delivery of media to other locations in a flexible manner; e.g., delivery to a user's premises, as well as to that user remotely such as when they are traveling. It is also highly impractical to bring one's DVD collection along with them while traveling, due to space and weight considerations.

Hence, there is a salient need for improved distribution apparatus and methods which allow a cable subscriber or other network user to obtain a "virtual" copy of their desired content in a prompt and effortless manner, using extant network infrastructure (e.g., VOID infrastructure and interfaces), and with the option of delivery to other locations. Such apparatus and methods would also optionally tie the purchase of the "virtual" content to the viewing of thereof, thereby providing content creators and distributors with a viable business model which would not usurp rental and retail profits.

Such improved apparatus and methods would also provide all of the benefits associated with a tangible medium to the subscriber, including inter alia ability to replay as many times as they like, optional "trick mode" functions (i.e., the ability to fast-forward, pause, rewind, etc.), physical redundancy, the ability to transfer or trade the content with others, and low latency from selection to viewing, yet without the attendant cost and effort of purchase, storage, carrying from location to location, and possible loss or damage due to use, environmental factors, and so forth.

Such improved apparatus and methods would further enhance the user's ownership experience by extending the feature set beyond that available with a DVD purchase or rental, including inter alia the ability to optionally customize or personalize their content, provide for automated updates thereto, and even dynamically encode or optimize the content for use on different platforms or equipment.

SUMMARY OF THE INVENTION

The present invention satisfies the foregoing needs by providing, inter alia, improved apparatus and methods for the selection, purchase and storage, of content over a network.

In a first aspect of the invention, a method of providing virtual ownership of content delivery over a network is disclosed. In one embodiment, the method comprises: receiving content from a content source; storing the content at a storage location; associating the content with at least one owner; and selectively causing the content to be transmitted from a server entity associated with the server location to consumer premises equipment (CPE) operatively coupled to the network, the CPE being associated with the at least one owner.

In one variant, the act of associating comprises: receiving a selection by the at least one owner of the content for purchase; processing a purchase transaction for the content; and generating a record of an association between the content and the at least one owner. The server entity comprises an on-demand server, and the act of transmitting comprises creation of a session between the server entity and the CPE, the session being used to transmit the content.

In another variant, the method further comprises inserting copyright protection data into at least portions of the content, whether before the content is stored, or after storage, but before transmission. The inserted data can also be uniquely related to at least one of the at least one owners.

In another variant, the content is encoded according to one of a plurality of possible coding formats before transmitting, the encoding determined based at least in part on data received from a client device on which the content will be played.

In yet another variant, the content comprises new release content, and the creation of the session is restricted to a temporal coordinate corresponding generally to the release of the content via another distribution channel.

In a second aspect of the invention, a method of providing virtual ownership of new release content via a network is disclosed. In one embodiment, the method comprises: receiving the content; storing at least a portion of the content so that the purchaser may receive the content a plurality of times; and selectively transmitting the content over the network to the purchaser, the transmitting being based at least in part on a request by the purchaser to receive the content. Transmitting of the content is restricted to occur only after a certain temporal coordinate.

In one variant, the stored content is associated with a purchaser, and the act of transmitting comprises transmitting the content using a VOD infrastructure of the network. In another variant, a broadcast delivery mode is used. In still another variant, the act of transmitting over the network comprises transmitting the content to the purchaser at a first location over a cable network based on a first request; and transmitting the content to the purchaser at a second location over a packet-switched network based on a second request.

In yet another variant, the act of storing the content comprises storing the content at a distribution node or hub of the network; and the transmitting comprises transmitting the content stored at the node or hub to the purchaser from the node or hub.

In a third aspect of the invention, network apparatus adapted to obtain and store content is disclosed. In one embodiment, the apparatus comprises: a processor; a storage device in data communication with the processor; a network interface in data communication with the processor, the network interface being adapted to at least receive the content from the network; and at least one computer program operative to run on the apparatus, the at least one computer program being adapted to: provide a user with a user interface configured to enable user selection of at least one of a plurality of content for purchase; forward the selection to a node of the network; cause payment information to be provided to complete the purchase of the selected content; and customize at least one aspect of the content before delivery.

In one variant, the network apparatus comprises consumer premises equipment (CPE), and the at least one customized aspect comprises selecting one of a plurality of encoding formats. The program is further adapted to forward information to the node relating to the decoding capabilities of the CPE.

In another variant, the program is further adapted to establish a trusted or authorized service domain within at least the apparatus for protection of the content.

In still another variant, the at least one customized aspect comprises adding annotations to one or more portions of the content, the annotations being viewable on subsequent playback of the content.

In a fourth aspect of the invention, network server apparatus is disclosed. In one embodiment, the apparatus comprises: a processor; a storage device in data communication with the processor; a network interface in data communication with the processor, the network interface being adapted to at least transmit the content via the network; and at least one computer program operative to run on the apparatus, the at least one computer program being adapted to: receive at least one purchase selection for content from a user; store the user selected content at a storage location accessibly by the apparatus; associate at least the user with the stored content; and selectively deliver the content to the user over the network.

In one variant, the at least one computer program is further adapted to: receive at least one user-specified customization; and customize at least one aspect of the content before the delivery based at least in part on the at least one user-specified customization. In another variant, the content comprises audio or music content relating to a plurality of artists, and at least one computer program is further adapted to deliver at least selected portions of the content to the user based on one or more configurations specified by the user. These one or more configurations may comprise for example: (i) substantially randomized play; (ii) genre play; and (iii) artist play.

In a fifth aspect of the invention, a network architecture for use in delivering content to a user is disclosed. In one embodiment, the architecture comprises: a server operatively coupled to the network; and a plurality of nodes operatively coupled to the network, the nodes each comprising at least a portion of the content. The server is operative to: receive a purchase transaction for the content from the user; cause retrieval of the at least portions of the content from respective ones of the nodes; and deliver the content to the user.

In one variant, the delivery of the content to the user comprises assembling the at least portions of the content before transmitting the content to the user over the network. In another variant, the delivery of the content to the user comprises assembling the at least portions of the content at a client premises device of the user.

In a sixth aspect of the invention, a method of doing business is disclosed. In one embodiment, the method comprises: receiving content from a source; storing at least a portion of the content so that a purchaser thereof may receive the content a plurality of times; and selectively providing the content to the purchaser, the act of providing being based at least in part on a request by the purchaser to receive the content.

In one variant, the act of storing comprises storing the at least portion of the content within a virtual content database according to an algorithm, the algorithm dynamically varying the contents of the virtual content database based on at least one parameter. The at least one parameter comprises, e.g., a metric related to the estimated subscriber demand for the content.

In a seventh aspect of the invention, a method of providing a virtual hard drive for a computerized device disposed at a first location and in communication with a cable network is disclosed. In one embodiment, the method comprises: receiving a plurality of files from the computerized device via the cable network; storing at least a portion of the files at a second location within the network and substantially remote from the first location; and selectively providing the files to the device via the network, the act of providing being based at least in part on a request by the device to receive or access the files.

In an eighth aspect of the invention, a method of providing updates to virtual content of an owner over a network is disclosed. In one embodiment, the method comprises: receiving first content from a content source; storing the first content at a storage location; associating the first content with at least one owner; receiving an update to the first content; storing the update at a storage location; and selectively causing either of the first content or update to be transmitted to consumer premises equipment (CPE) operatively coupled to the network, the CPE being associated with the at least one owner. The act of selectively causing is based at least in part on a preference received from the at least one owner.

In a ninth aspect of the invention, a method of providing virtual ownership of content via a network is disclosed. In one embodiment, the method comprises: storing first content so that it is associated with a first subscriber, the first subscriber having purchased the first content; storing second content so that it is associated with a second subscriber, the second subscriber having purchased the second content; and allowing the first and second subscribers to trade ownership of the first and second content using the network.

BRIEF DESCRIPTION OF THE DRAWINGS

FIG. 2c is a functional block diagram of a third exemplary embodiment of the network logical topology of the exemplary virtual content management architecture (VCMA) of FIG. 2.

DETAILED DESCRIPTION OF THE INVENTION

Figure 1:
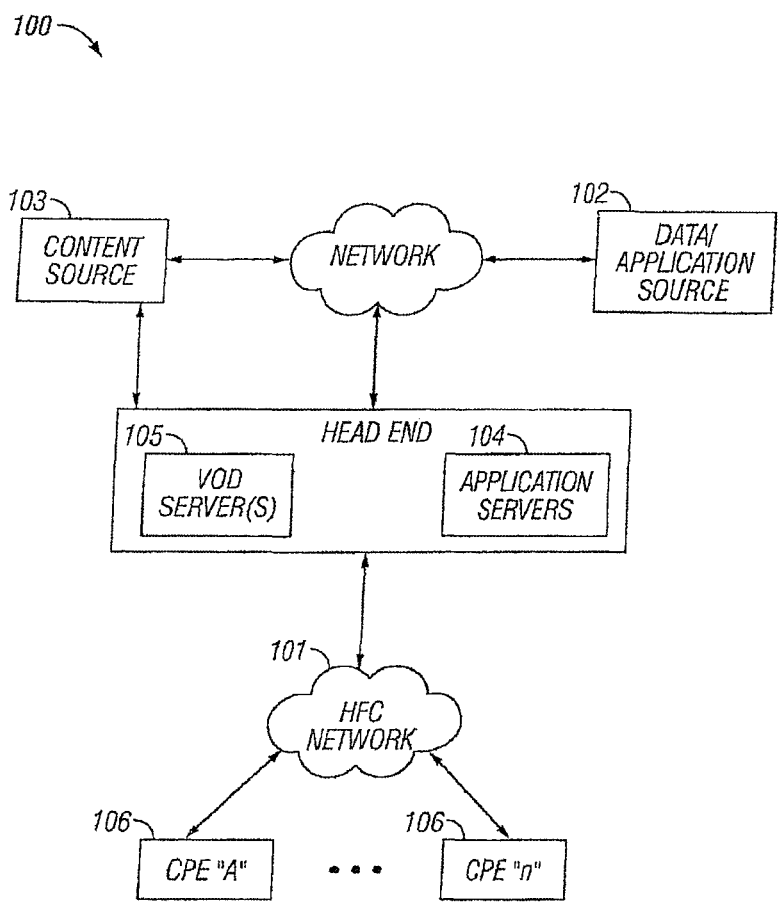
FIG. 1 is a functional block diagram illustrating an exemplary HFC cable network configuration useful with the present invention.

Reference is now made to the drawings wherein like numerals refer to like parts throughout.

As used herein, the term "application" refers generally to a unit of executable software that implements a certain functionality or theme. The themes of applications vary broadly across any number of disciplines and functions (such as on-demand content management, e-commerce transactions, brokerage transactions, home entertainment, calculator etc.), and one application may have more than one theme. The unit of executable software generally runs in a predetermined environment; for example, the unit could comprise a downloadable Java Xlet™ that runs within the JavaTV™ environment.

As used herein the term "browser" refers to any computer program, application or module which provides network access capability including, without limitation, Internet browsers adapted for accessing one or more websites or URLs over the Internet, as well as any "user agent" including those adapted for visual, aural, or tactile communications.

As used herein, the terms "client device" and "end user device" include, but are not limited to, set-top boxes (e.g., DSTBs), personal computers (PCs), and minicomputers, whether desktop, laptop, or otherwise, and mobile devices such as handheld computers, PDAs, personal media devices (PMDs), such as for example an iPod™ or Motorola ROKR, and smartphones.

As used herein, the term "codec" refers to an video, audio, or other data coding and/or decoding algorithm, process or apparatus including, without limitation, those of the MPEG (e.g., MPEG-1, MPEG-2, MPEG-4, etc.), Real (RealVideo, etc.), AC-3 (audio), DiVX, XViD/ViDX, Windows Media Video (e.g., WMV 7, 8, or 9), ATI Video codec, or VC-1 (SMPTE standard 421M) families.

As used herein, the term "computer program" or "software" is meant to include any sequence or human or machine cognizable steps which perform a function. Such program may be rendered in virtually any programming language or environment including, for example, C/C++, Fortran, COBOL, PASCAL, assembly language, markup languages (e.g., HTML, SGML, XML, VoXML), and the like, as well as object-oriented environments such as the Common Object Request Broker Architecture (CORBA), Java™ (including J2ME, Java Beans, etc.) and the like.

As used herein, the term "conditional access" refers to any access control scheme, whether implemented in hardware, software, or firmware (or combinations thereof), including without limitation members of the "Powerkey" family (Powerkey Book 2, Powerkey Book 3, etc.), NDS (including VideoGuard, mVideoGuard, etc.), ANSI/SCTE Standard 52 2003 (DVS-042), incorporated herein by reference in its entirety, and Motorola/General Instrument DigiCipher® family (DigiCipher II, etc.). These can be implemented using, for example, the so-called "CableCard" plug-in security module access technology, a downloadable CA system (DCAS), or otherwise.

The terms "Customer Premises Equipment (CPE)" and "host device" refer to any type of electronic equipment located within a customer's or user's premises and connected to a network. The term "host device" refers generally to a terminal device that has access to digital television content via a satellite, cable, or terrestrial network. The host device functionality may be integrated into a digital television (DTV) set. The term "customer premises equipment" (CPE) includes such electronic equipment such as set-top boxes (e.g., DSTBs), televisions, cable modems (CMs), embedded multimedia terminal adapters (eMTAs), whether stand-alone or integrated with other devices, Digital Video Recorders (DVR), gateway storage devices (Furnace), and ITV Personal Computers.

As used herein, the term "database" refers generally to one or more tangible or virtual data storage locations, which may or may not be physically co-located with each other or other system components.

As used herein, the term "display" means any type of device adapted to display information, including without limitation CRTs, LCDs, TFTs, plasma displays, LEDs, incandescent and fluorescent devices. Display devices may also include less dynamic devices such as, for example, printers, e-ink devices, and the like.

As used herein, the term "DVI" (digital video interface) refers generally to any type of interface (e.g., hardware and/or software) adapted to provide interface and/or conversion between different formats or domains, including without limitation interfaces compliant with the Digital Display Working Group (DDWG) DVI specification (e.g., DVI-A, DVI-D, and DVI-I). For example, using a DVI connector and port, a digital signal sent to an analog monitor is converted into an analog signal; if the monitor is digital, such as a flat panel display, no conversion is necessary. A DVI output is an option in OpenCable compliant hardware that provides a high-definition TV (HDTV) output which includes copy protection.

As used herein, the term "DVR" (digital video recorder) refers generally to any type or recording mechanism and/or software environment whereby content sent over a network can be recorded and selectively recalled. Such DVR may be dedicated in nature, or part of a non-dedicated or multifunction system.

As used herein, the term "DOCSIS" refers to any of the existing or planned variants of the Data Over Cable Services Interface Specification, including for example DOCSIS versions 1.0, 1.1, 2.0 and 3.0. DOCSIS (version 1.0) is a standard and protocol for internet access using a "digital" cable network. DOCSIS 1.1 is interoperable with DOCSIS 1.0, and has data rate and latency guarantees (VoIP), as well as improved security compared to DOCSIS 1.0. DOCSIS 2.0 is interoperable with 1.0 and 1.1, yet provides a wider upstream band (6.4 MHz), as well as new modulation formats including TDMA and CDMA. It also provides symmetric services (30 Mbps upstream).

As used herein, the term "head-end" refers generally to a networked system controlled by an operator (e.g., an MSO) that distributes programming to MSO clientele using client devices. Such programming may include literally any information source/receiver including, inter alia, free-to-air TV channels, pay TV channels, interactive TV, and the Internet. DSTBs may literally take on any configuration, and can be retail devices meaning that consumers may or may not obtain their DSTBs from the MSO exclusively. Accordingly, it is anticipated that MSO networks may have client devices from multiple vendors, and these client devices will have widely varying hardware capabilities. Multiple regional head-ends may be in the same or different cities.

As used herein, the term "integrated circuit (IC)" refers to any type of device having any level of integration (including without limitation ULSI, VLSI, and LSI) and irrespective of process or base materials (including, without limitation Si, SiGe, CMOS and GaAs). ICs may include, for example, memory devices (e.g., DRAM, SRAM, DDRAM, EEPROM/Flash, ROM), digital processors, SoC devices, FPGAs, ASICs, ADCs, DACs, transceivers, memory controllers, and other devices, as well as any combinations thereof.

As used herein, the terms "Internet" and "internet" are used interchangeably to refer to inter-networks including, without limitation, the Internet.

As used herein, the terms "local" and "remote" refer generally to devices, entities, or users that are serviced by substantially different communications channels. These terms are intended to be relative, and bear no physical or absolute reference or connotation as to the placement of the communication channels or the served device, entities or users. For example, a "local" network may comprise the MSO cable or satellite network, whereas a "remote" network may comprise the Internet or a LAN/WAN/MAN, the latter which may literally serve the very same premises.

As used herein, the term "memory" includes any type of integrated circuit or other storage device adapted for storing digital data including, without limitation, ROM. PROM, EEPROM, DRAM, SDRAM, DDR/2 SDRAM, EDO/FPMS, RLDRAM, SRAM, "flash" memory (e.g., NAND/NOR), and PSRAM.

As used herein, the terms "microprocessor" and "digital processor" are meant generally to include all types of digital processing devices including, without limitation, digital signal processors (DSPs), reduced instruction set computers (RISC), general-purpose (CISC) processors, microprocessors, gate arrays (e.g., FPGAs), PLDs, reconfigurable compute fabrics (RCFs), array processors, and application-specific integrated circuits (ASICs). Such digital processors may be contained on a single unitary IC die, or distributed across multiple components.

As used herein, the term "modem" refers to any kind of modulation or demodulation process or apparatus including without limitation cable (e.g., DOCSIS compliant) modems, DSL modems, analog modems, and so forth.

As used herein, the terms "MSO" or "multiple systems operator" refer to a cable, satellite, or terrestrial network provider having infrastructure required to deliver services including programming and data over those mediums.

As used herein, the terms "network" and "bearer network" refer generally to any type of telecommunications or data network including, without limitation, hybrid fiber coax (HFC) networks, satellite networks, telco networks, and data networks (including MANs, WANs, LANs, WLANs, internets, and intranets). Such networks or portions thereof may utilize any one or more different topologies (e.g., ring, bus, star, loop, etc.), transmission media (e.g., wired/RF cable, RF wireless, millimeter wave, optical, etc.) and/or communications or networking protocols (e.g., SONET, DOCSIS, IEEE Std. 802.3, ATM, X.25, Frame Relay, 3GPP, 3GPP2, WAP, SIP, UDP, FTP, RTP/RTCP, TCP/IP, H.323, etc.).

As used herein, the term "network agent" refers to any network entity (whether software, firmware, and/or hardware based) adapted to perform one or more specific purposes. For example, a network agent may comprise a computer program running in server belonging to a network operator, which is in communication with one or more processes on a CPE or other device.

As used herein, the term "QAM" refers to modulation schemes used for sending signals over cable networks. Such modulation scheme might use any constellation level (e.g. QPSK, QAM-16, QAM-64, QAM-256 etc.) depending on details of a cable network. A QAM may also refer to a physical channel modulated according to said schemes.

As used herein, the term "network interface" refers to any signal or data interface with a component or network including, without limitation, those of the Firewire (e.g., FW400, FW800, etc.), USB (e.g., USB2), Ethernet (e.g., 10/100, 10/100/1000 (Gigabit Ethernet), 10-Gig-E, etc.), MoCA, Serial ATA (e.g., SATA, e-SATA, SATAII), Ultra-ATA/DMA, Coaxsys (e.g., TVnet™), radio frequency tuner (e.g., in-band or OOB, cable modem, etc.), modem, WiFi (802.11a,b,g,n), WiMAX (802.16), PAN (802.15), or IrDA families.

As used herein, the term "provisioning" refers generally to a process whereby a package, content title or other information is provided to a service (such as on-demand download service) so that the information is integrated with other functions and software modules within the service.

As used herein, the term "purchase" shall mean without limitation any sale, agreement for sale, transfer of funds, promise to transfer funds, barter arrangement, promotional or incentive agreement or arrangement, virtual ownership, subscription, or other relationship wherein consideration of any kind is exchanged between two or more parties (or their proxies).

As used herein, the term "recording medium" refers to any material, component, collection of components or device adapted to store information in a substantially permanent or semi-permanent state. Exemplars of recording media include, without limitation, magnetic media, integrated circuits (e.g., RAM or ROM), optical media, chemical media, and atomic- and subatomic-level storage structures (e.g., crystalline structures, quantum or spin states, etc.).

As used herein, the term "server" refers to any computerized component, system or entity regardless of form which is adapted to provide data, files, applications, content, or other services to one or more other devices or entities on a computer network.

As used herein, the term "Service Group" refers to either a group of service users (e.g. subscribers) or the resources shared by them in the form of entire cable RF signal, only the RF channels used to receive the service or otherwise treated as a single logical unit by the network for resource assignment.

As used herein, the term "speech recognition" refers to any methodology or technique by which human or other speech can be interpreted and converted to an electronic or data format or signals related thereto. It will be recognized that any number of different forms of spectral analysis such as, without limitation, MFCC (Mel Frequency Cepstral Coefficients) or cochlea modeling, may be used. Phoneme/word recognition, if used, may be based on HMM (hidden Markov modeling), although other processes such as, without limitation, DTW (Dynamic Time Warping) or NNs (Neural Networks) may be used. Myriad speech recognition systems and algorithms are available, all considered within the scope of the invention disclosed herein.

As used herein, the term "user interface" refers to, without limitation, any visual, graphical, tactile, audible, sensory, or other means of providing information to and/or receiving information from a user or other entity.

As used herein, the term "Wi-Fi" refers to, without limitation, any of the variants of IEEE-Std. 802.11 or related standards including 802.1 a/b/g/n.

As used herein, the term "wireless" means any wireless signal, data, communication, or other interface including without limitation Wi-Fi, Bluetooth, 3G, HSDPA/HSUPA, TDMA, CDMA (e.g., IS-95A, WCDMA, etc.), FHSS, DSSS, GSM, PAN/802.15, WiMAX (802.16), 802.20, narrowband/FDMA, OFDM, PCS/DCS, analog cellular, CDPD, satellite systems, millimeter wave or microwave systems, acoustic, and infrared (i.e., IrDA).

Overview

The present invention comprises improved methods and apparatus for the selection, storage, and provision of content or other data via a network (such as a cable television network).

In one exemplary embodiment, the present invention utilizes extant network streaming and broadcast technologies to provide a here-to-fore unavailable capability to the network subscriber or other user; i.e., timely and rapid download of new content such as a new-release movie or game. Furthermore, "virtual" ownership of the content is provided, such that it can be utilized by the purchaser or subscriber as if they had possession of the tangible medium, yet without the attendant disabilities of purchasing and owning a physical medium (e.g., DVD) including storage, requirement for a DVD player, and so forth. The provision of the new content for viewing can also be tied to a purchase of the content (or other commerce-based event), such as where the content is only delivered after the user agrees to purchase it. This capability provides a number of distinct advantages, including, inter alia: the ability to sell the subscriber a movie or other title in an earlier window than would otherwise be available under prior art network content distribution paradigms, while providing the subscriber enhanced flexibility and choices for content ownership no added effort or cost.

Furthermore, by using the aforementioned "tying" of the content purchase and viewing of the content, content providers such as studios or networks can be assured of no diminution of their rental and retail channels. This approach provides a strong differentiation over other physical distribution channels (e.g., rental and retail), since viewers can now select, purchase, and view/use their selected content without the attendant cost and effort of renting/return or retail purchase. Also, delivery and controlled distribution (i.e., recording) over a cable or similar network can provide certain security benefits as compared to other electronic network distribution channels (such as the Internet), which are inherently untrusted and hence provide a significant risk of theft or unauthorized "ripping" or peer-sharing of content to the content provider without additional security measures. Copyright or other intellectual property rights management mechanisms can also be readily implemented and enforced using the approach of the present invention.

The present invention also advantageously provides the ability to deliver content to hardware domains or locations where delivery of full-featured content might otherwise be impractical or impossible. For example, in the context of a prior art DVD, a DVD player of some sort (whether as a stand-alone device, integrated into a PC or laptop, etc.) would be required in order to view the content. Under the present invention, however, delivery of content can occur repeatedly and in effect instantaneously to devices not having a DVD player or significant storage volume (e.g., DVR); rather, the only salient requirement is access to the virtual content server and sufficiently high bandwidth capability between the client device and the server.

The "virtual" or dynamic storage capability of the invention can also readily be disposed at any number of different locations or nodes within the network (depending on its topology and delivery paradigm) including, e.g., at the head-end, BSA hub site, or other distribution or management node.

Various other aspects of the present invention include: (i) the ability for virtual content owners to annotate or otherwise personalize their content; (ii) parental or other controls for masking or blocking selected portions of content; (iii) a distributed premises gaming architecture based on virtually owned gaming applications/content; (iv) a peer-to-peer (P2P) distributed delivery architecture; (v) content preview capability; (vi) the ability to virtually store subscriber-generated content; (vii) virtual audio storage and services; (viii) the ability to trade or transfer virtually owned content over the network; (ix) dynamic virtual content database shaping; (x) privacy mechanisms (i.e., to prevent association of a particular subscriber with particular content by a third party); (xi) automated or semi-automated updating of content, such as when new or remixed versions are released; (xii) dynamic or adaptive encoding, so that content can be encoded on-the-fly for particular subscriber platforms as opposed to storing multiple different variants; and (xiii) "virtual hard drive" capability for subscriber PCs to provide all of the benefits of content storage, yet for data and/or software applications that would normally be resident on a computerized device.

Exemplary embodiments of network server and subscriber premises devices are also described, as well as an operational/business "rules" engine to enforce various network rules within the virtual content management (VCM) architecture, Various business methodologies and paradigms relating to the foregoing features are also described.

Detailed Description of Exemplary Embodiments

Exemplary embodiments of the apparatus and methods of the present invention are now described in detail. While these exemplary embodiments are described in the context of the aforementioned hybrid fiber coax (HFC) cable architecture having an multi-system operator (MSO), digital networking capability, and plurality of client devices/CPE, the general principles and advantages of the invention may be extended to other types of networks and architectures where bandwidth allocation is required or desirable, whether broadband, narrowband, wired or wireless, content or data, or otherwise. Hence, the following description is merely exemplary in nature. For example, the invention may be practiced over a fiber-to-the-home (FTTH) or fiber-to-the-curb (FTTC) system, or over a satellite or millimeter wave-based network.

It will also be appreciated that while described generally in the context of a network providing service to a consumer (i.e., home) end user domain, the present invention may be readily adapted to other types of environments including, e.g., commercial/enterprise, and government/military applications. Myriad other applications are possible.

It is further noted that while described primarily in the context of 6 MHz RF channels, the present invention is applicable to literally any frequency/bandwidth, such as for example 8 MHz channels.

Furthermore, as referenced above, the invention is in no way limited to traditional cable system frequencies (i.e., below 1 GHz), and in fact may be used with systems that operate above 1 GHz band in center frequency or bandwidth, to include without limitation so-called ultra-wideband (UWB) systems. For example, in one variant of the invention, high-bandwidth UWB signals imposed atop the traditional QAMs of the cable network are used to provide a high-speed data download capability for the content to be utilized at the subscriber's premises (e.g., applications or archived data).

Also, while certain aspects are described primarily in the context of the well-known Internet Protocol (described in, inter alia, RFC 791 and 2460), it will be appreciated that the present invention may utilize other types of protocols (and in fact bearer networks to include other internets and intranets) to implement the described functionality.

FIG. 1 illustrates a typical generalized content-based network configuration with which the virtual content storage and delivery apparatus and methods of the present invention may be used. The various components of the network 100 include (i) one or more data and application origination points 102; (ii) one or more content sources 103, (iii) one or more application distribution servers 104; (iv) one or more VOD servers 105, and (v) consumer premises equipment (CPE) 106. The distribution server(s) 104, VOD servers 105 and CPE(s) 106 are connected via a bearer (e.g., HFC) network 101. A simple architecture comprising one of each of the aforementioned components 102, 104, 105, 106 is shown in FIG. 1 for simplicity, although it will be recognized that comparable architectures with multiple origination points, distribution servers, VOD servers, and/or CPE devices (as well as different network topologies) may be utilized consistent with the invention. For example, the head-end architecture of FIG. 1a (described in greater detail below) may be used.

The data/application origination point 102 comprises any medium that allows data and/or applications (such as a VOD-based application, gaming application, or "Watch TV" application) to be transferred to a distribution server 104. This can include for example a third party data source, application vendor website, CD-ROM, external network interface, mass storage device (e.g., RAID system), etc. Such transference may be automatic, initiated upon the occurrence of one or more specified events (such as the receipt of a request packet or ACK), performed manually, or accomplished in any number of other modes readily recognized by those of ordinary skill.

The application distribution server 104 comprises a computer system where such applications can enter the network system. Distribution servers are well known in the networking arts, and accordingly not described further herein.

The VOD server 105 comprises a computer system where on-demand content can be received from one or more of the aforementioned data sources 102 and enter the network system. These servers may generate the content locally, or alternatively act as a gateway or intermediary from a distant source.

The CPE 106 includes any equipment in the "customers' premises" (or other locations, whether local or remote to the distribution server 104) that can be accessed by a distribution server 104. Exemplary embodiments of a "converged" CPE (i.e., CD) of the invention are also described subsequently herein.

Figure 1A:
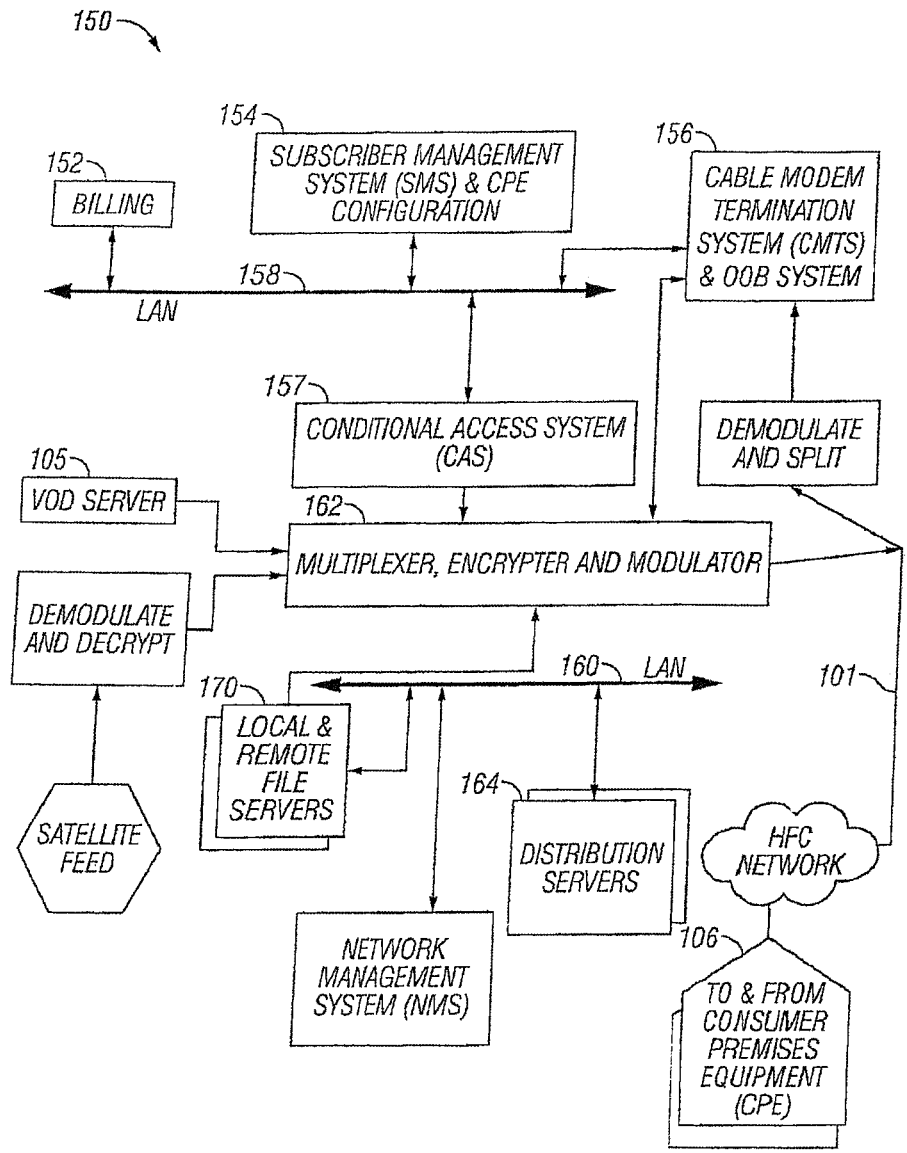
FIG. 1a is a functional block diagram illustrating one exemplary HFC cable network head-end configuration useful with the present invention.

Referring now to FIG. 1a, one exemplary embodiment of a head-end architecture useful with the present invention is described. As shown in FIG. 1a, the head-end architecture 150 comprises typical head-end components and services including billing module 152, subscriber management system (SMS) and CPE configuration management module 154, cable-modem termination system (CMTS) and OOB system 156, as well as LAN(s) 158, 160 placing the various components in data communication with one another. It will be appreciated that while a bar or bus LAN topology is illustrated, any number of other arrangements as previously referenced (e.g., ring, star, etc.) may be used consistent with the invention. It will also be appreciated that the head-end configuration depicted in FIG. 1a is high-level, conceptual architecture and that each MSO may have multiple head-ends deployed using custom architectures.

The architecture 150 of FIG. 1a further includes a multiplexer/encrypter/modulator (MEM) 162 coupled to the HFC network 101 adapted to "condition" content for transmission over the network. The distribution servers 104 are coupled to the LAN 160, which provides access to the MEM 162 and network 101 via one or more file servers 170. The VOD servers 105 are coupled to the LAN 160 as well, although other architectures may be employed (such as for example where the VOD servers are associated with a core switching device such as an 802.3z Gigabit Ethernet device). As previously described, information is carried across multiple channels. Thus, the head-end must be adapted to acquire the information for the carried channels from various sources. Typically, the channels being delivered from the head-end 150 to the CPE 106 ("downstream") are multiplexed together in the head-end and sent to neighborhood hubs (FIG. 1b) via a variety of interposed network components.

Content (e.g., audio, video, etc.) is provided in each downstream (in-band) channel associated with the relevant service group. To communicate with the head-end or intermediary node (e.g., hub server), the CPE 106 may use the out-of-band (OOB) or DOCSIS channels and associated protocols. The OCAP 1.0, 2.0, 3.0 (and subsequent) specification provides for exemplary networking protocols both downstream and upstream, although the invention is in no way limited to these approaches.

It will also be recognized that the multiple servers (broadcast, VOD, or otherwise) can be used, and disposed at two or more different locations if desired, such as being part of different server "farms". These multiple servers can be used to feed one service group, or alternatively different service groups. In a simple architecture, a single server is used to feed one or more service groups. In another variant, multiple servers located at the same location are used to feed one or more service groups. In yet another variant, multiple servers disposed at different location are used to feed one or more service groups.

Figure 1B:
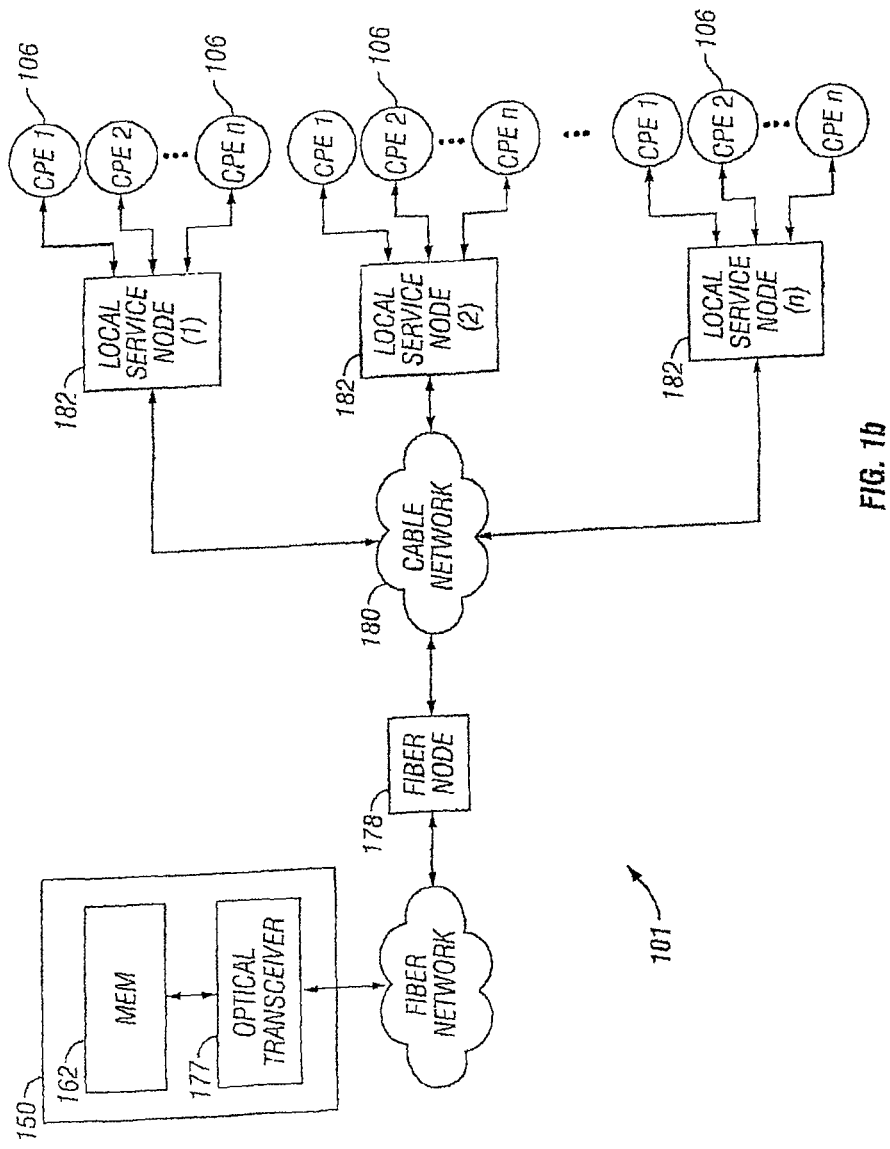
FIG. 1b is a functional block diagram illustrating one exemplary local service node configuration useful with the present invention.

As shown in FIG. 1b, the network 101 of FIGS. 1 and 1a comprises a fiber/coax arrangement wherein the output of the MEM 162 of FIG. 1a is transferred to the optical domain (such as via an optical transceiver 177 at the head-end or further downstream). The optical domain signals are then distributed to a fiber node 178, which further distributes the signals over a distribution network 180 to a plurality of local servicing nodes 182. This provides an effective 1:N expansion of the network at the local service end.

"Switched" Networks—

Figure 1C:
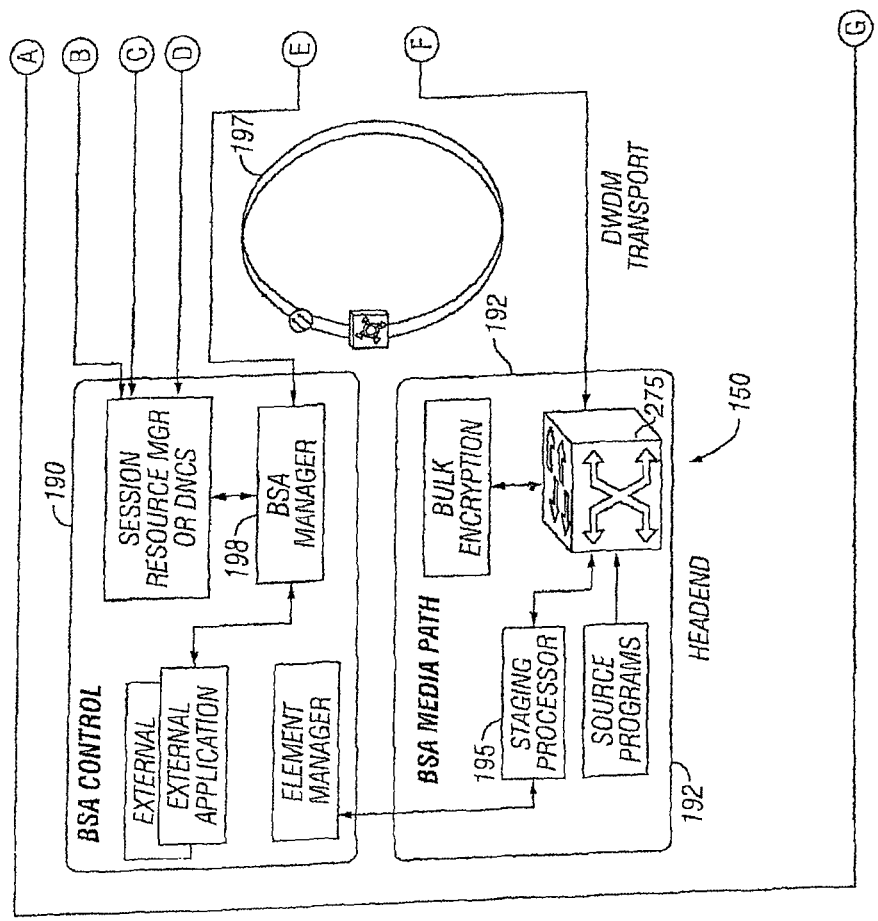
FIG. 1c is a functional block diagram illustrating one exemplary broadcast switched architecture (BSA) network useful with the present invention.
Figure 1C:
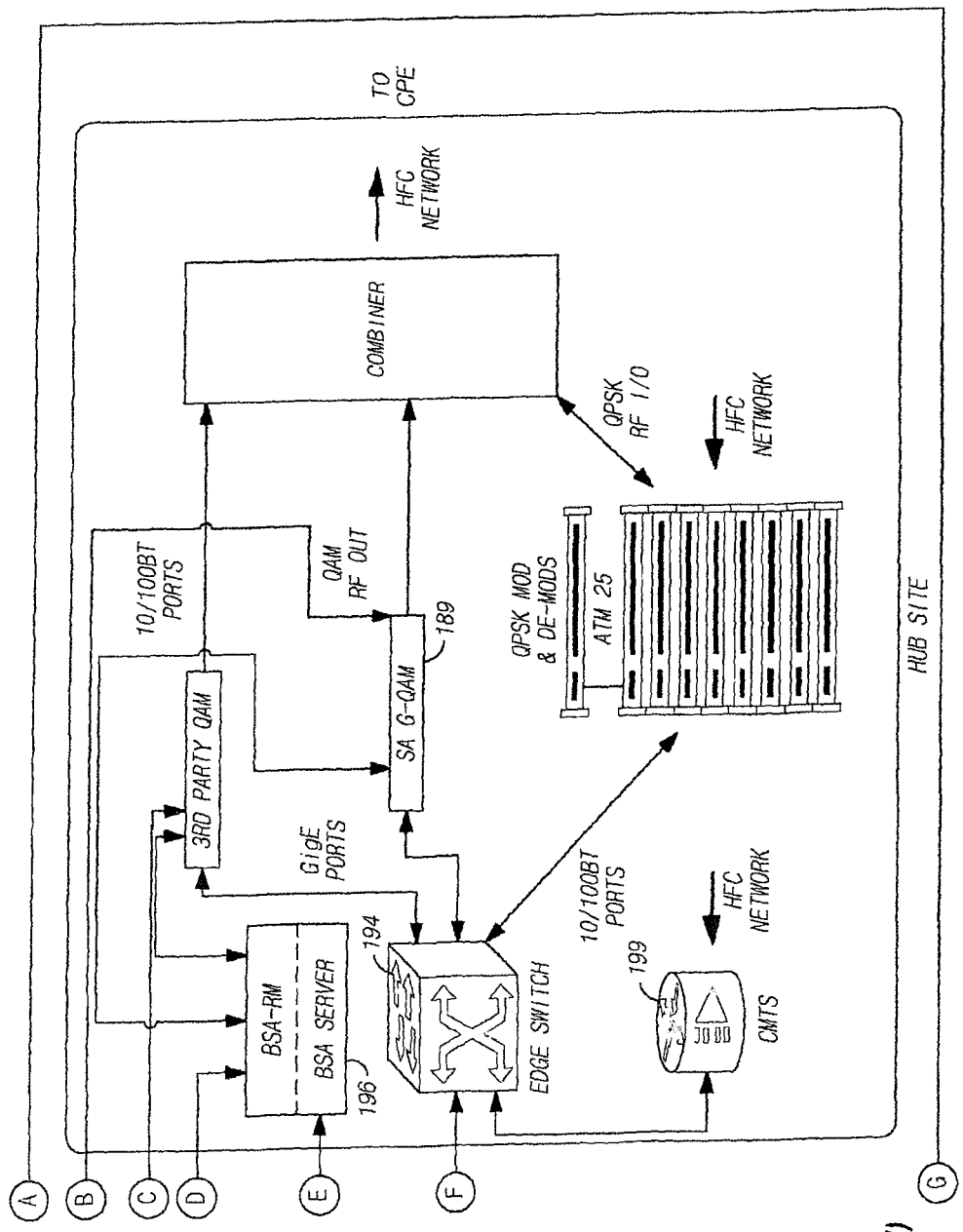

FIG. 1c illustrates an exemplary "switched" network architecture also useful with the present invention. While a so-called "broadcast switched architecture" or BSA network is illustrated in this exemplary embodiment, it will be recognized that the present invention is in no way limited to such architectures.

Switching architectures allow improved efficiency of bandwidth use for ordinary digital broadcast programs. Ideally, the subscriber will be unaware of any difference between programs delivered using a switched network and ordinary streaming broadcast delivery.

FIG. 1c shows the implementation details of one exemplary embodiment of this broadcast switched network architecture. Specifically, the head-end 150 contains switched broadcast control and media path functions 190, 192; these element cooperating to control and feed, respectively, downstream or edge switching devices 194 at the hub site which are used to selectively switch broadcast streams to various service groups. A BSA server 196 is also disposed at the hub site, and implements functions related to switching and bandwidth conservation (in conjunction with a management entity 198 disposed at the head-end). An optical transport ring 197 is utilized to distribute the dense wave-division multiplexed (DWDM) optical signals to each hub in an efficient fashion.

Co-owned U.S. patent application Ser. No. 09/956,688 filed Sep. 20, 2001, entitled "Technique For Effectively Providing Program Material In A Cable Television System", and issued as U.S. Pat. No. 8,713,623 on Apr. 29, 2014, incorporated herein by reference in its entirety, describes one exemplary broadcast switched digital architecture useful with the present invention, although it will be recognized by those of ordinary skill that other approaches and architectures may be substituted.

In addition to "broadcast" content (e.g., video programming), the systems of FIGS. 1a-1c can also deliver Internet data services using the Internet protocol (IP), although other protocols and transport mechanisms of the type well known in the digital communication art may be substituted. One exemplary delivery paradigm comprises delivering MPEG-based video content (e.g., "IPTV" or the like), with the video transported to user PCs (or IP-based STBs) over the aforementioned DOCSIS channels comprising MPEG (or other video codec such as H.264 or AVC) over IP over MPEG. That is, the higher layer MPEG- or other encoded content is encapsulated using an IP protocol, which then utilizes an MPEG packetization of the type well known in the art for delivery over the RF channels. In this fashion, a parallel delivery mode to the normal broadcast delivery exists; i.e., delivery of video content both over traditional downstream QAMs to the tuner of the user's STB or other receiver device for viewing on the television, and also as packetized IP data over the DOCSIS QAMs to the user's PC or other IP-enabled device via the user's cable modem.

Referring again to FIG. 1c, the IP packets associated with Internet services are received by edge switch 194, and forwarded to the cable modem termination system (CMTS) 199. The CMTS examines the packets, and forwards packets intended for the local network to the edge switch 194. Other packets are discarded or routed to another component.

The edge switch 194 forwards the packets receive from the CMTS 199 to the QAM modulator 189, which transmits the packets on one or more physical (QAM-modulated RF) channels to the CPEs. The IP packets are typically transmitted on RF channels that are different that the RF channels used for the broadcast video and audio programming, although this is not a requirement. The CPE 106 are each configured to monitor the particular assigned RF channel (such as via a port or socket ID/address, or other such mechanism) for IP packets intended for the subscriber premises/address that they serve.

It will be appreciated that while the exemplary embodiments presented herein are described in the context of Internet services that include multicast and unicast data, the present invention is applicable to other types of services that include multicast transmission of data delivered over a network having multiple physical channels or even virtual or logical channels. For example, switching between various physical channels that comprise a virtual channel, can itself be conducted according to the "switched" approach of the present invention. As a simple illustration, if a first virtual channel is comprised of physical channels (e.g., QAMs) A, B and D, and a second virtual channel is comprised of QAMs C, E and F, a CM or other CPE can be configured to switch between the A/B/D and C/E/F virtual channels as if they were a single QAM.

Virtual Content Management Architecture (VCMA)—

Figure 2:
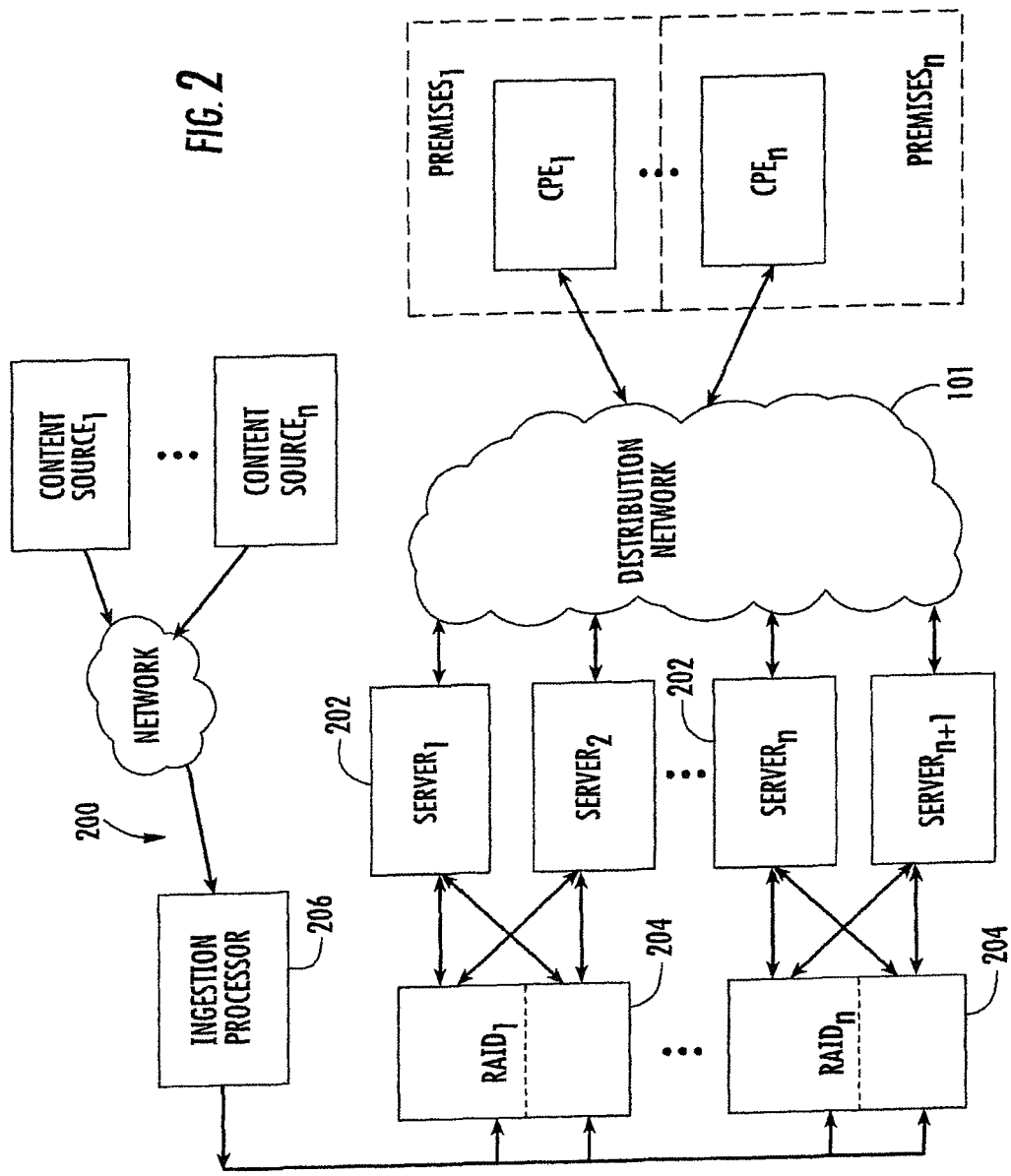
FIG. 2 is a functional block diagram of one exemplary embodiment of the virtual content management architecture (VCMA) according to the invention.

Referring now to FIG. 2, a first embodiment of the exemplary virtual content management (VCM) architecture according to the present invention is described in detail.

In one aspect, the VCM architecture provides a functionality generally comparable to rental (i.e., the ability to user-select titles for viewing on more than one occasion); however, the procurement and return of physical media are advantageously obviated. Even with an approach such as the well known Netflix™ service, the source (Netflix) must generate the physical media and mail it to the user, who must then also physically package and return it via mail. The present invention has no such issues, in that only ephemeral transmission of the content occurs, much like a PPV or VOD selection process. However, the present invention also allows the owner to view the content as many times as they like, and whenever (and even from wherever) they like, without incurring additional charges. Hence, their ownership is tangible in the sense that they exert control over the disposition and use of their content; yet, their ownership is also virtual in that they are not saddled with the disabilities of owning such tangible media including inter alia additional costs of producing and transmitting the media, wearing (e.g., scratches on the DVD) or other degradation of the media with time or use, storage space, potential for theft, access control (e.g., undesired access to DVDs of mature content by children), and so forth. Hence, the exemplary VCM architecture of the present invention in effect fuses the best attributes of renting with those of physical ownership to provide a highly flexible, cost efficient and user-customizable "virtual" ownership experience. This is all accomplished using primarily extant capabilities within the MSO's or satellite provider's network, thereby mitigating significant impediments to deployment.

As shown in FIG. 2, the exemplary embodiment of the VCM architecture 200 generally comprises one or more content servers 202 (e.g., VOD or broadcast servers), one or more storage devices 204, and one or more ingestion processing entities 206. These components generally cooperate to, inter alia, ingest, store, and distribute content over the network 101. The exemplary embodiment illustrates a plurality of servers 202 and associated storage facilities 204 arranged in a scalable, non-blocking and substantially redundant architecture that provide for a high degree of parallelism (and capacity), as well as reliability and scalability based on expanding needs. One exemplary system useful with the invention is the Exastore™ system manufactured by Exanet, Inc., although other devices and architectures can be utilized. See, e.g., U.S. Pat. No. 6,934,880 to Hofner issued Aug. 23, 2005 and entitled "Functional failover apparatus and method of operation thereof", incorporated herein by reference in its entirety, which describes the aforementioned Exastore system in detail.

In one embodiment, the storage devices 204 each comprise a redundant array (e.g., RAID) device, and when coupled with the fault tolerance, self monitoring, self-healing, and automatic communication channel fail-over (in the event of a hardware or software failure or loss of channel) of the illustrated architecture 200, provide a highly redundant and reliable configuration.

Furthermore, while illustrated generally as a plurality of substantially local components, the architecture of FIG. 2 can have one or more components (such as e.g., the RAID arrays) disposed at a remote location, such as for the purpose of security. For example, in one variant, the storage devices 204 are co-located and co-managed by a content source (e.g., studio), which obviates separate storage facilities for each the content source and the MSO.

In one embodiment, a physically secure storage facility is disposed at the network head-end 150, in order to prevent the theft or surreptitious access to the copyrighted and valuable content owned by the users/purchasers.

In another embodiment, the "purchased' content is stored at a content source provider facility (e.g., a studio's RAID or similar storage site), and the content streamed or bursted to the MSO facility (e.g., head-end or BSA hub) over virtually secure channels so as to maintain data (content) confidentiality and integrity, as well as provide for authentication and anti-replay protection. For example, one variant of this architecture uses well-known virtual private network (VPN) capability, wherein AES or similar encryption is used to encapsulate content packets for transmission over an untrusted or physically non-secure network (e.g., the Internet). Alternatively, a more secure or trusted network infrastructure between the content storage location and the MSO facility could be utilized. This infrastructure may be wired or wireless in nature, so long as it provides the desired data bandwidth and security capabilities.

In one such approach, requests to access content are processed by the MSO but serviced by content from one or more third party databases (e.g., the databases of studios or other content source can collectively act as the MSO's "virtual library"). Such servicing of content requests can be effectively real-time, with any encoding, annotation, inclusion of metadata, etc. performed essentially on-the-fly ("just in time" processing) if desired.

The ingestion process 206 shown in FIG. 2 acts to receive content from a source (such as a web server, studio, etc.) and groom or process this content into a format compatible with the MSO network. For example, such ingestion processing may comprise (without limitation): (1) decryption; (ii) authentication of the content source (to prevent, e.g., "spoof" attacks or providing false or surreptitious content); (iii) virus or other mal-ware screening; (iv) encoding, decoding, or transcoding; (v) protocol translation or encapsulation; and/or (vi) filtration, error correction, or other conditioning of the content. Metadata or other such ancillary data may also be appended to or associated with the ingested content, as described in greater detail subsequently herein.

Figure 2A:
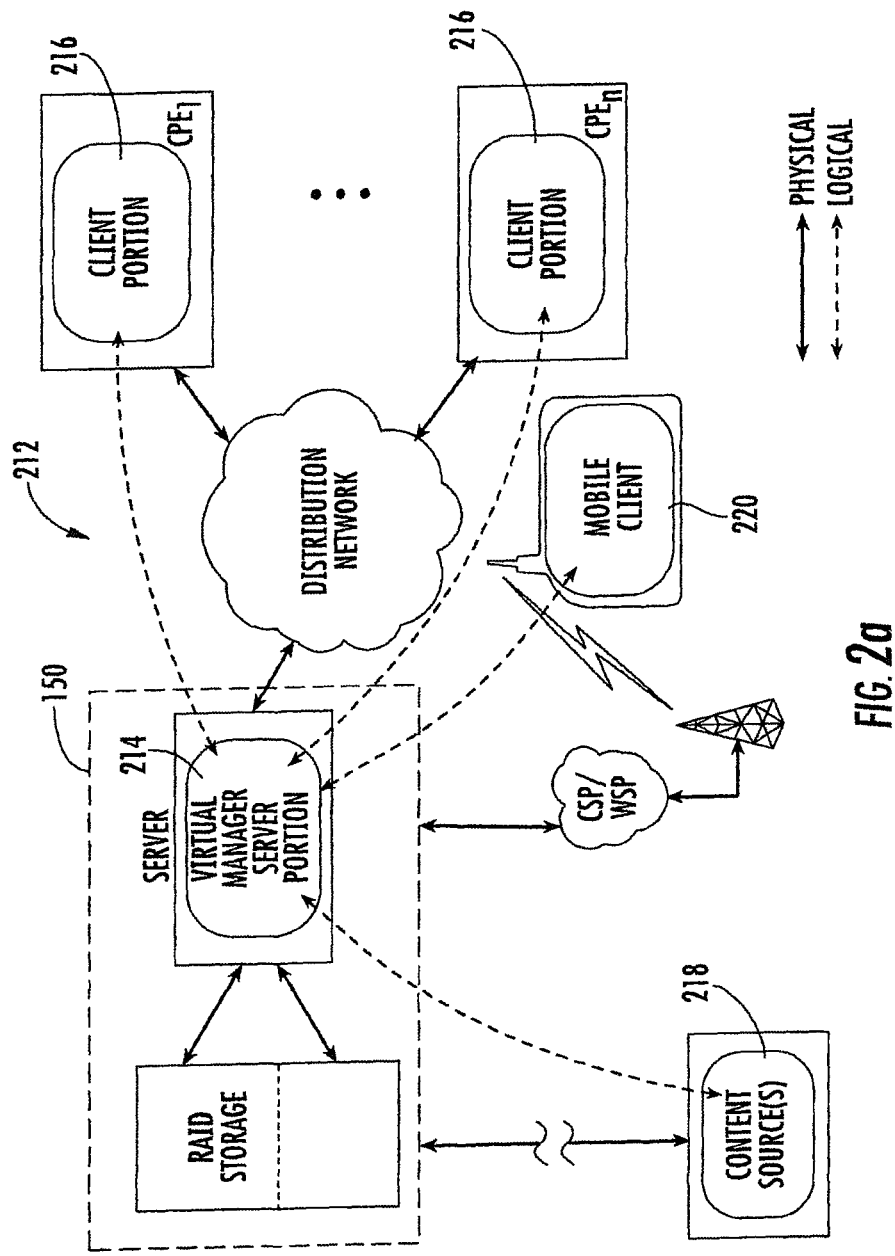
FIG. 2a is a functional block diagram of a first exemplary embodiment of the network logical topology of the exemplary virtual content management architecture (VCMA) of FIG. 2.

FIG. 2a illustrates one exemplary network logical topology 212 according to the invention. Specifically, a client-server software architecture is employed to provide the "virtual content manager" functionality using, e.g., an object-oriented distributed application (DA) of the type well known in the art. As shown in FIG. 2a, the server portion 214 of the DA, which in the illustrated embodiment can also function as the virtual content manager (VCM), is disposed at the head-end 150 of the network (such as on a VOD server or BSA manager 198), while the client portion(s) 216 are disposed at the premises CPE 106 (or CD, discussed subsequently herein). The content source process 218 is also in communication with the server portion 214, so that inter alia the content source can coordinate transfer of purchased content (or content prior to purchase) to the MSO network, e.g., the RAID storage, for supply to the CPE 106. The DA client portion 216 of the exemplary embodiment can communicate with the server portion 214 via any number of different channels including, e.g., an OOB upstream channel; in-band upstream channel allocated for this purpose, or a TCP/IP DOCSIS channel.

Communication channels outside the MSO network can also be used, such as an ISP DSL, dial-up, T1, ISDN, or other such data or telecommunications channel. The server portion 214 may also be adapted to include a protocol stack (e.g., TCP/IP) for communication via an Internet website, such as where the user can interface with the website via a mobile or remote device (e.g., WAP 2.0 enabled mobile handset) 220 to purchase the content, configure the various delivery parameters and options associated with the purchase, etc.

It will be appreciated that the "client portion" 216 may also advantageously comprise a portion of a VOD or PVR application, such as those capable of utilizing LSCP or the like to control the streaming of the content. Hence, when using the VOD delivery mechanism, the session initiation, control, and tear-down may be substantially similar to those of existing VOD systems. The client portion may also, however, be integrated with other types of applications (e.g., EPG, WatchTV, etc.) as well if desired.

Figure 2B:
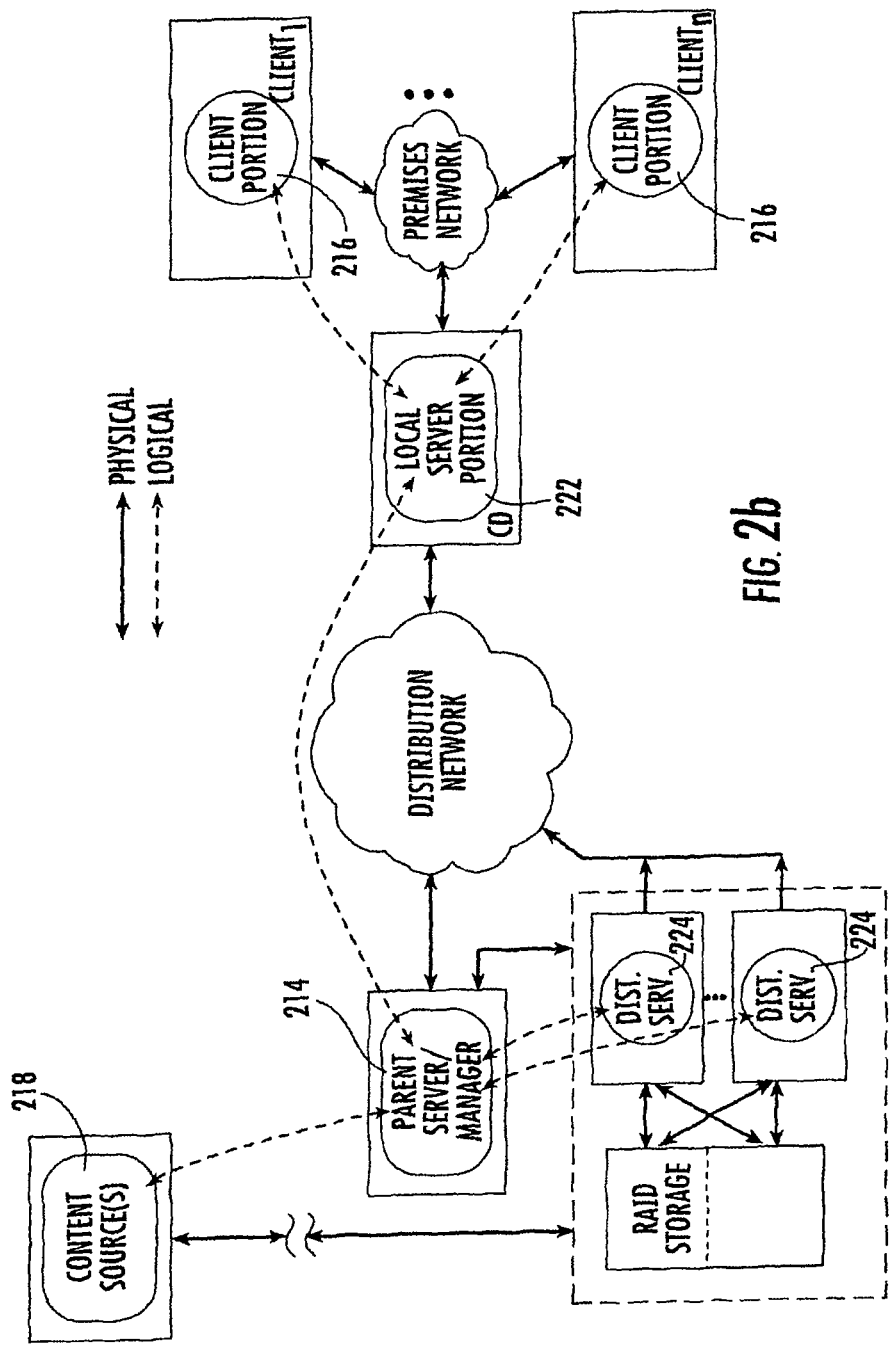
FIG. 2b is a functional block diagram of a second exemplary embodiment of the network logical topology of the exemplary virtual content management architecture (VCMA) of FIG. 2.

FIG. 2b illustrates another exemplary embodiment of the network logical topology 212. Specifically, this topology includes a local server portion 222 in communication with both the server portion 214 and the client portions 216, The server portion 214 comprises a "parent" virtual manager process that is also in communication with one or more distribution server processes 224, the latter controlling the distribution of the stored or streamed content to the purchaser. Hence, in this embodiment, the local server portion 222 of the DA functions as a proxy for the parent manager portion, thereby alleviating the latter from much of the burden of selecting, purchasing and downloading/playing the content. Any interposed communication channels used in the embodiment of FIG. 2a for server/client communications are accordingly less loaded using the approach of FIG. 2b, since the local (proxy) portion handles many of the operations. At least some communication between the local and parent portions is typically required, such as for purchase authentication (such as with a remote trusted authority), authentication of the local proxy to the parent, and so forth; however, this is reduced over that associated with the embodiment of FIG. 2a.

FIG. 2c illustrates yet another topology useful with the present invention, wherein one or more content source processes 218 are in communication directly with the purchasers (e.g., MSO subscribers) via a client device such as a mobile phone, PDA, PC, PMD, laptop, etc. The client device 228 (which may or may not include a client portion 220 of the DA) communicates 230 with the content source process 218 via, e.g., the user's CSP or WSP, such as where a WAP 2.0 gateway is used, with the content source process 218 comprising the WAP peer to the mobile device. As is well known, the user's purchase data (e.g., billing information, MSO account number, CCN, etc.) can be passed via tunneled or encrypted packets across an untrusted network such as that of the CSP (and the Internet if required), such as via WTLS security provisions in the exemplary context of WAP 2.0. The well known 802.1x and WEP/WPA technologies can also be utilized in conjunction with a RADIUS server, as can any other protocols and security features well known to those of ordinary skill.

Once the content source has completed the purchase transaction from the user, it then utilizes the MSO-relevant information, and the illustrated network interface 232 to communicate 234 the content to the MSO, e.g., the storage facility 236 shown in FIG. 2c. For example, any number of well known message protocols (e.g., FTP or the like) can be used to transfer the content ideally at high speed to the MSO, along with the purchaser's identifying information and any terms or conditions of the purchase (e.g., finite duration, limited number of views, etc.). The content may also be a "blank" (i.e., uncoded), or coded particularly for the user's preference/equipment (this information which may be previously stored as part of the user's account; e.g., at the MSO server portion or other such data repository).

This approach is desirable from the standpoint that the content source can set its own business rules or policies, and simply communicate instructions to the MSO on how to implement these policies. These content source policies may or may not be consistent with those of the MSO. For example, the MSO might offer certain content for sale (via, e.g., the topology of FIG. 2a) under a first set of terms, while the content source offers the very same content for different terms, yet delivers it over the MSO's network to the purchaser. To this end, a "parity" system can optionally be employed, wherein an algorithm running within the VCM 214 can determine the MSO's offerings as compared to one or more third party content sources, and match the MSO's terms and conditions to the "best" third party offering (or beat that offering), so as to provide the user with incentive (or at least no disincentive) to purchase the content from the MSO. In this fashion, the parity algorithm of the present invention acts as an on-line "match the lowest price" incentive that many retailers currently use for other goods or services.

As used in this context, the term "best" may refer to the terms of one third party source, and average or other compilation of multiple sources' terms, the aggregation of the most favorable terms taken from a group of sources, and so forth.

Alternatively, the MSO can maintain a local copy or "library" of content from the source 218, and the content source process 218 merely communicates the relevant subscriber and purchase information to the MSO server portion 214, causing the server 214 to enable download or broadcast of the purchased content to the subscriber. Again, this may be on the same or different terms than a comparable offering by the MSO, or another content source.

When the user is ready to view their content, they issue a request 238 to the MSO server portion, such as via any indigenous protocol (e.g., LSCP in an exemplary VOD system), to which the server portion 214 responds by initiating streaming (or broadcast) 240 of the content, after all necessary authentications and other requirements have been satisfied.

Figure 2D:
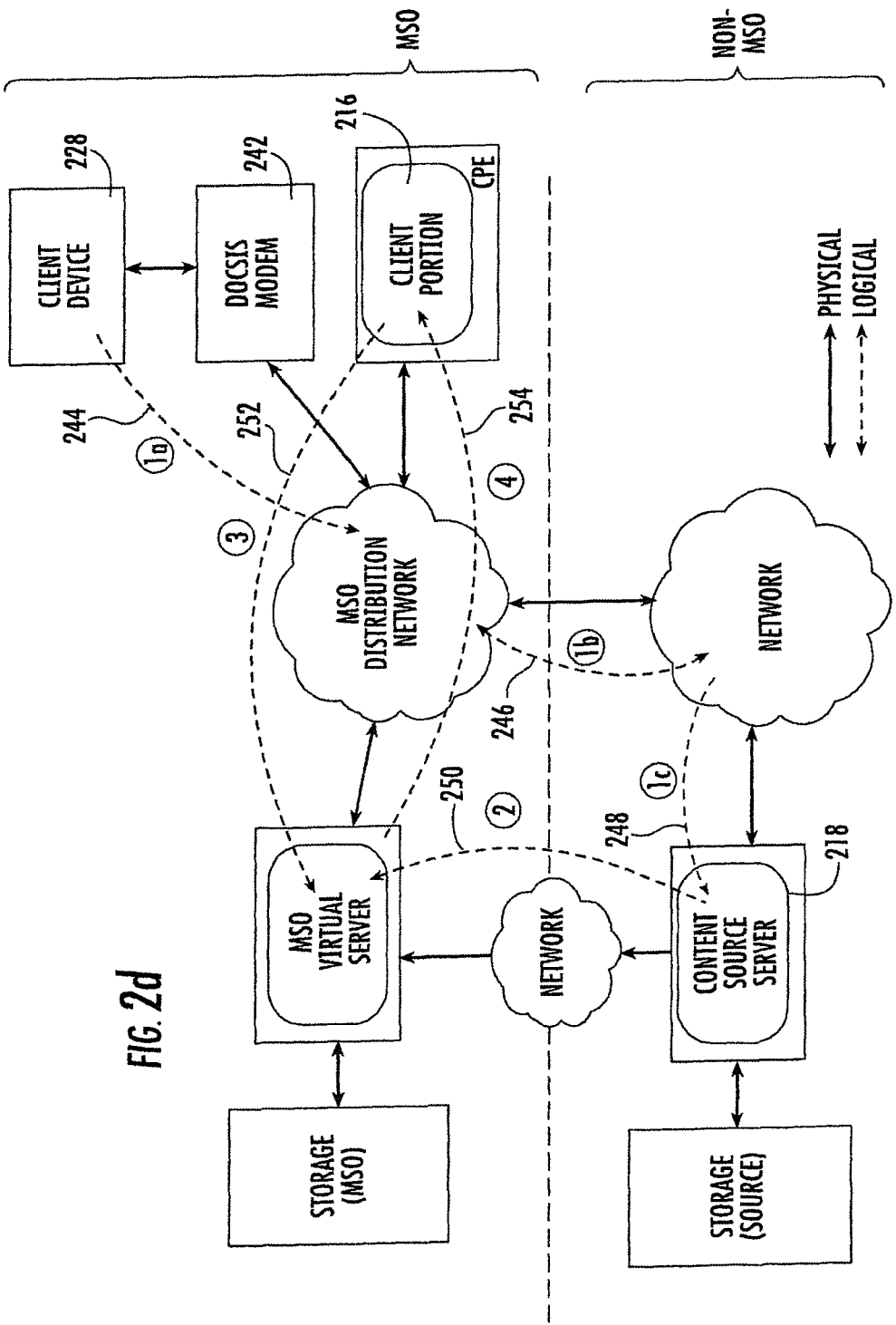
FIG. 2d is a functional block diagram of a fourth exemplary embodiment of the network logical topology of the exemplary virtual content management architecture (VCMA) of FIG. 2.
Figure 2E:
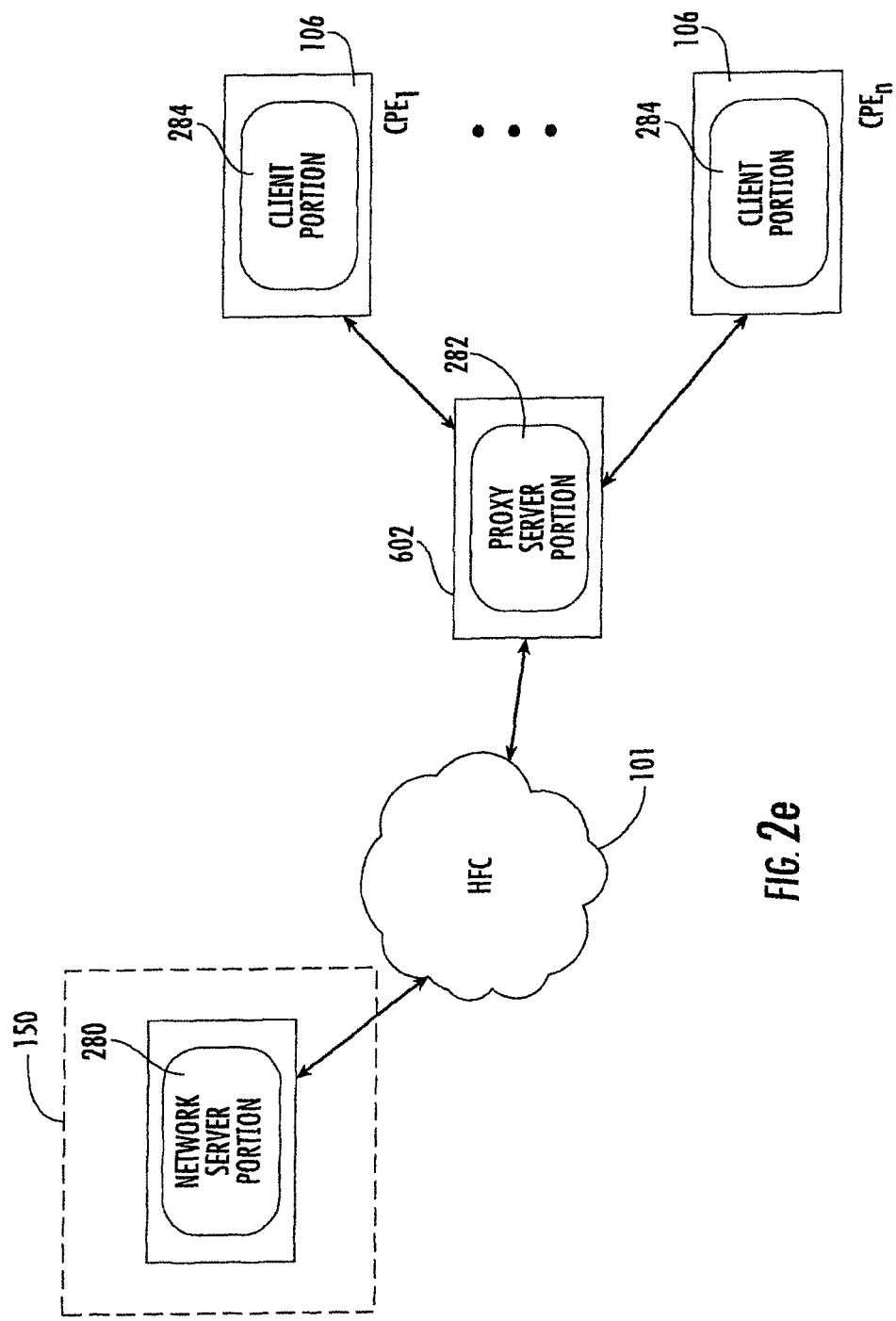
FIG. 2e is a functional block diagram of a fifth exemplary embodiment of the network logical topology of the exemplary virtual content management architecture (VCMA) of FIG. 2, adapted for an exemplary premises gaming application.

Referring now to FIG. 2d, yet another exemplary embodiment of the network topology is described. As shown in FIG. 2d, this configuration utilizes communications between the MSO subscriber's client device and the third party content source for purchase of the content. Specifically, in the illustrated variant, the client device 228 first communicates 244 with the MSO network via a DOCSIS modem 242 or other such interface, which then relays the communication to an external network (e.g., Internet) 246, which in turn passes the communication 248 to the content source server 218. For example, the user's PC or WiFi connected laptop at their premises can access the content source website using e.g., the PC's browser and TCP/IP protocols, via the indigenous DOCSIS modem. In the illustrated example, the client device 228 and the content server 218 act substantially as peers, and the interposed networks providing physical media and routing functions, although it will be appreciated that other approaches may be used (e.g., such as where processing, reformatting or encapsulation, security wrappers, etc. are applied to the packets issued by the client device by the intermediate networks, routers, and gateways).

After the content source receives the communications from the client device, it then communicates 250 with the MSO server portion 214 as previously described with respect to FIG. 2c. The subscriber's client portion 216 then subsequently communicates 252 with the server portion 214, requesting e.g., streaming or broadcast of the purchased content. The MSO server portion (or its proxy) then streams or broadcasts the content 254 to the client portion 216, or a designated target client device (e.g., one associated with a network or CD on the premises).

It will also be recognized that the use of a cable (e.g., HFC) network as the basis of the illustrated embodiment can provide several salient benefits and advantages over other modes of delivery, e.g., PC-based streaming or download over an IP network such as the Internet. Specifically, the cable system carried enhanced security as compared to the Internet, the latter being a notoriously untrusted network having no indigenous security measures. In untrusted networks such as the Internet, users must "tunnel" packets across the network using a VPN or similar approach (e.g., secure sockets, TLS, or comparable transport layer security), or provide application layer encryption or the like. In contrast, the typical cable environment can be considered a trusted domain and hence more difficult to "hack", since it utilizes a variety of physical security measures for at least portions of its physical run (e.g., the various links within the system utilize physical measures to exclude access, and/or protocol to preserve the security of the link). Cable systems also provide their downstream content in an encoded and multiplexed stream, and can be configured to utilize application or other layer encryption protocols (sealers) such as AES or DES to ensure both a) data and source integrity (i.e., assurance that the data has not been tampered with) and b) confidentiality (prevention of access by unauthorized parties).

Cable systems can also be configured to authenticate their users and/or their CPE 106 if desired, thereby assuring user integrity (i.e., prevention of a false user standing in place of an authorized one, or "spoofing"). Such authentication may be via a SIM (subscriber identity module) or comparable approach, user PIN, link or other key (e.g., public/private encryption key), RAND and SRES challenge/response approach, etc.

Additionally, the cable network in-band paradigm previously described offers the potential for significantly higher download speeds (i.e., greater than 6 Mbps cable modem speeds), thereby reducing the time needed to download a given content to the user and accordingly increasing their satisfaction in using this service. It will further be recognized that even higher rate systems may be used consistent with the invention, including those exceeding 1 Gbps, thereby providing a very high speed download, and hence very low latency associated with the viewing or access processes described herein. With such low latency, this very-high speed download capability can support an alternate delivery model to normal in-band streaming; e.g., download and playback versus streaming.

Local Content Insertion—

It will be appreciated that while the embodiments of FIGS. 2-2d are shown generally with the server portion (virtual manager function) disposed at the MSO cable network head-end 150, one or more of the illustrated components and/or processes can be disposed at other locations within the network, such as where the server portion/manager and virtual content database are disposed at a local hub site within a BSA network.

For example, in this alternate embodiment, once content has been selected by the subscriber for delivery, the locally stored copy of this selected content can be inserted directly into the hub delivery system such as by, e.g., switching the BSA hub switch to include this content stream issued by a local delivery device coupled to the local storage. Note, however, that even a VOD or other session-based architecture can use this paradigm; e.g., by instantiating a VOD session using a local VOD server that is coupled to the local storage repository (e.g., at a network hub), as opposed to one disposed at the head-end 150.

These smaller local nodes can also be equipped to "fetch" purchased content from a larger repository (e.g., the head-end 150, a third party storage facility, content source, etc.) in the even that a particular content is requested that is not locally stored when requested. In one variant, the high-speed download capabilities described in co-owned U.S. application Ser. No. 11/013,665 filed Dec. 15, 2004, entitled "Method and Apparatus for High Bandwidth Data Transmission in Content-Based Networks", and issued as U.S. Pat. No. 8,522,293 on Aug. 27, 2013, incorporated herein by reference in its entirety, are utilized for this purpose, in order to reduce the latency of this process. However, rather than a head-end server-to-CPE link, the present embodiment utilizes a head-end server-to-hub site server link. In-band downstream QAMs already instantiated for other purposes may also be used for this link.

Hence, this exemplary feature of the invention operates somewhat like a BSA network, in that it selectively "switches in" purchased content to the local repository based on user activity/presence, yet makes content that is not switched-in at a given point in time readily available via the aforementioned dynamic fetch/insertion process.

The techniques for minimizing the size of the stored content database described elsewhere herein are especially useful for configurations where the storage is decentralized or pushed out to the edge of the network, such as for example those at the BSA hub site.

Broadcast Delivery Modes—

In addition to session-based modes, the virtual content delivery of the present invention may include broadcast modes including, inter alia, those over a broadcast switched architecture (BSA) such as that previously described with respect to FIG. 1c.

In one variant of this approach, the purchaser of content is given a special channel allocation to which their tuner is tuned (either automatically or manually), somewhat akin to normal BSA operation where a single user on a hub is viewing a program channel (thereby keeping it "switched in" for delivery at the hub switch), with the exception that no other users on that hub are capable of tuning to that channel. This gives the purchaser exclusivity for their particular purchased content. The head-end or hub site (depending on whether a centralized or local content architecture is used as described previously herein), upon receiving the user's request for viewing, spawns a broadcast of the content over the designated QAM channel(s), and instructs that particular user's CPE to tune to that QAM (or collection of QAMs in a wideband tuner approach such as that described in co-owned U.S. patent application Ser. No. 11/013,671 filed Dec. 15, 2004, entitled "Method And Apparatus For Wideband Distribution Of Content", and issued as U.S. Pat. No. 9,723,267 on Aug. 1, 2017, incorporated herein by reference in its entirety). These tuning instructions can be delivered via, e.g., an in-band or OOB downstream message already indigenous to such networks.

However, unlike the exemplary VOD delivery paradigm previously described, delivery of the virtual content over the BSA network is broadcast only, and hence does not provide the user with the PVR-like "trick mode" features normally associated VOD (e.g., pause, rewind, etc.). Accordingly, users viewing their purchased content over the BSA network model will only be provided a PPV-like experience (except with unlimited viewings, and which can be instigated at any time of day). However, this "broadcast" deliver approach may be desirable for certain users, including those which do not have VOD functionality as part of their delivery network or subscription package. Also, certain PMDs or other client devices (and their supporting infrastructure) simply may not be able to effectively generate and relay upstream VOD commands (e.g., LSCP or the like), and hence can only view a broadcast delivery of the content.

Moreover, the lack of the PVR-like features can be compensated for via other mechanisms such as cost or other the provision of other complementary features or incentives. For example, the cost of purchase of a content title (e.g., movie) for broadcast delivery may be set significantly lower than the fully-enabled VOD/session-based counterpart. Or, a purchaser of a VOD-enabled version of the content may be given the opportunity to specify a "buddy list" which includes a limited number of family members, friends, etc. (whether for an additional fee or otherwise) who can view the content, yet again only on a broadcast basis.

Accordingly, one variant of the invention allows the user/purchaser to obtain two or more versions of the content (although these may actually comprise one stored version, as discussed elsewhere herein), so that they, or their designated buddies if that approach is implemented, can select the proper delivery paradigm for their current viewing context. This selection may also be made entirely automated, such as where the user's PMD transmits configuration information upstream to the virtual manager, which determines that the PMD is not VOD or session capable, and hence can only view a broadcast variant.

It will be recognized that while a BSA variant is described with respect to the foregoing embodiment, other types of broadcast paradigms can be used to fulfill the function of broadcast delivery of the virtual content.

It is further recognized that while the aforementioned embodiment of the broadcast mode makes such broadcast user-specific, one or more other subscribers or designated parties may be given access to the broadcast content if desired. For example, a user's family member who is remote from the user (e.g., on the road) can also receive the broadcast content via, e.g., a Slingbox type approach, or alternatively that described in commonly owned U.S. patent application Ser. No. 11/440,490 filed May 24, 2006 and entitled "Personal Content Server Apparatus And Methods"

previously incorporated herein, such as via an IP network and personal content server. This remote delivery can also be conducted from the local (e.g., BSA) hub site if desired.

In another embodiment, the aforementioned broadcast delivery mode can be utilized in conjunction with a "start over" or similar feature, such as e.g., the exemplary "Start Over™" capability offered by the Assignee hereof in select markets in the United States. Specifically, such start-over functionality allows the re-initiation of delivery of a program (e.g., restart of a broadcast or other program) so that subscribers who miss the start or a feature of interest can restart the delivery.

In the present context, this functionality may be implemented by providing the subscriber with an application or client function (e.g., client portion of the DA) that transmits a restart or similar command upstream the relevant component of the VCM architecture 200 (e.g., server portion 214 or its proxy) so as to re-initiate playing or streaming of the broadcast content from the virtual storage location previously described. In the local embodiments, this storage and retransmission may occur at the hub site or the like as opposed to the head-end 150.

Alternate Delivery Paradigms—

It will be appreciated that the present invention may be used with, inter alia, "streaming" (e.g., an ongoing or running transmission of content) and/or "download" (a complete or partial transmission of content followed by a subsequent playback or use) modes of delivery. For example, one variant of the invention streams content such as video according to a VOD or similar session-based protocol and with QoS requirements. Alternatively, a download paradigm is used, such as for downloading gaming applications, wherein a high-speed download capability such as that described in commonly owned U.S. patent application Ser. No. 11/013,665 filed Dec. 15, 2004, entitled "Method And Apparatus For High Bandwidth Data Transmission In Content-Based Networks", and issued as U.S. Pat. No. 8,522,293 on Aug. 27, 2013, incorporated herein by reference in its entirety. This high-speed download might be useful, for example, where the user has purchased a large "virtual" application or database to which they desire access. So as to avoid having to store the application/data locally, the virtual storage approach of the invention stores the application/data at the head-end, hub, etc., and then uses high-speed in-band download to provide it to the subscriber upon request with very little latency.

As yet another option, the CPE 106 and/or local premises DVR or similar device with sufficient storage or buffering capability can download all (or portions at a time) of the selected virtual content into temporary or ephemeral storage, and then play it back for the subscriber. In effect, a virtual image of the virtual content is being made within memory or ephemeral storage on the premises device, somewhat akin to loading RAM of a PC with code stored on the HDD of the PC. Here, the equipment (CPE or DVR) is configured to dump the content after playing it or after a prescribed period of time, such as using a FIFO approach. In this fashion, only a temporary or ephemeral copy of the protected content is made, thereby mitigating risk that it would be stored on a more permanent basis and reproduced without authorization. To this end, the downloaded content can also be encrypted, threaded with self-disabling data (e.g., if an unauthorized service domain attempts to record or play back the content), or utilize other such mechanisms for frustrating reproduction.

The foregoing temporary or buffered approach can also be made substantially opportunistic in terms of network downstream bandwidth usage, since the buffering or storage at the subscriber's premises allows for a range of delivery rates and schemes, including: (i) bursty streaming, wherein blocks of content are downloaded at high speed in a non-contiguous fashion; or (ii) block high-speed download and replay.

Hence, under scenario (i), non-contiguous blocks of relatively high bandwidth are required. Under scenario (ii), a single continuous block of very high bandwidth is required. The head-end server delivering the content (e.g., VOD server 105, application server 104, or otherwise), in conjunction with the VCM 214 (or autonomously once the content download decision has been handed off to the relevant server) therefore has the option to opportunistically use available bandwidth, even switching back and forth between these schemes in the same download, in order to avoid contention or achieve other operational goals (or accommodate operational conditions such as equipment failures or bottlenecking). For example, if sufficient bandwidth for the "high speed block" approach (scenario (ii)) is not available at the time download is to commence, then the lower-bandwidth non-contiguous block or (real time) continuous streaming approaches can be used. However, where a sufficiently large window of available bandwidth opens, the download to the temporary storage on the subscriber premises equipment can be invoked. This latter approach has the advantage of freeing up bandwidth more quickly, since there is less stranded bandwidth (i.e., unusable due to its timing or placement on a given QAM) as the algorithm in effect uses up stranded bandwidth blocks to complete the content download as rapidly as possible.

The aforementioned accelerated bursty approach also allows for a "rolling start" to a video; i.e., starting playback off the local (temporary) storage medium before all of the content has been received. This approach can reduce latency to the subscriber, since the playback need not wait for the download to complete, generally comparable to a streaming approach, yet with playback independent of the CPE tuner.

Other types of bearer mediums can also be used consistent with the cable system. For example, in one alternate embodiment, the requested data or content is streamed out-of-band (OOB) using the cable system's extant OOB infrastructure. While this path has typically much less data bandwidth, it is also far less loaded than in-band channels (QAMs). Alternatively, a hybridized approach can be used as previously referenced, such as where the data/content is sent in-band, yet where all or a portion of the communications necessary between the head-end and the CPE necessary to perform the purchase are carried OOB.

It will also be appreciated that different carrier and/or multiplexing schemes can be used for the delivery of content or data consistent with the present invention, the latter being largely agnostic to its bearer medium. While some of the exemplary embodiments herein are described primarily in terms of an OD infrastructure adapted to transmit data over a single physical channel (e.g., 256-QAM modulated carrier) at any given time, it will be recognized that this "physical channel" may actually comprise one or more carriers. For example, in one multi-carrier variant of the invention, the content/data is streamed over multiple physical carriers according to a multiplexing algorithm such as that described in co-owned U.S. patent application Ser. No. 11/013,671 filed Dec. 15, 2004, entitled "Method And Apparatus For Wideband Distribution Of Content", and issued as U.S. Pat. No. 9,723,267 on Aug. 1, 2017, incorporated herein by reference in its entirety. Under this approach, the data of a given TS can be multiplexed across a plurality of physical carriers, with the multiplexed signal being reassembled at the CPE 106 using a wideband tuner (or a plurality of related tuners). Information from the head-end as to the multiplexing scheme and channels used is provided to the CPE in order to enable it to de-multiplex (and decode) the multiplexed transport stream. Hence, for the purposes of the present invention, the aggregation of multiplexed channels acts like a single QAM.

As yet another option, two or more QAMs within the network can be established simultaneously (as part of a single session, or alternatively two distinct but related sessions) to achieve one or more desired objectives, such as an increased download speed or statistical multiplex pool size.

Virtual Data Storage—

It is also envisioned that, e.g., "virtual hard drives" can be maintained for subscribers of the aforementioned networks (or other designated users), thereby giving their CPE 106 or CD (and any connected devices) literally terabytes of storage that they could not otherwise have using their home PC, etc. This can be used for any number of different reasons, such as: (i) purely for archival or back-up purposes, (ii) to permit access to a data volume by multiple MSO subscribers, (iii) to maintain the security of the data (i.e., when no local copy is present at the subscriber's premises, theft of their computer from the premises is much less troubling), or (iv) merely to provide the subscriber with storage volume that they could otherwise not obtain. Depending on the bandwidth allocated to the download (e.g., a "burst" mode with ultra-high downstream bandwidth), the access latency can be kept quite low.

This capability becomes increasingly significant with respect to PCs and mobile computerized devices, some of which are now migrating toward operating systems and applications that are stored entirely on removable media (versus the hard drive of the PC, etc.). Hence, using the aforementioned "virtual" hard drive and content storage capabilities, the content and operating system of the subscriber's PC or mobile device can reside entirely off-device, including at the MSO head-end or other such location if desired. Moreover, the data volumes for each subscriber may be encrypted, authenticated, and made physically secure, thereby providing a level of protection that exceeds that of the normal home PC, PMD, or the like.

These data volumes or "virtual hard drives" can also be made part of a business paradigm; e.g., wherein the user pays a fee (such as on a per-Tb used) or subscribes for X terabytes of storage space for a given period of time.

Methods—

Figure 3:
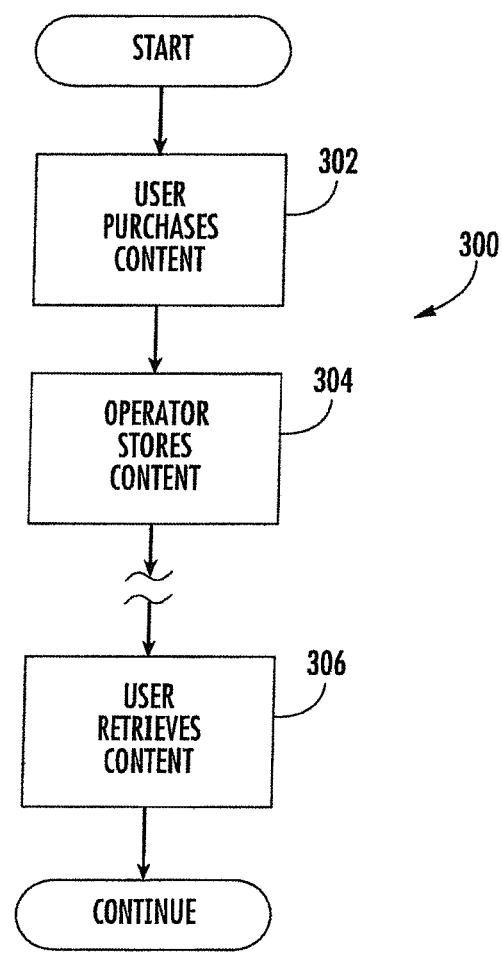
FIG. 3 is a logical flowchart illustrating the generalized virtual content storage and delivery methodology according to the present invention.

Referring now to FIG. 3, an exemplary embodiment of the generalized method of storing and delivering virtual content over a network is described. It will be appreciated that while the following embodiment is described primarily in terms of an on-demand (OD) "session" based model delivering content over an in-band channel, the present invention is equally adapted to non-OD models such as broadcast (described in detail subsequently herein), data/content download via a cable modem (e.g., IP transport modality), out-of-band (OOB) communications channel, etc., the VOD exemplar being merely illustrative of the broader principles. For example, one alternative is to use a cable (e.g., DOCSIS) modem or high-speed data (HSD) link of the type well known in the networking arts to download the content for playback on a connected device such as a PC or DSTB with the proper decoder. A high data-bandwidth wireless channel such as a broadband satellite or millimeter wave channel, can also be utilized. Portions of the downloaded content (or any associated metadata or other related data such as annotations or personalizations, described subsequently herein) can also be transmitted via separate homogeneous or heterogeneous channels if desired. Myriad different approaches can be used with the present invention, the latter being functionally agnostic to the modality used for content/data delivery.

In a first step 302 of the method 300, the desired content is made available for purchase, and purchased by a user (e.g., MSO subscriber). As described in greater detail subsequently herein, this purchase may be pursuant to a user request for the content (or a listing of the available content) instigated from the CPE 106 or a client device, or may be as a result of interaction with a third party (e.g., content source) web server, operator or other such network agent.

Next, per step 304, the purchased content is delivered to the storage facility (if not already there), and the content stored.

Lastly, per step 306, the purchased and stored content is delivered to the target device (e.g., customer CPE 106 or client device) via a communication channel. Upon receipt, the target device either conducts playback of the content, such as the playing of an MPEG-2 stream, or alternatively the playback of a compressed video file downloaded at high speed, or even the installation and execution of an application.

It will be appreciated that the delivery of the purchased content may occur immediately, e.g., immediately after or even contemporaneous with storage, and/or may occur at a subsequent time or date, depending on the purchaser's preferences.

Moreover, the downloaded content may be optionally disposed onto a recording medium at the user's premises; see, e.g., U.S. patent application Ser. No. 11/080,693 filed Mar. 14, 2005, entitled "Method And Apparatus For Network Content Downloading and Recording", and issued as U.S. Pat. No. 8,028,322 on Sep. 27, 2011, previously incorporated herein, which discloses exemplary download and recording mechanisms for use in, e.g., a consumer premises or enterprise.

Figure 3A:
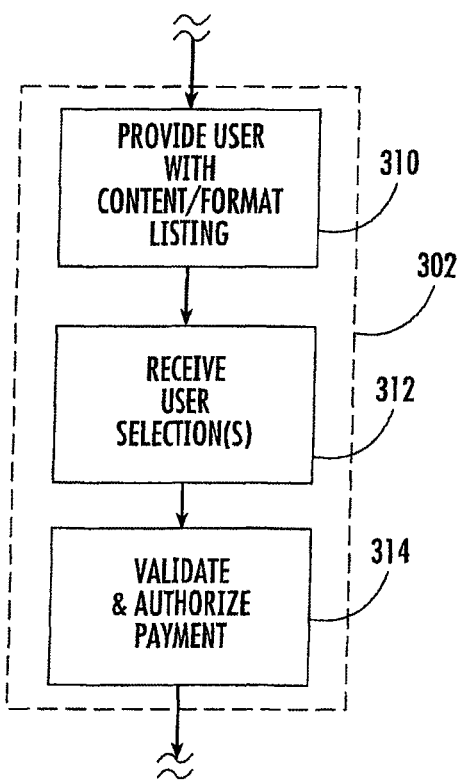
FIG. 3a is a logical flowchart illustrating a first embodiment of the user purchase methodology of FIG. 3.

Referring now to FIG. 3*a*, one exemplary embodiment of the user purchase step 302 of FIG. 3 is described in detail. As shown in FIG. 3*a*, the method of purchase comprises first providing the user with a listing of available content, comprising e.g., one or more entries corresponding to different content titles, encoding formats, features, purchase options, and so forth, via a user interface. For example, one variant of the invention utilizes an on-screen display or GUI, generally similar to the well known electronic programming guide (EPG), that lists the various choices available for purchase. These might be indexed by category (e.g., feature length movie, gaming application, video "shorts", music, etc.), and sub-indexed by genre (e.g., comedy, drama, etc.), alphabetically by title or primary actors, etc. Alternatively, a user might simply be presented with a short GUI menu or pop-up display mechanism (e.g., window) listing new releases for that week or month. The user interface can be invoked in response to a user request, such as for example by selecting a button on the user's remote that interacts with their CPE 106, at a pre-designated periodicity (e.g., once per week), upon the occurrence of a particular event (e.g., new release), or at the instigation of the MSO, although myriad other approaches will be recognized by those of ordinary skill.

It will be appreciated that such user interface is not limited to the MSO network domain either. For example, as described in greater detail subsequently herein, the user interface may comprise part of a PMD or mobile device (e.g., PDA or smartphone), which can access the MSO virtual database manager from a remote location or network.

Next, per step 312, the user designates one or more content items for purchase, such as by selecting one or more interactive elements on the EPG, GUI menu, etc. Exemplary user interfaces, on-screen menus and related functions generally useful with the present invention are shown and described in U.S. patent application Ser. No. 11/080,693 filed Mar. 14, 2005 previously incorporated herein (see, e.g., FIGS. 2b-2e therein), although it will be appreciated that any number of other approaches may be substituted or combined with those described herein, including e.g., speech recognition and text-to-speech interfaces. For example, a "one button" approach, such as a select-to-order icon, can be employed for streamlining purchases. In such a case, various menu steps are obviated, thereby making the selection and payment process easier and more enjoyable for the user. In another variant, most or all of the ordering functions are disposed on a common menu.

Once the user makes their selection(s), this information is transferred to the virtual content manager (e.g., server portion 214) via an upstream communication channel, DOCSIS modem, ISP connection, or other modality appropriate to the user's situation. The user's selection (e.g., availability) and payment information are then validated (step 314, such as by the VCM 214 accessing a subscriber database associated with that user (as determined by, e.g., TUNER ID, MAC, or other information uniquely identifying the requesting CPE/subscriber.

Menus or other user interfaces may also be generated for receiving user preferences (e.g., format, particular versions of the same content, codec selection, and so forth). This information can be transmitted to the VCM 214 at time of selection, or alternatively at another time (such as being pre-stored in a configuration file disposed in the head-end or other location directly accessible to the virtual manager).

Advantageously, the present invention may be used consistent with any number of different payment options, including for example: (i) payment via billing to the user's existing cable subscription (whether based on a monthly fee, a "per-purchase" paradigm similar to PPV, trial basis, or other), (ii) direct payment via a credit/debit card (e.g., wherein the user enters their credit/debit card directly, or has it stored in a secured location for easy recall), or (iii) via an electronic payment service such as "PayPal" or the like. The selection may also be made as part of a promotion or in exchange for services by the user, such as where the user agrees to submit a review of the film (or the service itself) in exchange for "virtual" access. Models based on user discount or promotional codes are also envisaged.

It will be recognized that a preview or other sampling of the target content may also be employed as part of the method of FIG. 3a. For example, the user may be given an opportunity to watch a short trailer, or selected vignettes from the content, before having to commit to a purchase (see discussion of exemplary embodiments elsewhere herein). They may also optionally be given the opportunity to consult rating (e.g., user ratings) data or other sources of information which may help form the purchase decision.

Figure 3B:
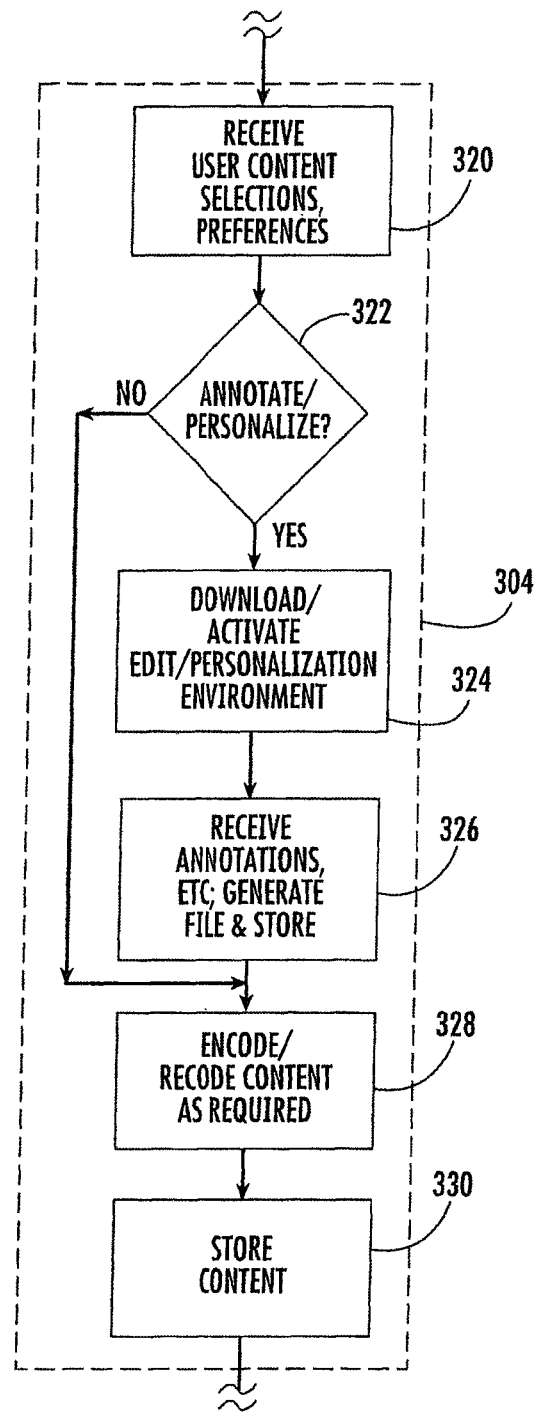
FIG. 3b is a logical flowchart illustrating a first embodiment of the content storage methodology of FIG. 3.

Referring now to FIG. 3b, one exemplary embodiment of the content storage method (step 304 of FIG. 3) is described. In this embodiment, the user's content selections and preferences, which may be received either at time of purchase or pre-stored (as previously described with respect to FIG. 3a), are received by the VCM 214 per step 320. If annotation or personalization of the content as described elsewhere herein is required (step 322), the user can then optionally be provided with the editing/personalization environment for such tasks using e.g., their CPE, PC, CD, or PMD (step 324). This environment may be downloaded to the user directly, obtained from a third party site, or if already in residence, merely activated such as by downstream communication from the VCM.

If/when the user has entered their desired annotations or personalizations, this information is transmitted upstream (e.g., via OOB message, DOCSIS modem, etc.) to the VCM, and stored in a file within the content database, that is associated with the selected content (step 326).

Per step 328, the selected content is optionally encoded or recoded as required (e.g., such as where the content requires encoding into the format requested by the user), and then stored within the virtual database (step 330) for subsequent access. The content can alternatively be coded "on the fly", such as immediately preceding streaming over a VOD session.

Note that the storage of step 328 need not necessarily occur at this stage of the method 300 (or at all); rather, another variant of the method allows the VCM to merely identify the subscriber as a valid purchaser, hence permitting them access to content that has already been stored. Contemporaneous storage may be used, however, where the content is new to the virtual database, or otherwise must be modified, such as for a specific purchaser's preferences. Along these lines, the present invention optionally utilizes a storage optimization algorithm which is part of the VCM architecture 200; i.e., rendered as a computer program running within the architecture, such as on a virtual content server, VOD server, SRM, etc. This optimization algorithm is structured to store content in a more space-efficient and operationally efficient manner. For example, in one variant of the invention, common titles virtually owned by a plurality of subscribers are stored as a lesser number of files or data structure within the database in order to avoid undue replication of identical content. Should the owning users require different encodings, apply different personalizations or annotations, and so forth, these differences are applied when the content is called up for access by the particular users. The algorithm can also be constructed to dynamically manage and vary the number of copies of content accessible by users as a function of one or more other parameters including, e.g., time of day, historical demand for that title as a function of date/time, number of virtual owners of that content whose CPE are presently on the network (as determined by their TUNER ID, MAC, upstream messaging, etc.), and so forth.

As part of step 304, the user can optionally be notified that his/her selected content or data will be available for viewing or access once the transaction is authorized. As part of this notification, the user may also optionally be provided any cryptographic data (e.g., key seeds, public/private key pairs, challenges/responses, etc.) required to complete the viewing and decrypt the content if encrypted. This cryptographic data may also be sent via a separate data channel (e.g., OOB or IP) in order to minimize the chance of interception of both the content and the crypto by a single entity.

Figure 3C:
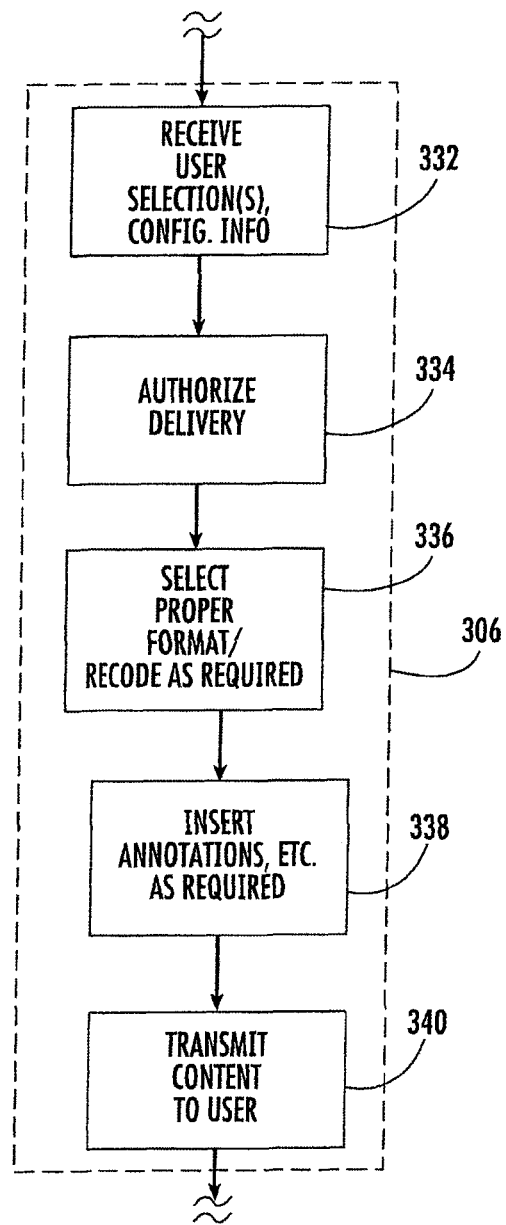
FIG. 3c is a logical flowchart illustrating a first embodiment of the content retrieval/delivery methodology of FIG. 3.

Referring now to FIG. 3c, one exemplary embodiment of the content delivery method (step 306 of FIG. 3) is described. In this embodiment, the user provides to the VCM one or more content selections and preferences for content they have previously purchased, such as via a menu selection of an EPG or on-screen guide. The VCM receives the selection(s) and delivery preferences (if any) per step 332, and then authorizes the delivery (step 334). This authorization may include verification that the content is ready for release (i.e., the value of the stored REL_DATE or comparable parameter is exceeded by the current system clock coordinates), as well as authentication of the CPE or other device requesting delivery. This authentication is useful in preventing "spoofing" of the VCM, such as by another device masquerading as a valid subscriber CPE. Methods and apparatus for performing such authentication are well known in the art, and accordingly not described further herein.

Next, per step 336, the user's selections/preferences are used as the basis for selecting the proper variant of the content (e.g., where multiple different variants are present). For example, the virtual database may contain different variants encoded into MPEG-2, MPEG-4, and Real formats. Or, the database may contain the original release of a film, and a subsequent enhanced re-release. If any modification or conditioning of the stored content is required (such as recoding, encryption, compression, etc.), this is also performed per step 336.

Per step 338, any annotations, personalizations, or other additions to the content are inserted. In one variant, this process comprises accessing an associated data or metadata file for that content and specific to the requesting purchaser, and "inserting" this secondary content into the primary or requested content. It will be appreciated that any number of different techniques can be utilized for such insertion, including for example: (i) merely transmitting the data/metadata file to the requesting CPE/CD/client as a separate data structure, and allowing the indigenous processing and software of the CPE/CD/client to unpack the file and insert the data/metadata as appropriate; or (ii) performing the insertion of the data/metadata directly into the media stream during streaming, such as based on SI references or other coordinates referenced to the media. For example, as discussed elsewhere herein, one aspect of the invention comprises receiving user annotations or personalizations via an editing/authoring software environment, with this data referenced to particular portions or scenes of the content. Hence, the VCM can access the file containing this data at time of streaming, and insert the necessary data at the prescribed locations, thereby. providing the user with a seamless (and personalized) viewing experience, with the annotations actually present in the content as viewed. Alternatively, a software application running on the CPE/CD/client is utilized in another exemplary embodiment to take the required actions specified by "markers" associated with the streamed data; e.g., generate a pop-up window on the user's display that contains the annotations. Myriad different schemes for generating user-customized content will be recognized by those of ordinary skill, and accordingly are not described further herein.

Various other types of functionalities may be included within the data/content delivered to the purchaser. For example, in one embodiment, digital copyright data is included within the recorded data/content, such as well-known digital watermarking data of the type authorized under the United States Digital Millenium Copyright Act (DMCA). For example, Digimarc®, SysCoP™, EIKONAmark™, and other similar commercially available watermarking approaches can be used. Media rights management systems such as the Microsoft Windows® Media Digital Rights Manager, may be used as well. Various types of steganographic approaches may also be employed consistent with the invention in order to enforce copyright and provide the copyright owner with accountability and/or trace-ability of reproduced versions of their copyrighted material.

In one embodiment, the digital rights management (DRM) insertion occurs at the content source, before delivery to the MSO network. In another embodiment, the DRM is inserted by the MSO after receipt of the content; e.g., (i) before storage; or (ii) after storage but before transmission to the requesting user(s).

In yet another embodiment, the DRM insertion occurs at the user's CPE or CD, such as by way of the methods and apparatus described in U.S. patent application Ser. No. 11/080,693 previously incorporated herein.

In another aspect of the invention, a user-specific DRM insertion process is utilized, such that the DRM content (e.g., watermark, steganographic data, etc.) inserted into the purchased content in a user-specific fashion that can be used to trace the origin of the content. For example, a cryptographic public key portion and data, or other such mechanism, can be embedded into the content without notice of the user; this data will be reproduced as part of the surreptitious content copying, thereby also being present in the media on which the content is copied. This approach provides significant copyright protection and law enforcement capabilities, since it basically acts as a pointer to the individual or account from which the content was obtained.

Lastly, per step 340, the content is transmitted to the requesting purchaser's CPE/CD/client, such as via a session between the content server and the CPE (e.g. VOID) that transmits the content over one or more in-band downstream QAMs. Alternatively, delivery may occur via a broadcast (e.g., BSA) mode, an IPTV (e.g., MPEG over IP) mode, via satellite link, or any other mode having suitable bandwidth and quality of service (QoS).

Delivery may also occur to remote or visited networks; e.g., to client devices that are outside the MSO or "local" delivery network. Co-owned U.S. patent application Ser. No. 11/440,490 filed May 24, 2006 entitled "Personal Content Server Apparatus and Methods", and issued as U.S. Pat. No. 8,280,982 on Oct. 2, 2012, which is incorporated herein by reference in its entirety, discloses exemplary apparatus and methods for delivery of content to remote client devices and networks, although it will be recognized that other apparatus and techniques may be used for this purpose.

In other variants, a user session based on the Session Initiation Protocol (SIP) is used for delivery, whether with the same or another bearer medium such as a non-VOD approach, or a WAP Wireless Session Protocol (WSP) session disposed on a handheld device, and so forth. It is noted that in such SIP or WAP variants, the initiating device need not necessarily be the target device (e.g., DSTB) to which the content is streamed. Rather, the SIP or WAP-enabled device can act as a session proxy for the DSTB or other target CPE, such as where the user utilizes their SIP-enabled FDA to communicate with a head-end or other content-providing network entity to establish the download session. The VOD session is selected in the illustrated embodiment, however, since it advantageously comprises an already-installed service base thereby requiring little modification or infrastructure upgrade to implement the capabilities of the present invention.

Accordingly, it will be appreciated that the methodology of FIG. 3 advantageously is substantially agnostic to the bearer medium, and amenable to redirection (i.e., purchasing, customizing, and receiving the content can all be conducted at different locations or using different platforms). For example, the user might purchase the content using their mobile PMD or FDA, view and add annotations via their home CPE (DSTB), monitor, remote, and allow another family member or "buddy" to view the content using a laptop or PMD via e.g., IPTV delivery, "slingbox" delivery at a remote location, or delivery at a remote location via the methods and apparatus of U.S. patent application Ser. No. 11/440,490 filed May 24, 2006 previously referenced (e.g., via a personal content server disposed at the head-end or BSA hub).

The aforementioned VOD or other session (or user-specific broadcast in the BSA variant) per step 340 may be initiated promptly, e.g., automatically upon authorization of the transaction, or alternatively at another time selected by either the MSO or the user (such as, e.g., at a pre-determined day or date when the content is to be released). Similarly, if the target CPE (e.g., DSTB) has multiple RF tuners and one is available, data/content streaming or download can be initiated immediately, or as soon as a tuner becomes available when all are initially in use. Likewise, if the CPE has a single tuner, the data/content streaming or download is initiated when that single tuner is free.

The foregoing transmission or delivery logic can also be masked with other requirements if desired, such as where both a free tuner and the permitted viewing start time falling within a prescribed temporal window are required (i.e., viewing or access is valid only for a certain "aging" period), or where the user acknowledges a splash screen or comparable mechanism acknowledging the copyright of the content to be viewed (akin to a physical DVD, where the user's DVD player controls are ineffective during the copyright notice portions), and the restrictions on its use. Masking may also be based on network status or bandwidth availability, such as where the session will not be instantiated until sufficient bandwidth is available to provide a sufficiently high assurance of completing the streaming or download. Myriad other functional masks of the type well known in the networking arts may be used as well consistent with the invention.

It will also be recognized that the transmission of the data may also employ such error detection/correction functions, such as where a cable or satellite network uses turbo codes or Viterbi code/decode for FEC of the data streamed over the bearer medium.

P2P—

In another exemplary embodiment, the MSO (or a content provider such as a studio) can distribute content including e.g., films and TV shows over the Internet using peer-to-peer (P2P) technology. In one such variant, a "file swarming" technology of the type known in the art, such as for example that marketed by BitTorrent, Inc., which uses assembles files from separate data downloaded from other computer users or sources accessible via the Internet.

In one business model, purchase or rental of such "swarmed" content can be made available on the same day as the content becomes available on retails DVD, similar to other approaches described elsewhere herein. This purchased content may also be reduced to a tangible medium, such as using the premised recording techniques described in U.S. patent application Ser. No. 11/080,693 previously incorporated herein.

In one exemplary implementation of the aforementioned peer-to-peer approach, the speed of downloading content to a particular subscriber is substantially dependent on how many other individual computers in the network have that content. The more computers, the faster the process. Hence, as more computers on the network (e.g., Internet) are seeded with this content, the faster the process becomes. To this end, the MSO or content source can also intentionally seed certain computers with content, for the sole purpose of accelerating download. These distributed "content nodes" can be physically and/or logically secured if desired, and maintained by the MSO or source, so as to avoid the content being provided from unknown users on the Internet. Specifically, the use of known-good-nodes (KGNs) not only reduces threat of unauthorized content copying and manipulation, but also gives a level of surety to the MSO and source that the content that a subscriber receives that is assembled from components stored at the nodes is not degraded in quality, infected with viruses or other malware, etc.

In another variant, the head-end or hub virtual storage system previously described with respect to FIG. 2 can also be configured to act as the distributed nodes of the swarm network base.

Dynamic Coding and Configuration—

As previously described, one variant of the invention utilizes a reduced number of "generic" copies of the content retained for each user/owner (or shared among multiple users/owners); these generic copies are stored e.g., at the head-end 150, BSA hub, etc., and distributed as requested. The generic content can be stored coded (e.g., MPEG-2 encoded), or alternatively can be dynamically coded (or recoiled) for the codec context which the user request has been issued from. See, e.g., co-owned U.S. patent application Ser. No. 11/363,577 filed Feb. 27, 2006, entitled "Methods and Apparatus for Selecting Digital Coding/Decoding Technology for Programming and Data Delivery", and issued as U.S. Pat. No. 7,916,755 on Mar. 29, 2011, incorporated herein by reference in its entirety, for exemplary apparatus and methods by which such dynamic coding may be conducted.

The foregoing dynamic coding approach advantageously allows the subscriber to view the content in two or more formats depending on which device they are using for download/playback. For example, if the user's first request is issued from their DSTB context, an upstream message or other communication can be used to signal the head-end server process that an MPEG-2 decoder is in use on the DSTB, and hence the content should be coded into MPEG-2 (if not already done) before transmission. Alternatively, if the user is requesting download to their laptop computer or PMD e.g., via a WiFi or PAN interface, or via personal video encoder (PVE) such as a Slingbox or personal Content Server, then the server may need to encode the content according to another context (e.g., AVC or Real format) appropriate for those other devices.

The aforementioned signaling may also be manual; e.g., wherein the user checks a box or otherwise states their preference for the content format whether at the time of request or otherwise (e.g., via a "preferences" or setup menu).

This approach provides the user with a capability not present in prior art "tangible" rental or purchase paradigms; i.e., the ability to obtain multiple formats particularly encoded to their current context, the latter which changes as a function of time. Hence, the user need not buy or rent a physical medium having one encoding for one device, and another encoding for a different device; the stored "blank" of the current invention can be dynamically receded any number of times based simply on the user's request (see discussion of FIG. 3c above).

This dynamic configuration approach can also be extended to the conditional access (CA) and network interfaces associated with delivery of the content, such as via the exemplary methods and apparatus of co-owned U.S. patent application Ser. No. 11/363,578 filed Feb. 27, 2006, entitled "Methods and Apparatus for Selecting Digital Access Technology for Programming and Data Delivery", issued as U.S.

Pat. No. 8,170,065 on May 1, 2012, and Ser. No. 11/364,147 filed Feb. 27, 2006, entitled "Methods and Apparatus for Selecting Digital Interface Technology for Programming and Data Delivery", issued as U.S. Pat. No. 8,718,100 on May 6, 2014, respectively, each of the foregoing being incorporated herein by reference in their entirety. For example, one user/owner device may have a Powerkey or similar CA capability, while another is enabled for downloadable conditional access (DCAS) within its trusted domain. Accordingly, the head-end server process can configure the CA aspects of the content as appropriate for the relevant CA context, and also trigger other processes (such as DCAS download, key negotiation, etc.) necessary to facilitate the playback of the requested content. In this regard, the server process can be made "self healing"; i.e., where the requesting client domain or device is not properly configured to play back the content, the necessary configuration changes can be instituted automatically to provide a seamless appearance to the user.

Similarly, where the user's network interface requires selection and/or reconfiguration, this can be accomplished as well. For example, if the user requests a content download via an in-band QAM, but all QAMs capable of servicing that user are at or near capacity, the server process may dynamically choose to route the content through a DOCSIS QAM for delivery to the user's cable modem (which can then be routed to the user's output or display device via the converged premises device (CD) described subsequently herein with respect to FIG. 6, or alternatively an in-band tuner can be instructed to tune to the DOCSIS QAM).

Updates and Changes to Content—

In another aspect of the invention, the stored content can be subject to an "auto-update" or other update feature, wherein when such content is re-released (e.g., with director's commentary, as an anniversary edition, colorized, etc.) or remixed, the user can optionally be given the new version automatically (or at least presented with the option of obtaining the newer version). This feature can be offered under any number of different business models including for example being complementary (e.g., included within the purchase price), made as part of a subscription package, included as part of a short-term incentive plan, provided only after payment of an additional fee, and so forth. The user may also be offered the opportunity to keep multiple versions in virtual storage if desired.

To the degree that the differences in the various versions of the content can be cleanly identified and separated, the present invention contemplates saving one copy of the generic content, and then also saving these differences as a separate file or data structure, thereby obviating storing two complete yet slightly different versions of the same content. In one variant, the VCM process evaluates the content upon delivery from the content source (including, e.g., any metadata or other information provided therewith for such purposes) to identify differences between the new version and the existing version. These differences are extracted and saved as a "difference" file, which can then be integrated with the generic content when delivered to a client requesting the newer version. For example, a newer version of a movie that has director commentary or "how it was made" trailers or the like could simply have these additional components added onto the front or back end of the prior version before delivery, thereby presenting a seamless transition to the user.

Privacy Mechanisms and Content Authorities—

So as to maintain anonymity of user purchases (i.e., prevent tying a particular user to particular content purchases and possibly raising privacy issues), another embodiment of the invention uses one or more network variables for associating of the content and the purchaser. See, e.g., co-owned and co-pending U.S. patent application Ser. No. 11/186,452 filed Jul. 20, 2005 entitled "Method And Apparatus For Boundary-Based Network Operation", incorporated herein by reference in its entirety, wherein variables such as TUNER ID, TUNER USE, MAC, and so forth are used to anonymously yet specifically correlate activities to a particular CPE or client device. Hence, under such an approach, the purchasing or requesting user's CPE or client device would issue a parameter (e.g., TUNER ID or MAC) that would be maintained at the head-end, hub site, etc. and ultimately coded into the transmitted content in the form of steganographic data. With the proper private key portion, for example, law enforcement could decrypt the embedded data to retrieve the TUNER ID, MAC, etc. of the originating subscriber. This could then be presented to the MSO, who could then, under proper legal controls, identify the identity of the subscriber as warranted. See, e.g., U.S. patent application Ser. No. 11/440,490 filed May 24, 2006 previously referenced, which describes various approaches for maintaining anonymity of subscribers, as well as for the content association such as for example using an "end-to-end" anonymous association between the subscriber and the content they have purchased, that can be used consistent with the virtual content purchase or selection approach of the present invention.

In another aspect of the invention, a third party content source database or other such data repository is used to determine whether a given subscriber or entity (which may be anonymous by virtue, e.g., identification or association of the subscriber's CPE/CD/PMD with the purchased content instead of their actual physical identity) has purchased particular content. For example, in one variant, the user registers with the content source such as during an on-line Internet purchase via the content source website. This information is maintained by the content source and, through agreement or cooperation between the MSO and the content source, provided to the MSO when the latter receives a "remote" request for content from one of its subscribers. Hence, the content server at the head-end or BSA hub can authenticate the user, and also access the content source database to determine if the content has been previously purchased by that user. A correlation table or similar data structure can be maintained by the content source, MSO, or combination thereof, which correlates the various devices under a subscriber's MSO account or otherwise associated with the subscriber.

In another variant, two or more content sources (e.g., copyright holders) may create an accessible database ("Content Authority" or CA) for content purchases, somewhat akin to the centralized trusted authority (TA) architecture used for authentication and security purchases. The CA can then act as a local- or even national-level clearinghouse for remote content requests from MSO subscribers. This approach provides a substantially centralized point (or points) of access for network operators of varying types and configurations, so that they may process requests for content from "remote" locations or entities in a timely fashion, thereby also potentially relieving the MSO of having to store data and information relating to content purchases or downloads. U.S. patent application Ser. No. 11/440,490 filed May 24, 2006 referenced above describes exemplary embodiments of such content authorities for use in, inter alia, cable or satellite networks.

Dynamic Database Shaping—

It will be appreciated that the composition of the virtual content database previously described can be varied dynamically or programmatically. For example, the content of the database may be based on user CPE 106 or PMD activity; e.g., such as where for a plurality of subscribers, the VCM/head-end server, BSA server or other management entity can gather information relating to currently active users within that population, and adjust the contents of the virtual storage based on the previous purchases of content by that population.

In one embodiment, "purchase statistics" are maintained for those users using the network (which may also be collected and parsed for users on a given hub or other subset of the network, e.g., service group), and the virtual content database adjusted to best service that population. For example, in one approach, the techniques described in co-owned and co-pending U.S. patent application Ser. No. 11/186,452 previously incorporated herein, are used to uniquely but anonymously correlate users and their content based on e.g., TUNERID, MAC, or other such CPE-specific parameter. This approach advantageously maintains user privacy (no specific user is correlated to a specific content title), yet allows for correlation of CPE or client devices with content. When a user's CPE or client device is activated, information uniquely identifying that CPE/device is transmitted to the virtual database manager, which correlates that unique information to one or more items of purchased content.

For example, a subscriber's virtual database record might contain the information shown in Table 1, including the TUNER ID variable for that subscriber's CPE, any corresponding MAC address (for that CPE or client devices associated with that CPE, such as on a home coaxial network), and any content "purchases" to date (here, indicated by an arbitrary 7-digit catalog number or identifier variable named PUR_CONT):

TABLE 1

| Tuner ID (TUNER_ID) | Corresponding MAC or MACs (MAC) | Purchased Content (PUR_CONT) |
|---|---|---|
| {Tuner ID} | {MAC address for Tuner ID} | 1003475, 2443568, 1762003 |

As these TUNER IDs or MAC's are registered on the network, indicating that the associated CPE is in use, the virtual database manager can access the PUR_CONT variable and queue these entries for loading into the virtual database if not already there, based on the expectation that the user may wish to view one or more of their purchased content items (as compared to viewers whose CPE are not presently active on the network).

This feature can also be used in a content-specific manner; e.g., such as where the specific correlation to the content is used as the basis for a statistical or other such analysis. For example, where exemplary content "A" (e.g., Movie A) has been purchased by the greatest number or fraction of the current active population (such activity as determined by TUNER ID, MAC, or some other parameter), and Movie "B" by the next greatest number/fraction, and Movie "C" the next greatest, and so forth, the virtual manager process selectively loads the virtual storage with (or otherwise selectively makes available, such as by selectively encoding, etc.) these movies A, B, C, etc., since those are most likely to be viewed based purely on statistics. This technique is particularly useful when storage space is limited, such as where a plurality of "local" virtual storage nodes (e.g., at each BSA hub site) are used.

Alternatively, the latency or priority in serving requests for A, B, C, etc. can be adjusted in that order; i.e., A being most likely to requested is given highest queuing or "front of the line" privileges. This can be useful where one generic copy of content owned by a plurality of subscribers is requested for delivery; since many owners (statistically speaking) are likely to request the content, it can be pushed higher in the queue for less latency in responding to subscriber delivery requests. The requesting subscriber's status or privileges can also be used as a basis for priority; e.g., those with "premium" feature subscriptions can have their content lists queued ahead of other subscribers, thereby providing premium subscribers with the least latency for their virtual content requests.

The foregoing statistical process can also be modified or qualified using other information available to the MSO, including e.g., anecdotal viewing patterns or history for a particular content selection or subscriber, prevailing geographical, temporal, political, etc. conditions, and so forth. For example, in the context of Movies A, B, C, . . . described above, while Movie A may correlate to the highest number/fraction of purchases by the present on-line subscriber population, Movie B might have only been viewed an aggregate number of times that is much less than that of Movie A. Stated differently, while more people who bought Movie A are currently on-line, those purchasers of Movie B that are now on-line have viewed it very few times to date, and hence are ostensibly more likely to view it in the near term as compared to the owners of Movie A. Or, Movie C may be of particular topical relation to the current date or time of year (e.g., holiday; see discussion of metadata provided elsewhere herein), and hence more likely selected for viewing by its purchaser population than that for Movies A or B. Myriad other schemes for evaluating or estimating purchaser demand for particular content titles, genre, etc. will be recognized by those of ordinary skill given the present disclosure.

Gaming Variants—

As previously noted, gaming content and applications can be "purchased" by the user and owned in a virtual capacity similar to that described for movies, audio, etc. However, in certain cases, it may be desirable to adapt the network architecture to optimize such gaming uses; e.g., to reduce latency and therefore increase user satisfaction.

In one exemplary embodiment of the invention, a distributed application (DA) architecture is used that maintains a portion ("serve") of the application used to run the gaming content at a distant or remote location; e.g., at the head end 150, and downloads a smaller "client" portion of the application to the user's CPE or client device. The owner can also designate one or more other parties (e.g., within the MSO's network, such as other subscribers) that can access the server portion of the gaming application and also be provided a client portion that is in communication with the server portion (and hence in indirect communication with the other client portion(s)). This way, the garners can conduct multi-user gaming over the net from remote locations, or simply multiple locations within the same premises. With the high bandwidth availability in the upstream (premises-to-network) and downstream (network-to-premises) directions via, e.g., in-band channel or DOCSIS QAM, the communications with the server portion of the gaming application are effectively real time, and allow for substantially latency-free operation. Use of the client portions at the various premises also permits substantially distributed processing; i.e., some tasks that would otherwise have to be communicated upstream and performed at the head-end can be performed locally on a given user's client device (e.g., PMD), thereby eliminating much latency.

In another variant, a substantially "peer-to-peer" model is utilized wherein the client portions of the distributed application (DA) are adapted to communicate at least primarily on a peer-to-peer basis, such as over a local premises or WAN Ethernet (e.g., twisted shielded pair CAT-5), WiFi, PAN (802.15), HomePlug, or premises coaxial cable network, with little or no involvement of the server portion of the DA. This approach has the benefit of, inter alba, increasing possible speed of play and reducing latency, since effectively all processing and communications are conducted locally on the premises (or over a network that is less distant than the cable head-end). This approach can also be extended to multiple participants on a common cable network node (e.g., distribution hub), which also significantly reduces latency as compared to models which are required to communicate with the head-end 150.

In one embodiment, the gaming applications are downloaded to the clients upon each request or authorization by the registered owner, and then used by the clients over the premises network. When the gaming session making use of the application is terminated (or the client device switched off, or goes out-of-network), the client portion of the application can be programmed to uninstall, thereby not monopolizing precious storage space on the "thin" client device(s). However, files relating to e.g., past scores, progression of play, player identities, etc. can be left on the client device(s) so that users can effectively pick up where they left off at the end of the last session, if desired. These "configuration/information" files take up very little space on the client device, yet allow for largely seamless restart of the gaming session once the client portion is again downloaded.

Figure 6:
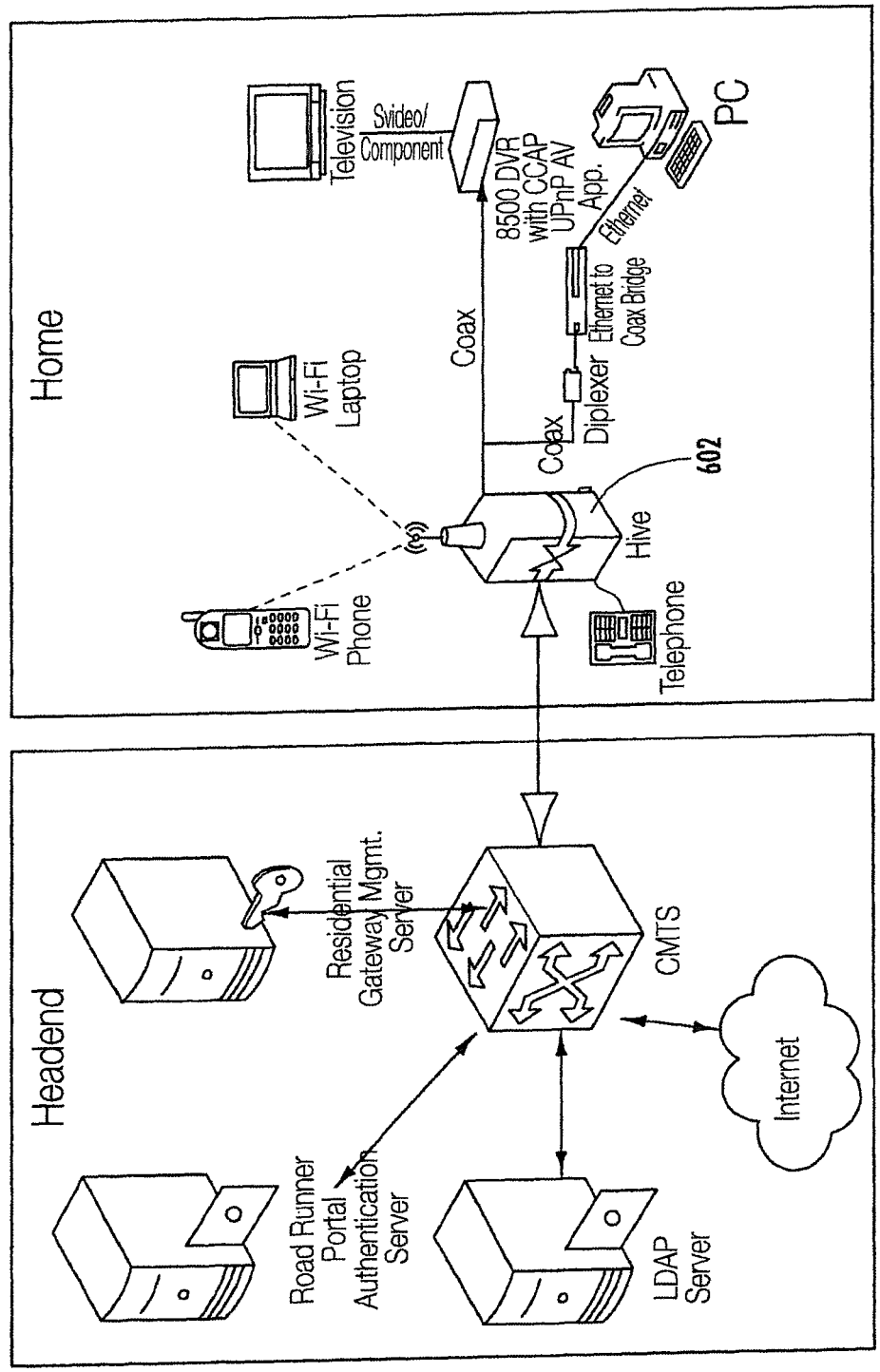
FIG. 6 is a functional block diagram illustrating a first exemplary converged device (CD) and associated premises-side architecture useful with the VCMA of the present invention.

In yet another variant, a local premises device (e.g., DSTB, or converged device (CD) such as that described in co-owned U.S. patent application Ser. No. 11/378,129 entitled "Methods and Apparatus for Centralized Content and Data Delivery" filed Mar. 16, 2006, issued as U.S. Pat. No. 8,347,341 on Jan. 1, 2013, and incorporated herein by reference in its entirety, may be used as a proxy server for the sake of the local client devices. FIG. 6 herein illustrates one exemplary configuration of such a CD 602. For example, upon owner request to use their "virtual" gaming application/content, the head-end content server would, after authenticating and authorizing the user, download the client and proxy server portions of the DA to the converged device (CD), wherein the CD would distribute the client portion(s) to the requesting user(s), and install the proxy server portion on the CD. The DA in one embodiment (FIG. 2e) comprises: (i) the head-end or network server portion 280; (ii) the premises server proxy portion 282, and (iii) one or more client portions 284. This decentralized approach allows for "thicker" applications and capability to be run on the premises without introducing significant latency, since the additional functionality is now disposed locally on the CD or other premises device as opposed to at the head-end, BSA hub site, etc. Since there are few if any upstream communications between the proxy and master server portions 282, 284 of the DA during normal play, contention for upstream bandwidth (which may feasibly result in perceivable game latency) is also advantageously eliminated.

The foregoing paradigms for gaming, etc. content delivery may also make use of the "trusted domain" concept described in U.S. patent application Ser. No. 11/006,404 filed Dec. 7, 2004, entitled "Technique For Securely Communicating And Storing Programming Material In A Trusted Domain", and issued as U.S. Pat. No. 8,347,341 on Jan. 1, 2013, incorporated herein by reference in its entirety, as well as the authorized service domain (ASD) described elsewhere herein.

It will be appreciated that while described in the context of an exemplary gaming application, these aspects of the invention may be extended to literally any functionality or theme that requires some sort of interaction between: (i) the client and a server; or (ii) two or more clients, including without limitation collaborative applications (electronic whiteboards), multi-user financial applications (e.g., family financial tracking programs such as an aggregated tax tracking and return preparation application), intra-family music sharing, etc. Hence, a family's library of DVDs and CD-ROMs for content, games, applications, music, and so forth, might conceivably be replaced with a virtual library, with the aforementioned CD acting as a converged gateway to these services delivered over the MSO network. The MSO might therefore provide significant opportunities for access concentration and aggregation of services; such as where it provides: (i) VOD services (traditional); (ii) broadcast television services (e.g., broadcast-switched); (iii) PPV; (iv) high speed broadband/internet (e.g., DOCSIS); (v) IPTV; (vi) VoIP or other telephony; (vii) home networking (e.g., via local WiFi, Homeplug, CAT-5, coax, or other indigenous network environment), and (viii) "virtual library" for purchased movies, games, music CDs, shared user-generated content, virtual hard drives, etc.

In effect, this model would provide a premises with all of its required data, telecommunication, and content requirements, thereby obviating the need for multiple service providers, bills, and the presence of incompatible equipment, as well as rentals or purchases of DVDs. This advantage is further leveraged through the use of highly standardized and universally compatible technologies such as UpnP and the like, which make for a substantially unified user environment and cross-over between domains (e.g., PMD can talk to CD and PC and DSTB and WiFi and so forth).

Content Trading and Transfer—

In another aspect of the invention, two or more users/purchasers can transfer or "trade" ownership, much as two friends might swap physical DVD's they had each purchased. In one embodiment, the VCM is configured to permit owners of content (i) purchased through the MSO, or (ii) otherwise stored on the database, such as resulting from a sale of the content to the MSO subscriber via a content source (e.g., studio) website or the like, to swap viewing privileges according to one or more criteria such as for a fixed period of time, for a number of viewings, permanently, on certain prescribed dates/times, and so forth. This swapping of viewing privileges can also be made to require two-party authorization (and authentication) such as via a software U/I screen acknowledgement or other affirmative action, so that in fact both parties to the transaction agree.

Accordingly, users/owners of content under the present invention are also optionally afforded another capability not present in rentals or DVD purchase (without significant added effort at least); i.e., the ability to dynamically swap viewing rights to acquired content. It will also be appreciated that an additional fee can be exacted from one or both parties to the swap transaction so as to, inter alia, generate additional revenue for the MSO (there is some threshold or price point for the convenience of being able to electronically share media without physically having to do so), as well as to avoid subrogation of the copyright royalty on the content (i.e., the MSO could pay a portion of the additional fee back to the content source or copyright holder, thereby creating an additional revenue stream for the latter entities, as well as the MSO).

In another embodiment, the users/purchasers of the content can do so for assignment to a third party; e.g., to give as gifts, etc. For example, an MSO subscriber might purchase certain content for unlimited future viewing by another MSO subscriber, with notification and delivery of the "gift" being performed electronically (such as via an on-screen pop-up window, ticker, audible cue, e-mail, VoI? call over the MSO network, or other such user interface mechanism).

Personalization of Content—

In another exemplary embodiment, the present invention provides the user/owner with the capability to personalize their stored version of the content. This can be accomplished in a number of different ways, including without limitation: (i) storing whole or complete customized versions of content for each different user/owner; (ii) storing only the differences from user to user (e.g., in the form of a customizations metadata or similar file) that relate to a "generic" version of the content; or (iii) storing a generic version of the content at the head-end, BSA hub, etc., and then adding the user personalization at their CPE.

Such personalization might include, for example and without limitation, (i) annotating or flagging particular portions of their content for other family members (e.g., "Dad's favorite scene"; "Hey John, check out this car chase . . . ", "slow part . . . go get the popcorn now" and the like), enterprise users (e.g., "Note the low-pressure sales technique employed by Mr. Smith . . . "), etc.; (ii) "scene" partitions or breakpoints, such as to permit rapid navigation to portions of the content which are frequently watched or re-watched; (iii) creation of user-customized sequences of "vignettes" (in effect, hitting all those portions of the content which the user feels are important or desirable, thereby summarizing the content within a compressed period of time); or (iv) the addition of subtitled lyrics or tablature so that the user or other family members can sing/play along with musical portions of the content if any. Myriad other types and purposes of personalization will be envisaged by those of ordinary skill when provided the present disclosure.

Accordingly, one embodiment of the invention provides the user with a downloadable software environment for user content editing and annotation which permits the user to make such annotations/personalizations to their content, which are stored in a file that is transmitted up to the head-end, BSA hub site, etc. as appropriate. This file can be thought of as a layer atop the encoded content which functions much like metadata; it instructs the head-end, BSA, etc. server to perform certain additional functions such as skipping to different frame or SI references within the content, inserting overlays or other graphical and/or audible mechanisms (e.g., pop-up windows), etc. when that particular user plays back their purchased content. This user editing environment is particularly well adapted to VOD or "PVR" delivery models, wherein the user can for example pause the content playback; call up the editing environment to add an annotation and "tag" it to that reference point in the content (wherein the editing environment transmits this annotation and reference to the head-end server process via, e.g., OOB message, to be used on subsequent playbacks), and then un-pause the playback and continue watching. Any number of user interface mechanisms well known to those of ordinary skill can be used for enabling the user's entry of annotations, personalizations, etc. including without limitation on-screen displays (OSDs), browsers, interactive remote controls, keyboards, mice, joysticks, touch-screens, speech recognition algorithms, and so forth.

However, even broadcast modes can be annotated or personalized, such as by marking locations within the content during viewing (e.g., using a remote control function that initiates a marking reference function that can store the mark points, such as for example by an SI reference or artifact within the content), and utilize these points later within the aforementioned software environment to add the user's personalizations. A screen capture or "snapshot" function can also be employed, such as where the screen display or contents of VRAM, frame buffer, etc. can be captured at each marking point, and saved along with the markings, so as to refresh the user's recollection when conducting annotation at a later time. These references and capture data can be saved locally (e.g., on the user's CPE or PC), or at the head-end 150 or hub-site server.

Alternatively, the software environment can associate one or more predetermined annotations with certain portions of the content, such as shown in the exemplary scheme of Table 2:

TABLE 2

| SI Reference | Annotation Reference | Annotation Content |
| --- | --- | --- |
| 06010607523 | 03 | "Slow part" |
| 06010625453 | 01 | "Scary" |
| 06010641107 | 08 | "Violent" |

These annotations can be user-designated, set by the MSO, or otherwise as desired. Such annotations can be useful, for example, to warn viewers of impending themes, situations, action, eta. which may be of particular interest, not suitable for children, etc.

These annotations may also be inserted by the content provider, in effect extending the utility of the well known "rating system" used for alerting viewers as to the maturity, sexual content, etc. of the content. Many viewers either tend to ignore these ratings, or at least forget them after the movie has started, in effect forcing them to make an "all or nothing" decision as to whether they or another should watch the movie. Under the present invention, however, the viewers can be pre-alerted during the content playback or streaming itself as to impending points of possible concern. In one embodiment, these annotations or warnings are displayed graphically on the display of the viewer, akin to the network logo markings commonly used in the lower corners of the viewed content display. For example, a small but noticeable flashing "A" might indicate impending adult content, whereas a "V" indicates violence, etc. Myriad other approaches will be recognized by those of ordinary skill given the present disclosure.

Similarly, the present invention contemplates the ability to save or store two or more versions of the purchased content for use by authorized users; e.g., wherein a clean or un-annotated version is stored, as well as other versions, such as for example those annotated or modified by or for different family members, etc.

In this fashion, the present invention advantageously provides a feature which is not available to either renters or purchasers of physical media; i.e., customization of the ancillary features of the content which may make the viewing experience more enjoyable or productive for that particular user or their friends, family, co-workers, etc.

Virtual Audio/Music—

It will also be appreciated that the present invention can be extended to musical content as well as movies, applications, gaming, etc. In somewhat analogous fashion to the well known "iTunes™" service provided by Apple Computer Corporation, the MSO can provide downloads of music files (e.g., MP3s, Windows media, etc.) to its subscribers. However, the exemplary embodiment of the present invention differs in that the storage of the musical content is virtual, whereas the iTunes paradigm generally uses a download-and-store-locally approach. One exemplary application for the present invention therefore is the virtual ownership of CD-ROMs ("music CDs"); similar to the "Music Choice" or "XM Radio" services provided by satellite providers such as DIRECTV™, music can be streamed to the subscriber (or downloaded for an ephemeral playback from local equipment); however, unlike these prior art services, the user can make selections and replay their content, since the programming is not picked for them. Hence, in one variant, the subscriber purchases and maintains a virtual library of musical content on the MSO infrastructure (e.g., virtual content database at the head-end), from which they can selectively choose and tailor according to their desires. For example, one delivery mode might be "random play", wherein the MSO streams individual songs in a randomized fashion. These randomized selections may be from the subscriber's entire virtual collection, or from subsets thereof (e.g., "random play—Jazz"; "random play—Jazz by David Sanborn"; "random play—Jazz—1950 to 1970", and so forth).

As can be appreciated, metadata or other such classification mechanisms can be used to assist the virtual database manager at the head end in making such subset selections; e.g., the content source (recording studio) can add the metadata to the content files that identifies the artist, genre, date, etc.). Alternatively, this information can be added by the MSO at ingestion (e.g., via a human or automated process, such as when the content is ingested and groomed for storage within the virtual database). As yet another alternative, the user/purchaser can be given the ability to add metadata annotations or the like via, e.g., the content editing and personalization software environment described previously herein. For example, the user can be presented with an on-screen browser, menu or interface, or use their home PC, PMD, etc., to configure the metadata according to their own personal system. One user might, for instance, designate "favorites" with metadata, and such classification can be used as the basis for inclusion in a subset (i.e., irrespective of genre, date, artist, etc., or alternatively with one or more of these as additional filters or population criteria). These metadata classifications or annotations can be made at the album level, song level, or even intra-song (e.g., such as where the best portions of songs are selected for playback, similar to a medley).

Users of the present invention can also establish "themes" or contexts for their music, such as for example "dinner music", "Christmas music", etc., which may also make use of the foregoing subset approach (e.g., "Christmas music—classical—1930 to 1970").

The virtual music delivery model described herein is also amenable to the various other forms of "ownership" described herein, including without limitation ownership for a prescribed period or during prescribed windows, site licensing, "buddy" sharing, and so forth. For example, many types of music (including so-called "pop") tends to have a finite lifetime in the minds of its listeners; songs go in and out of style sometimes very rapidly. Hence, one model of music delivery according to the invention allows purchasers to purchase the content for a given length of time (e.g., one year), after which they can no longer access the content without additional payments.

Alternatively, certain types of music may only be useful to a listener at certain periods of the day/week/month/year. For example, a user may purchase rights to listen to Christmas music only during the Christmas holiday season. Myriad other applications of such "partial" or finite ownership will also be recognized by those of ordinary skill.

The foregoing approach of virtual storage of music obviates many disabilities associated with the prior art purchase of physical media, including inter alia, (i) no manufacture, packaging, or shipping costs; (ii) no physical storage space required in the user's premises; (iii) the ability to assign and search metadata associated with a subscriber's library instantaneously (e.g., using a search engine within the user's CPE/CD, PMD, or the head-end); (iv) no possible damage to the physical media (e.g., scratching, melting due to leaving out in the sun, etc.); (iv) no possibility of theft; and (vi) no shuffling or loading of physical media into a CD player or the like.

It will also be recognized that the methodology and apparatus described herein lends itself to certain competitive advantages over the purchase of a DVD or other such tangible media. As is evidenced in the commercial success of on-line download music services (e.g., Apple iTunes™), the rapid "electronic/virtual" procurement model has the potential of substantially displacing the traditional physical medium approach to content purchase. Accordingly, since no physical medium is involved (including the costs associated with the medium itself, delivery, packaging, etc.), cost and delivery time can be reduced, thereby making for a more desirable user experience.

Subscriber Generated Content—

The storage apparatus and methods of the present invention can also be utilized for subscriber-generated content, as well as third party content. For example, a user may upload content (e.g., home movies, personal musical performances, photos, etc.) to the MSO storage facility via any number of different communication channels including for example: (i) via an upstream OOB or DOCSIS communication via the MSO infrastructure and the user's CPE or CD; (ii) via an internet (e.g., the Internet) that is coupled directly to the MSO head-end or hub site (thereby avoiding the "last mile" of the MSO distribution network), such as e.g., via an Internet connection of a third party ISP, or an enterprise WAN; (iii) Telco PSTN or DSL link or other circuit-switched channel to a telecommunications switch that is coupled to an IP/ATM gateway or backbone; or (iv) via an internet connection to a cellular service provider (CSP) or wireless service provider (WSP) or satellite provider (e.g., satellite Internet). See, e.g., co-owned U.S. patent application Ser. No. 11/258,229 filed Oct. 24, 2005 and entitled "Method and Apparatus For On-Demand Content Transmission and Control Over Networks", incorporated herein by reference in its entirety, that describes exemplary apparatus and methods for the creation, storage, and sharing of such user-generated content. When coupled with the storage and authentication mechanisms described in the present invention, powerful and highly flexible capabilities are provided; e.g., the ability to store and archive user generated content in real time, even using a PMD such as a cellular telephone, that can be selectively and immediately shared by the user with family, friends, etc. The "VOD-like" functions of certain embodiments of the foregoing incorporated application further allow mobile users to have a PVR/VOD-like experience when accessing the content via the mobile device, including the ability to pause, stop, rewind, etc. Hence, there is the ability for such users to instantaneously access archived personal content regardless of their location, and play it back as if on their home equipment (e.g., DVR or DSTB).

Preview Capability—

It will also be appreciated that the streaming or download of content to the user may occur before the content is purchased. For example, in one variant of the invention, the user is provided a "preview" function, wherein the user can view selected portions of the content before purchase. This may provide the basis for, inter alia, a "return" policy of sorts, wherein the user at that stage can cancel the transaction and any billing associated therewith by selecting not to obtain (virtual) ownership of the content. To this end, the MSO or third party source can deliver only a limited portion (e.g., first five minutes) of the selected content, or alternatively a "trailer" or preview short, or even a limited function executable relating to an application, which can be viewed or used an unlimited number of times.

In effect, the downloaded preview content is either kept in a physically and/or electrically secure holding area within the user's trusted domain, or simply restricted in its scope or capabilities, while the user decides whether or not to irrevocably purchase the content.

This functionality can also be achieved by, e.g., encoding or encrypting the downloaded content, such as via a public/private key system, where in the user's CPE is only provided the necessary private key for decryption upon affirmatively selecting "yes" on the purchase decision, such selection also causing the billing module within the head-end or other location to charge the user's account. Another approach may comprise lacing the downloaded content with disruptive noise or similar data such that the picture rendered by playing the content is garbled or effectively unusable, with such data only being removed upon (i) payment by the user, and/or (ii) use of the appropriate cryptographic or authentication data (or even a SIM card or similar device) to "unlock" the decoding algorithm so that removal of the disruptive data is enabled. Myriad other approaches to securing data compatible with the present invention are well known to those of ordinary skill, and hence not described further herein.

Parental or Other Supervisory Controls—

In addition to other aspects described herein, the selection (including preview), purchase and delivery of virtual content can be masked or controlled according to one or more supervisory processes or functions resident on either the network side (e.g., head-end within VCM 214, or at the hub site), or alternatively on the CPE/CD side. For example, one such masking function comprises a parental control, wherein content rated with a certain viewer rating (e.g., "M" for mature only) can be selectively filtered from the purchase option list, and/or filtered before purchase or delivery. These controls may also comprise allowing the purchase and delivery of such content to the premises, yet only within certain domains of the receiving premises (e.g., the parents bedroom), as can be determined through any number of well known mechanisms such as Device ID, MAC address or LAN address on the local premises coax or CAT-5 LAN, etc. As another option, the delivered and controlled content can be encrypted and/or password protected, such that only those with the proper password or encryption key component can unlock or decode the content for viewing.

The foregoing parental or operational controls can also be linked to user personalizations or annotations of the type described previously herein (See, e.g., Table 2). For example, a parent may annotate content such as a movie that is generally acceptable for viewing by their children, yet has some limited undesirable portions. These annotations can be used as cues for masking algorithms (e.g., software running on the VCM or the CPE/CD) to take particular actions with respect to the content, such as without limitation scrambling the signal, shunting delivery of the packets to the CPE/CD for a prescribed period of time, deleting the audio portion, inserting visual screen masks or patterns, disabling the video monitor, Firewire, etc. interfaces to interrupt signal reaching the monitor, etc. For example, in the context of Table 2 above, the "08" (Violence) annotation reference may instigate the aforementioned software process in the VCM 214 or CPE/CD to simply blank out the delivered content for a prescribed period of time. Note that the annotation/personalization scheme previously described can readily be adapted by those of ordinary skill to include specification of one or more related parameters that will allow user control of these actions (e.g., specifying the duration of blanking, percentage or portions of the display image to be masked, etc.). In this fashion, the parent can avoid depriving their child of what would otherwise be a meaningful or useful viewing experience for the sake of a limited amount of undesired content.

The present aspect of the invention can therefore can be thought of as providing "enhanced V-chip" capability; rather than blanking an entire program (e.g., by encoding rated programs' signals on line 21 of the broadcast signal's vertical blanking interval (VBI) using the XDS protocol as in the V-chip), only selective portions of the content are blocked or otherwise obscured from user perception. Furthermore, while the V-chip has been mandated for certain classes of consumer device (e.g., televisions), no such mandate or accommodations within the subscriber's hardware need exist; rather, the exemplary "parental/operational controls" functionality described herein can be effected entirely using indigenous CPE/CD or VCM hardware, and only a software download (e.g., head-end to CPE/CD download and installation of an application).

Virtual Possession—

In another aspect of the invention, the user or subscriber is provided the opportunity to: (1) lease or even own equipment within the network operator's infrastructure or facilities; and/or (ii) extend a virtual control boundary around one or more components or portions of the network operator's equipment or infrastructure. Specifically, it may be desirable under certain circumstances (e.g., for certain business models, in order to address security or legal/copyright issues, etc.) to provide the user with some degree of "ownership" or control of the MSO network facilities, whether on a short-term or long-term basis.

In one variant, the user or subscriber leases or even purchases storage space and/or actual storage and playback devices from the MSO. Such lease or purchase may be for a period of time (or number of uses, etc.), or even permanent if desired. To this end, the MSO or other network operator may utilize a highly modular architecture, such that the operations of the leased space/equipment for respective subscribers are largely or completely separated from one another. The MSO maintains the leased/owned equipment (including physical security thereof), and operates the equipment at the behest of the owner. For example, the MSO would determine the configuration of the device, perform software upgrades, periodic maintenance, control encryption/decryption of the stored content, regulate access thereto, etc.

In another variant, a virtual control boundary is further constructed around the subscriber's leased or purchased equipment, thereby allowing them to be in direct control of all aspects of the operation and access of their equipment. For example, one embodiment employs a software application disposed at the client premises (e.g., on their CPE 106) which communicates with a corresponding application or portion at the MSO node (e.g., head-end 150) that controls the operation of the leased/purchased equipment. In this sense, the MSO's equipment is in a very real sense in the possession and under the control of the subscriber, albeit being physically located at a place remote from the subscriber's premises (e.g., the head-end of the cable network). This can somewhat be analogized to putting one's furniture or personal possessions in storage; the user/subscriber still maintains ownership of the equipment (and any content disposed thereon) at all times, yet the MSO provides a physical location, and physical security, for the owned property.

In another variant, these storage and recording/playback apparatus are disposed at a local hub site or other node even more physically proximate to the user's premises.

It will be appreciated that various business models may also be constructed around such "virtual possession" schemes, including for example where the user or subscriber can themselves specify or configure the equipment that they lease or own, much like one currently configures a PC or laptop from a manufacturer at time of purchase. A user can also be provided with the capability of changing or upgrading their equipment, such as for more storage space, different codecs, network interfaces, conditional access, encryption/authentication schemes, indigenous processing or signal conditioning capability, etc.

Network Server—

Figure 4:
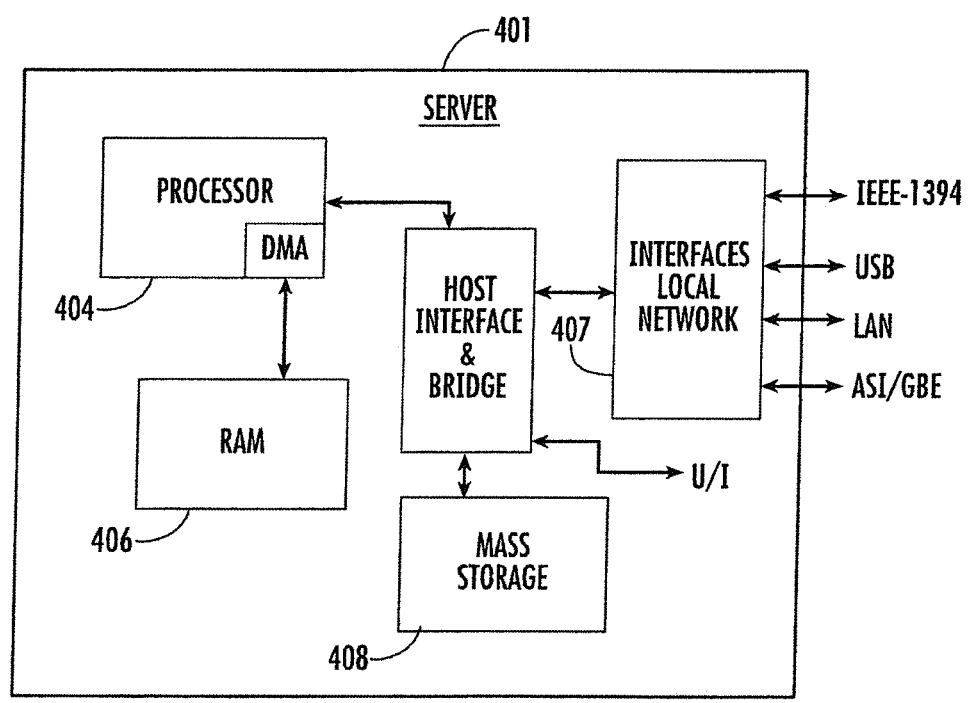
FIG. 4 is a functional block diagram illustrating a first exemplary embodiment of network server apparatus adapted for use with the VCMA of the present invention.

Referring now to FIG. 4, one embodiment of the improved network electronic device adapted for virtual content selection and delivery capability according to the present invention is described. As shown in FIG. 4, the device 401 generally comprises and OpenCable-compliant network server module adapted for interface with the HFC network 101 of FIG. 1 (e.g., the MEM 162 at the head-end, and/or the LAN 158, 160), digital processor(s) 404, storage device 406 (and optional mass storage device 408), and a plurality of interfaces 407 for use with other network apparatus such as IP routers and other packet network devices, network management and provisioning systems, local PCs, etc. Other components which may be utilized within the server device 401 include amplifiers, board level electronic components, as well as media processors and other specialized SoC or ASIC devices. Support for various processing layers and protocols (e.g., 802.3, DOCSIS MAC, OOB channels, DHCP, SNMP, H.323/RTP/RTCP, TCP/IP, VoIP, SIP, LSCP, etc.) may also be provided as required. A VOD application is also disposed to run on the server module 301 to provide a functional interface for VOD session and download requests received from network CPE 106, or other interposed entities. These additional components and functionalities are well known to those of ordinary skill in the cable and embedded system fields, and accordingly not described further herein.

The server device 401 of FIG. 4 may take any number of physical forms, comprising for example one of a plurality of discrete modules or cards within a larger network head-end or edge device of the type well known in the art, including the MEM 162 itself. The server may also comprise firmware, either alone or in combination with other hardware/software components such as those previously described (e.g., disposed in the aforementioned edge device). Alternatively, the server module 401 may be a stand-alone device disposed at the head end or other location (such as a VOD server 105, content server 103 or application server 104), and may even include its own RF front end (e.g., modulators, encryptors, etc.) or optical interface so as to interface directly with various portions of the HFC network 101. Numerous other configurations may be used. The server device 401 may also be integrated with other types of components (such as satellite transceivers, encoders/decoders, etc.) and form factors if desired.

It can also be appreciated that the methods of the present invention may be practiced using any configuration or combination of hardware, firmware, or software, and may be disposed within one or any number of different physical or logical entities. For example, any required conditioning of the content before delivery (such as the inclusion of annotations or personalization, watermarking or other data, encryption, generation of encryption key pairs and/or challenges, and so forth) may take the form of one or more computer programs running on a single device disposed within the network (e.g., the VOD server module 105), such as at a head-end, node, or hub. Alternatively, such computer programs may have one or more components distributed across various hardware environments at the same or different locations, wherein various of the functions are distributed across the VOD servers 105, content servers 103, application servers 104 and other system components.

As yet another example, portions of the virtual content selection and delivery functionality may be rendered as a dedicated or application specific IC (ASIC) or DSP having code running thereon. For example, a security processor of the type well known in the art can be used to implement encryption algorithms on the downloaded content or upstream communications, and/or to perform key pair generation and the like. Myriad different configurations for practicing the invention will be recognized by those of ordinary skill in the network arts provided the present disclosure.

In one exemplary embodiment, the server device 401 is coupled to a billing or other payment management module and configured so as to only permit initiation of a VOD session or other content delivery mode to start after the target content is purchased by the user; e.g., upon receipt of a "payment accepted" or comparable signal from the billing module. This approach implements the aforementioned coupling between the availability of the "new" content over the network and the purchase decision (i.e., the user can't watch the new content without first purchasing it). The server operation can also be masked or controlled by a "business rules" engine" or other logical wrapper as described subsequently herein.

CPE Architecture and Operation—

Figure 5:
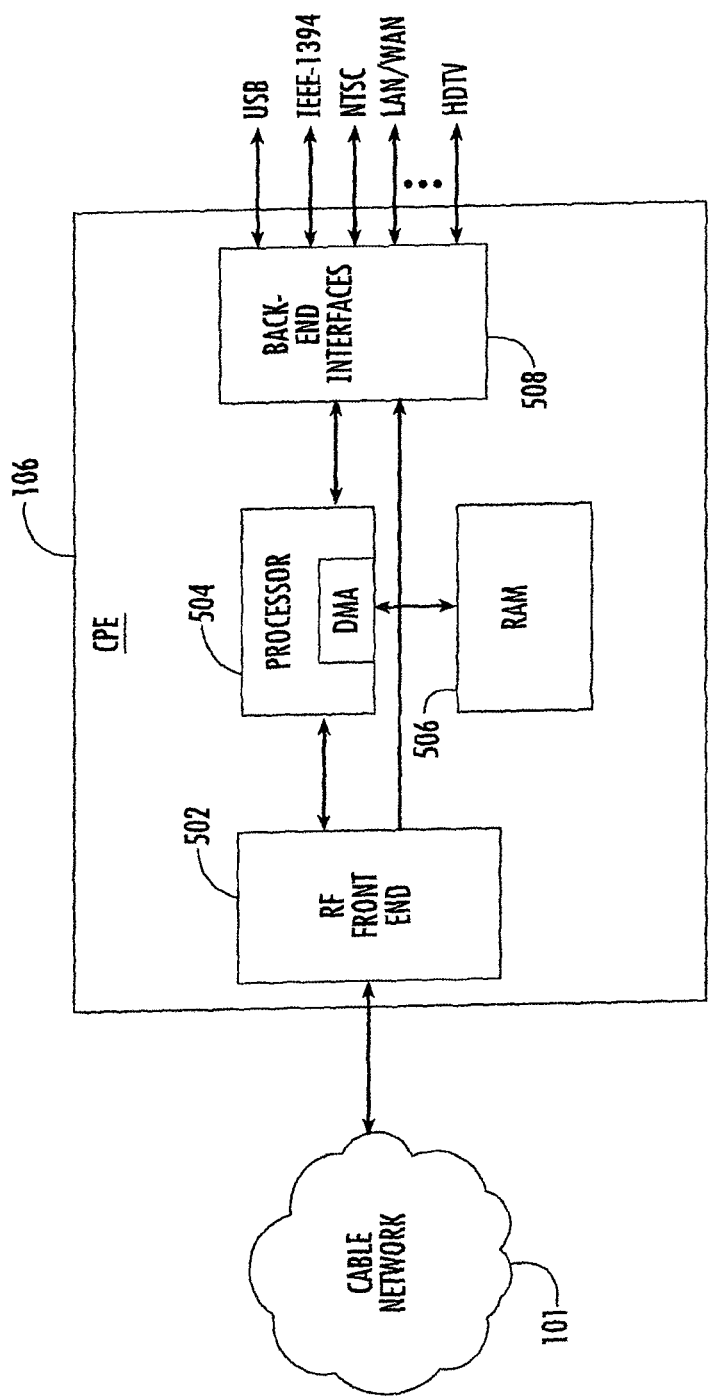
FIG. 5 is a functional block diagram illustrating a first exemplary embodiment of consumer premises equipment (CPE) adapted for use with the VCMA of the present invention.

FIG. 5 illustrates a first embodiment of the improved client device (e.g., CPE 106) with virtual content selection and streaming/download capability according to the present invention. As shown in FIG. 5, the device 106 generally comprises and OpenCable-compliant embedded system having an RF front end 502 (including demodulator and decryption unit) for interface with the HFC network 101 of FIG. 1, digital processor(s) 504, RAM 505 and mass storage device 506, and a plurality of interfaces 508 (e.g., video/audio interfaces, IEEE-1394 "Firewire", USB, serial/parallel ports, DVI, etc.) for interface with other end-user apparatus such as televisions, personal electronics, computers, WiFi/PAN or other network hubs/routers, etc.

The device 106 may also optionally include a recording device (e.g., DVD burner) 512 useful for recording the user's media, as well as (optionally playing it back after recording); see, e.g., U.S. patent application Ser. No. 11/080,693 filed Mar. 14, 2005, entitled "Method And Apparatus For Network Content Downloading and Recording", and issued as U.S. Pat. No. 8,028,322 on Sep. 27, 2011, previously incorporated herein, which describes exemplary apparatus and methods for downloading and control of content within the user's premises (including recording). However, it will be recognized that the present invention effectively obviates the need for such local recording and storage.

Other components which may be utilized within the device (deleted from FIG. 5 for simplicity) include RF tuner stages, buffer memory (which may be implemented in the RAM 505 or otherwise), various processing layers (e.g., DOCSIS MAC or DAVIC OOB channel, MPEG, etc.) as well as media processors and other specialized SoC or ASIC devices. These additional components and functionality are well known to those of ordinary skill in the cable and embedded system fields, and accordingly not described further herein.

The device 106 of FIG. 5 may also be provided with an OCAP-compliant monitor application and Java-based middleware which, inter alia, manages the operation of the device and applications running thereon. It will be recognized by those of ordinary skill that myriad different device and software architectures may be used consistent with the virtual content selection and download functionality of the invention, the device of FIG. 5 being merely exemplary. For example, different middlewares (e.g., MHP, MHEG, or ACAP) may be used in place of the OCAP middleware of the illustrated embodiment.

The processor 504 and internal bus and memory architecture of the CPE 106 of FIG. 5 is ideally adapted for high-speed data processing, at least sufficient to support the client-side processing tasks necessary to implement the content selection and streaming/download functionality of the present invention effectively in real time. This may be accomplished, e.g., through a single high-speed multifunction digital processor, an array of smaller (e.g., RISC) cores, dedicated processors (such as a dedicated MPEG media processor, CPU, and interface controller), etc.

As part of the application layer of the CPE 106 protocol stack (not shown), various different types of client applications may be running (or operable to run) consistent with the present invention. In one embodiment, a separate (dedicated) client application adapted for content selection, browsing, and download may be used to interface with the lower layers of the stack. This may include, e.g., a separate GUI or other type of UI, and may operate substantially independent of other applications on the CPE 106. Alternatively, the selection and download functionality described herein may be integrated into one or more existing or downloadable applications (such as the aforementioned annotation and personalization software environment, a VOD application, "Watch TV" application, navigator, TV-commerce application, or even EPG). The application (and even session) layer protocols necessary to control the content selection and download functionality may even be disposed on another device (e.g., PDA or cellular smartphone) as previously described in order to instigate the browsing, selection, purchase and download/streaming of content. For example, the user may be able to use a client application (with SIP session layer) on their smartphone to negotiate, via e.g., a dial-in number or Internet URL, the purchase and download/streaming of a movie at a later time via their CPE.

As yet another option, the streaming/download functionality may be completely transparent to the end user, such as where a VOD application running on the CPE 106 (or an associated device) makes data download "calls" as necessary to the other components of the stack in order to (i) initiate a session if not already established, (ii) download the data, including any necessary error correction and/or retransmission, and (iii) manage termination of the session.

As previously noted, the server 401 can be used to restrict session instantiation until one or more preconditions (e.g., payment) are met, but the CPE 106 may also be used to provide all or part of this functionality. For example, the billing module or other entity can send an authorization signal to the CPE 106 directly, and the middleware (or other functionality) of the CPE controls the user's ability to instantiate the download or viewing session, or receive broadcasts. In one variant, the server 401 controls the download (i.e., no download or streaming until payment authorization cycle is complete), yet the ability to view the downloaded or streamed content is delegated to the CPE. In another variant, the server 401 controls and provides the download session to a temporary storage location (e.g., on the CPE or on a device associated therewith, but the viewing of the content remains "locked" (such as based on SI or similar clock reference data) until a prescribed time/date coordinate when the user can view the content. Other schemes for allocating and restricting session instantiation, data streaming or download, and viewing may be used consistent with the invention, as will be recognized by those of ordinary skill given the present disclosure. The CPE middleware and any other relevant components may also be modified in order to provide a "universal" software interface for the content browsing, selection, payment and download/streaming functions, such that application developers can write their applications to make use of this capability. Similarly, the "universal" CPE described in co-owned U.S. patent application Ser. No. 10/782,680 filed Feb. 18, 2004, entitled "Media Extension Apparatus And Methods For Use In An Information Network", and issued as U.S. Pat. No. 8,078,669 on Dec. 13, 2011, incorporated herein by reference in its entirety, may be used consistent with the present invention in order to allow specific features (including content selection and download) to be configured by a particular MSO or other entity when the CPE is used in their network.

In another embodiment, the client application can function in response to signals or communications provided by a device in communication with the CPE 106. For example, the CPE 106 may comprise a wireless interface (e.g., 802.11 a/b/g/n, Bluetooth, 802.15 PAN, 802.16 WiMAX, 802.20, etc.) such that it can service content selection, payment, and download/streaming requests from client devices of the CPE 106 itself. In one such variant, the client device comprises a PDA, gaming console, or similar handheld device that has a distributed portion of the client application running thereon. This application may be stand-alone or integrated with another application. Hence, users operating the distributed client application on the PDA will utilize their wireless interface to the CPE 106 in order to remotely instigate a content purchase and download from the network via the CPE. The wireless forward channel(s) of the interface (e.g., CPE to PDA) can be used to transmit the content after processing (e.g., decoding) by the CPE, or even stream the "raw" unprocessed content (or even the received and demultiplexed MPEG encoded packets) to the PDA(s) for use thereby.

Myriad other schemes for integrating the content selection, purchase and download/streaming functions within the existing CPE software environment will be recognized by those of ordinary skill in the software arts when provided the present disclosure.

The network or virtual content server can also instantiate a trusted domain within the CPE 106 if one does not already exist. For example, using a downloadable CA (DCAS) approach, the necessary software and firmware if any can be downloaded to the CPE, thereby enabling designation of the CPE as a trusted domain for handling content. Exemplary trusted domain apparatus and methods are described in co-owned U.S. patent application Ser. No. 11/006,404 previously incorporated herein by reference, although it will be recognized that other approaches may be used.

In one embodiment, an authorized service domain (ASD) approach is utilized for protecting content delivered to the CPE 106. The exemplary configuration of the ASD comprises a UPnP digital rights management technology that is used by the network operator to protect content using security credentials of a multi-stream cable card or secure microprocessor (e.g., trusted processor) disposed on the CPE 214. An exemplary ASD service (ASDService) defines a service that runs on the virtual content server 202 and is invoked by the CPE (or the manager 214). The ASDService process in defined for exchanging and authenticating security credentials to the CPE (and any connected devices within the CPE domain).

The exemplary ASDService described herein abides by the UPnP AV Architecture for browsing content, setting up connections, transporting content and finally controlling the flow of the content between devices, although this is by no means a requirement for practicing the invention. The ASDService is a precursor to the UPnP general playback process, and is executed before the remote device can browse as ASD content directory (e.g., maintained by the VCM architecture 200) or allow playing.

The exemplary ASD Service also allows an ASD capable rendering device (e.g., CPE or connected devices) to scan the remote or local domain networks for ASD capable "servers". Once identified, the CPE 106 can request authentication from the ASD capable servers to view the ASD content directory. The CPE 106 or its proxy selects content from the directory and submits its ASD credentials along with the content ID or other data identifying the content of interest in order to gain access from the server. The submission of the security package is required each time a CPE accesses content in order for the server to maintain counters to comply with "copy once" and "copy never" classified content.

FIG. 6 illustrates an alternative embodiment of the CPE 106 comprising a converged device (CD), such as that described in co-owned U.S. patent application Ser. No. 11/378,129 entitled "Methods and Apparatus for Centralized Content and Data Delivery" filed Mar. 16, 2006, issued as U.S. Pat. No. 8,347,341 on Jan. 1, 2013, and incorporated herein by reference in its entirety. The exemplary CD 602 comprises a remotely manageable premises device that, inter alia, acts as a centralized client networking platform providing gateway services such as network management as well as traditional content and high-speed data delivery functions. The device also acts as the shared Internet (e.g., Internet) connection for all devices in the premises via a cable modem or other such interface, sharing personal and DVR content such as video, music and photos (and any associated metadata) throughout the premises, and providing both a wired and wireless network in the home. Telephony services utilizing e.g., embedded multimedia terminal adapter (eMTA) and/or Wi-Fi architectures may also be provided via the device; these services can make use of the network operator's indigenous VoIP or comparable telephony capability if desired, thereby providing an even more unified service environment.

The converged premises device can also provide a trusted domain for content or data, as well as allowing a subscriber total mobility in the home or other premises by not limiting content or data to any one viewing/access location. For example, content or data may be accessed on any monitor in the premises, as well as on a PC or personal media device (PMD).

A wired home network utilizing existing coaxial cable in the premises is also created, using e.g., an Ethernet-to-coaxial bridge technology based on the MoCA specification. This allows existing devices and DVRs to connect and share content with the CD, and also allows the network operator (e.g., MSO) to control and manage the premises coaxial network.

The CD is also advantageously accessible via any remote device with internetworking (e.g., Internet) capability, thereby allowing personal content (or virtual content, with the CD acting as a proxy for the virtual content manager/server) to be accessed by the user (or other entities such as the virtual content manager 214) from outside the premises.

Business Methods and Considerations—

Various exemplary business-related aspects of the content purchase and delivery technology previously discussed herein are now described in further detail.

One salient benefit of the present invention is its ability to provide users (e.g., cable system subscribers) with the ability to virtually own and repeatedly receive data, applications and/or media content, as if they actually possessed a tangible medium. This capability also provides the basis for a highly useful business model; i.e., the provision of new content or data at least contemporaneous with that provided by other distribution channels (e.g., DVD rentals or retail sales), with ostensibly a reduced level of effort required by the user.

As previously discussed, cable system and other content network operators have heretofore been at somewhat of a competitive disadvantage due to the latency inherent in the provision of certain data or content (e.g., certain new release movie titles) as compared to these other channels. New release DVDs will typically be available in the rental or retail stores such as Blockbuster® or NetFlix® well in advance of the availability of the same title on a VOD, broadcast, or similar service.

Advantageously, the virtual ownership approach of the present invention removes this latency, and precludes the user from having to go to a specified retail or rental outlet to receive and view the content, since they can now merely purchase it "on line" (e.g., via MSO network, Internet, etc.) and have it delivered at their convenience and as many times as they like, as well as optionally deliver it or record it, such as in a remote trusted domain.

Similarly, the time and effort expended under prior art mail-based approaches (such as Netflix), not to mention the delay associated with receiving the desired content by mail, is obviated under the present invention, since the user is presented with an easily accessed interface (via their television, PC, PDA or the like) by which to order the desired media in one simple transaction, along with the capability to almost instantly view it whenever and as many times as they like.

From the MSO and content source perspective, the foregoing approach also obviates at least some of the physical distribution channels necessitated under the prior art, and also allows for a coupling between the viewing and purchase events, such that retail and rental sales are not diminished by also contemporaneously providing the content for purchase over the cable (or satellite) network. Under one rental/retail approach, the physical media (e.g., DVDs) are recorded, and then physically shipped to the various retail or rental locations, thereby incurring additional cost and delay. In contrast, the purchase and distribution scheme of the present invention effectively eliminates such cost and delay. The capability uses existing delivery infrastructure almost exclusively (with the exception of, e.g., the client portion of the DA which can be downloaded directly to the CPE). Hence, there is very little additional overhead for the service or content provider associated with providing the virtual content purchase capability of the invention.

Another salient benefit of one embodiment of the business model of the invention relates to the user/subscriber never having to return the physical medium to the provider, or store it at their premises. For example, under prior art approaches, a rented DVD must always be returned to the provider, whether by drop-off (Blockbuster®) or mail (Netflix®). In contrast, the exemplary methods of the present invention allow the user to retain ownership of the media content/data/application, thereby making it akin to a purchase.

Figure 7:
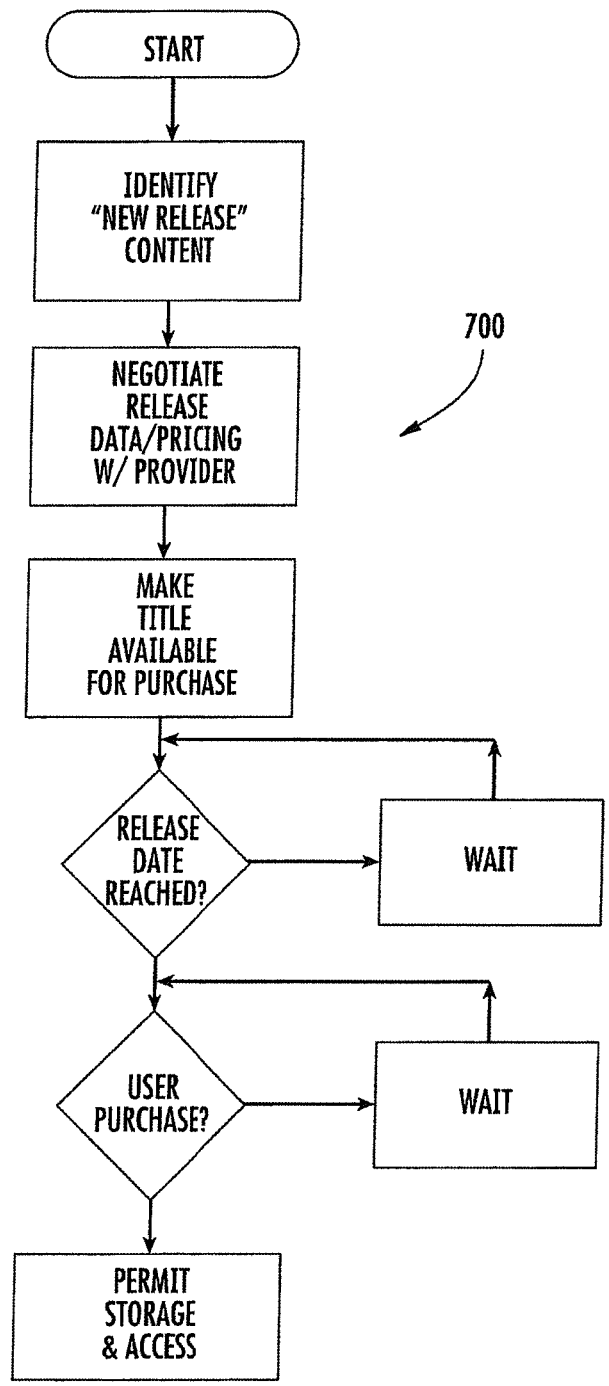
FIG. 7 is a logical flow diagram of one exemplary embodiment of the business methodology according to the present invention.

Furthermore, the session and "user-specific broadcast" based approaches of the exemplary embodiments described above advantageously allow for control of the streaming or broadcast of the content. In this fashion, the content provider for example can (in conjunction with the MSO) determine when the new content should be made available for purchase, and then permit users to access (see exemplary business method flow of FIG. 7, wherein both an availability or release date and the user's purchase of the content are used as gating criteria to permit the VOD session/BSA broadcast creation and subsequent content streaming to the user's CPE). A user can also be afforded the opportunity to plan out an extended period (e.g., a month's worth) of programming by purchasing new releases as they become available, and then viewing them at their leisure.

Third party content or data providers such as studios are also afforded yet another distribution channel for their content, thereby achieving further market penetration (especially for that segment which would otherwise buy and watch the content but for having to go through the machinations of either renting or buying it via extant prior art approaches). For example, one variant of the business model comprises providing the studio or other third party provider with a royalty or other compensation based on sale of each virtual copy of the selected content, while the MSO or service provider also obtains a portion of the profit for use of its distribution infrastructure and services. The prices afforded to the user or subscriber may be set above, below, or in parity with those via retail outlets for example.

The on-line purchase and distribution paradigm of the present invention also provides a benefit in terms of its synergy with new subscriptions/users; i.e., by providing subscribers with the ability to purchase and view content that would otherwise have to be procured via one or more additional distribution channels. Hence, not only is the existing subscriber base more completely and effectively served by providing this new capability, but many incipient or possible future subscribers are given an incentive to enter into a subscription, since such subscription obviates their need to go to the rental/retail outlets (and all of the associated effort), wait for their content selections to arrive by mail, or wait for the title to be later released via VOD or similar network channel. Furthermore, the restrictions placed on users of such other channels may be removed if desired, such as where the user can order any number of movies at any given time (instead of the "X-per-month" approach of Netfiix and similar prior art services).

Hence, the present invention also gives content providers access to an otherwise untapped pool of profits and sales, since there is currently a significant number of people who would not rent or purchase any given content unless the cost/effort threshold is reduced. Stated differently, by making purchase and ownership (including obviating storage space, having to purchase/maintain a DVD player, and having to manually insert the DVD into the player) nearly effortless and low enough in cost, more people will view movies or other content more often, thereby increasing the content provider's effective penetration into a given demographic.

Furthermore, as previously discussed, many portions of the HFC network advantageously are physically protected, and additional encryption and security measures are provided all the way to the CPE so as to prevent signal theft and access to sensitive customer data. This added physical and higher layer security provides content developers and providers with additional assurances that their valuable content will be protected, as compared to a completely entrusted network such as the Internet. It will be recognized, however, that with sufficient protection (including for example encryption and the use of trusted domains), even remote distribution over such internets or less inherently secure networks can be used; see, e.g., the remote delivery methods and apparatus described in U.S. patent application Ser. No. 11/440,490 filed May 24, 2006 and entitled "Personal Content Server Apparatus And Methods", incorporated herein by reference in its entirety.

Also, copying and distribution rules can be enforced via the CPE hardware and software; e.g., precluding copying of a given stream or broadcast, or marking content with digital rights notice or protective measures (such as digital watermarking, encryption key generation, authentication of the viewing device, etc.), as contrasted with Internet-based "ripping" of content via peer-to-peer or similar uncontrollable network models.

It will be appreciated that a "site license" approach can also be used for content (including applications) that are virtually owned by a subscriber or user. For example, one member of a family might purchase the content, and also pay an additional fee to allow unlimited use by that purchaser's family members or friends (who can be designated e.g., at time of purchase, or later). Alternatively, such a site license might comprise the ability to make unlimited use of the content within a given physical premises or network. Myriad different approaches to licensing will be recognized by those of ordinary skill provided the present disclosure.

In another aspect of the invention, arrangements with content producers (e.g., movie studios) may be used in conjunction with the apparatus and methods described herein to allow subscribers or users (whether those of the MSO network, or those of the content source) to "purchase" content via an Internet web portal, telephone service, WAP-enabled mobile device, etc., with the virtual content being provided by the MSO in a fashion similar to that described elsewhere herein. This cooperative arrangement between the MSO and content source ostensibly benefits both parties (and the consumer), since: (1) the MSO will have a wider range of content (and earlier release dates) available to its subscribers, thereby increasing viewer satisfaction; (ii) more MSO subscribers will spend more time on the MSO network; (iii) the content source is provided with an additional delivery channel for its "physical" media (and hence additional revenue opportunities); (iv) consumers will be provided with more channels by which they can obtain the content (instead of merely via the MSO network, users can purchase it via the web, mobile device, etc.); and (v) the cost of the content is reduced as compared to purchase of an actual tangible medium, since there is no packaging, shipping, inventory control, etc. associated with the "virtual" delivery mode.

It will also be appreciated that a common account can be maintained for the MSO subscriber by the MSO and the content source if desired. For example, Warner Bros. Studios might maintain an "online" user account for Subscriber A, which is also correlated or coupled to an MSO (e.g., Time Warner Cable) account for that subscriber (or vice versa), thereby allowing for unified tracking and billing. In this fashion, the MSO subscriber can log onto the Warner Bros. website, purchase content (e.g., in advance of the release date), and have it both available for viewing via the Time Warner Cable infrastructure on that release date, and billed to the subscriber's Time Warner Cable statement directly.

This approach need not be limited to related or affiliated companies such as Warner Bros. and Time Warner Cable (TWC); for example, Fox and Time Warner Cable might just as easily agree to form such a cooperative arrangement so that content purchases made via the Fox website (e.g., the entire first season of "24" on virtual DVD) are linked to the subscribers TWC account, and show up on their TWC monthly statement.

Conversely, all of the foregoing functions can be provided within one entity. For example, the TWC "Roadrunner" high speed Internet website or similar site associated with the MSO could be used as a content portal as well, under agreement from the relevant content source(s).

The ability to purchase the virtual content via the Internet according to the present invention also provides significant additional opportunities for "impulse" purchase by the user. Specifically, if given a modality by which they can rapidly purchase content from any location for later viewing at their premises (or even at that point in time via their mobile device), users might be more likely to purchase more content in any given period of time. For example, a number of co-workers discussing last night's episode of "24" might decide to purchase the DVD during their discussion, but the likelihood of that intent translating into an actual purchase diminishes unless they are presented with an easy way to make the purchase in a timely fashion. Stated simply, the easier it is to make the purchase, the more likely they will be to do so. Hence, where a user can use their mobile device (e.g., WAP-enabled mobile phone or PDA) to make the purchase via an Internet website, they might be much more likely to actually do so as compared to having to go home and make the purchase via their premises cable TV system, since they may forget, change their mind, be persuaded not to make the purchase by another family member, etc. Hence, the present embodiment of the invention provides significant "point of sale" type capability to the MSO and content source.

In another embodiment of the invention, a tiered or graded price structure is used, depending on the features provided to the user/owner. For example, one variant lets the user specify one or terms that can be applied to their ownership, which may be advantageous to them, the MSO, content source (e.g., studio), etc.

For example, one such ownership term comprises one or more specific periods or windows of ownership; the user is therefore limited to access to the content only during certain periods. This approach might be useful, for example, where the user only watches movies on weekends, and hence has no use for the content during weekdays. Similarly, the user may only watch content during the evening period, and hence the daytime ownership could be masked out. Or, the purchased content may only have a limited duration of applicability for the user; e.g., a children's movie that once the children are grown past a certain age, no further viewing would be made. Or the user may only wish to "own" the content for a given duration of time corresponding to an event in their life such as vacation period, etc. (e.g., an instructional title teaching the French language for an impending trip to Paris), after which no further viewing would likely occur.

By mapping these "windows" against the storage device used to store the content, the network operator (e.g., MSO) can vacate storage capacity dynamically; i.e., remove content from a server or switch knowing that there are no users who "own" that content during that period, and hence would request delivery thereof. If a user does request delivery (e.g., new purchase), the content can be rapidly de-archived and loaded for delivery to that user. This information can also be useful for dynamic or advanced bandwidth management purposes; e.g., forecasting network loading, or at least loading of particular assets (e.g., VOD servers) within the network.

In one respect, the foregoing approach of windows or periods of ownership is somewhat analogous to prior art techniques used by electric utilities to manage KW loading during peak demand periods (e.g., hot summer days) by pre-negotiating with customers to forego a portion of their capability, such as air conditioning.

Ownership windows can be non-contiguous, and can be coupled to events (e.g., viewing window "opens" on weekends, holidays, or even when topic or feature of content correlates to some event (e.g., the demand for the movie "War of the Worlds" would very likely spike if/when aliens from outer space visit Earth for the first time). For this last capability, metadata (e.g., XML metadata or the like) can be stored with the content to allow a search and correlation algorithm (described below; part of the exemplary head-end or hub site content storage and delivery manager) to perform analysis of the content loading to anticipate variations in demand. As a simple example, consider the increase in demand among virtual owners of the title "It's a Wonderful Life" during the Christmas Holiday and season; metadata for this title might include the word "Christmas", by which the aforementioned algorithm would flag this title as having a high likelihood of use during the Christmas season. It will be appreciated by those of ordinary skill that the grading or ranking of likelihood of use or other such metrics can be implemented according to a discrete system (e.g., 0 to 10 scale, with "10" being highest likelihood), a generalized information theory (Gil) variable system including e.g., (i) fuzzy logic, (ii) Dempster-Shafer theory; (iii) Bayesian theory; (iv) probability theory; and (v) possibility theory, (e.g., "high", "medium", or "low" likelihood; or "possible" or "impossible"), or yet other approach, based on the particular attributes of the application. As another example of anticipatory correlation and loading, metadata for each title stored by the MSO might include a list of the primary actors/actresses, which could then be correlated to current events involving them (e.g., upon his death, numerous stations broadcast "John Wayne film festivals"). Hence, upon such an event, the algorithm could search the metadata of each title for the presence of that individual, and preferentially load the database with titles starring that individual. Multiple layers of this process may also be utilized, such as where after the aforementioned titles starring that individual were located, this population is then evaluated for secondary and even tertiary criteria relating to the event; e.g., if Jimmy Stewart hypothetically had died during the Christmas season, the "It's a Wonderful Lift" title might be in especially high demand as compared to other non-Christmas/holiday Jimmy Stewart films, and hence would be ranked or rated quite highly over the others (starring Jimmy Stewart or otherwise).

In one variant of the invention, users/owners can also be provided ownership on a number-of-uses basis; e.g., the user purchases "credits" for say five (5) viewings that can be used at any time. This information may be statistically useful for the MSO, since while they do not know the precise timing of when a given user's "n" viewings will occur, they can apply statistical or historical (anecdotal) data to help manage content database loading and bandwidth allocation within the network. For example, it may be known that about ninety percent (90%) of all such exemplary "number-of-uses" purchasers use all "n" of their viewings within one year of their purchase date. Hence, the MSO can track such purchases as a function of time, and develop projections on the demand for certain titles as a function of time, which can then be used to manage the database contents.

Another consideration with the foregoing electronic/virtual delivery paradigm of the invention relates to the possibility of losing the purchased content due to, e.g., electronic failure, electromagnetic pulse or exposure to a strong magnetic field, loss of or damage to the device on which the content is stored, etc. Feasibly, and depending on the type of storage device used, the content which the user has purchased may be partially or completely lost through such occurrences. Possession of a physical copy (e.g., DVD), on the other hand, makes a user feel more secure that they will always have a "back up copy". Accordingly, while not providing a physical medium, the methods and apparatus of the present invention effectively provide back-up or archive functions for content that user's have purchased. In this fashion, a user who downloads the content onto their DSTB or PMD has no worries about losing the ephemeral rendering of the content (e.g., the download), since they can always obtain a replacement copy from the MSO or other such source, upon showing proof of prior purchase. This feature can be used as the basis of a business model or "premium feature" as well; i.e., guaranteed never to be lost or degraded.

Operational/Business Rules Engine—

In another aspect of the invention, the aforementioned selection, purchase, virtual storage and delivery functions are rendered as one or more computer programs running at, e.g., the content server 202, VOD server 105, Session Resource Manager (SRM) or BSA manager, and further include a so-called "business rules" engine. This engine comprises, in an exemplary embodiment, a series of software routines adapted to control the operation of the purchase, storage and delivery algorithms previously described. In effect, the business rules engine comprises a wrapper or controller entity which monitors the VCM operations (e.g., OD session or BSA switching requests received by the server 105 or manager 198) and dynamically (or manually) controls the operation of the server and, where required, the CPE 106, CD or other data recipient in order to implement a prescribed set of business rules. In the exemplary embodiment, this rules engine is integrated within the VCM architecture 200, such as within the VCM server portion 214, although this is by no means a requirement.

For example, one business rule may state that no VOD or other content streaming session may be instantiated until a payment authorization/confirmation is received. Another business rule may comprise the policy that data download bandwidth are weighted or skewed based on profitability or similar considerations, allocating available bandwidth preferentially to higher-profit delivery channels or subscribers, or even service level (e.g., HO versus SD).

As another exemplary business rule, delivery requests from those subscribers having a content "purchase" and storage subscription (as compared to a standard service subscription) are serviced first. Hence, all users submitting delivery requests are processed in real time, yet the purchase-subscribed users are given priority for delivery, and hence shorter perceived latency from request to commencement of streaming/broadcast.

Other types of business or operational rules can be applied as well. For example, it may be desirable to alter the availability window for delivery into certain time slots, such that traditional VOD, BSA or other network functions are not adversely impacted (e.g., the user's PVR commands are not slowed during prime time viewing due to too many virtual content deliveries being requested within a given service area). As previously discussed, the availability of the delivery can also be restricted so as to be contemporaneous with, or bear some other temporal relationship to, the release of the same content via other distribution channels.

Alternatively, business rules may be applied across other demographics and parameters such as geography and service group.

Literally any of the selection, purchase, or delivery constraints previously described herein can also be implemented via the rules engine, such as for example enforcing virtual "ownership" only during prescribed windows.

It will be recognized that while certain aspects of the invention are described in terms of a specific sequence of steps of a method, these descriptions are only illustrative of the broader methods of the invention, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the invention disclosed and claimed herein.

While the above detailed description has shown, described, and pointed out novel features of the invention as applied to various embodiments, it will be understood that various omissions, substitutions, and changes in the form and details of the device or process illustrated may be made by those skilled in the art without departing from the invention. The foregoing description is of the best mode presently contemplated of carrying out the invention. This description is in no way meant to be limiting, but rather should be taken as illustrative of the general principles of the invention. The scope of the invention should be determined with reference to the claims.

What is claimed is:

1. A computerized method of digitally rendered content management within a content delivery network having a plurality of users, the computerized method comprising:
    causing storage of encoded digital content at first storage location of a computerized storage entity;
    causing transmission of the encoded digital content to a computerized client device from a computerized network entity of the content delivery network, the computerized client device associated with one of the plurality of users;
    enabling at least the one of the plurality of users to, via use of an application computer program configured to execute on the computerized client device at least after decode of the encoded digital content, indicate one or more locations within the decoded digital content with marker data wherein at least one of an addition to, deletion from, or modification of the digital content is to be performed and generate a data structure comprising at least the marker data;
    receiving the data structure at a computerized network entity of the content delivery network, the data structure having been uploaded by the computerized client device;
    causing storage of the data structure at a second location of the computerized storage entity of the content delivery network, the second location comprising a separate storage location from the first storage location;
    causing application of the at least one of the addition, deletion or modification to the digital content, based at least on the data structure, to generate a version of the encoded digital content implementing the at least one of the addition, deletion or modification to the digital content, wherein the application of the at least one of the addition, deletion or modification to the digital content is not performed until data representative of a request to access the version of the encoded digital content is received; and
    causing delivery of the version of the encoded digital content to the computerized client device.

2. The computerized method of claim 1, further comprising enabling the one of the plurality of users to, via use of the application computer program on the computerized client device, cause insertion of user-selected digital content at the one or more locations via at least use of the marker data.

3. The computerized method of claim 2, wherein the causing insertion of the user-selected digital content at the one or more locations via at least the use of the marker data comprises causing a computerized network entity of the content delivery network to insert the user-selected content based at least on second data included in the data structure.

4. The computerized method of claim 3, wherein the second data contained in the data structure comprises at least one of (i) at least a portion of the user-selected digital content, or (ii) data identifying the user-selected digital content.

5. The computerized method of claim 1, further comprising
    causing storage of the version to a user-specific location of a multi-user partitioned cloud-based storage having a plurality of user-specific locations, each of the plurality of user-specific locations associated with one or more prescribed users, the each of the plurality of user-specific locations is accessible to only its respective one or more prescribed users, and not others of the plurality of users;
    wherein the causing delivery of the version of the encoded digital content to the computerized client device comprises causing delivery of the version by accessing the user-specific location.

6. The computerized method of claim 5, further comprising enabling the one of the plurality of users to add metadata to the version stored in the user-specific location, the metadata being associated with one or more classifications of the digital content as being associated with at least one or more genres.

7. Computerized network apparatus configured to provide digitally rendered content to a computerized client device within a content distribution network, the computerized network apparatus comprising:
    digital processor apparatus;
    network interface apparatus in data communication with the digital processor apparatus; and
    storage apparatus in data communication with the digital processor apparatus, the storage apparatus comprising at least one computer program configured to, when executed on the digital processor apparatus, cause the computerized network apparatus to:
        cause storage of encoded digital content at first storage location of a computerized storage entity;
        cause transmission of the encoded digital content to the computerized client device, the computerized client device associated with at least one user and comprising an application computer program configured to execute on the computerized client device at least after decode of at least a portion of the encoded digital content, the application computer program configured to enable the at least one user to indicate one or more locations within the decoded digital content with marker data wherein at least one of an addition to, deletion from, or modification of, the digital content is to be performed, and generate one or more data structures comprising at least the marker data;
        receive at least one of the one or more data structures, the one or more data structure having been uploaded by the computerized client device;
        cause storage of the received at least one data structure at a second location of the computerized storage entity of the content distribution network, the second location comprising a separate storage location from the first storage location;
        based at least on the received at least one data structure, cause application of the at least one of the addition, deletion or modification to the encoded digital content to generate a version of the encoded digital content implementing the at least one of the addition, deletion or modification, wherein the application of the at least one of the addition, deletion or modification to the encoded digital content is not performed until data representative of a request to access the version of the encoded digital content is received; and
        cause delivery of the version of the encoded digital content to the computerized client device.

8. The computerized network apparatus of claim 7, wherein the at least one computer program is further configured to, when executed on the digital processor apparatus, cause the computerized network apparatus to:
    enable selection of the encoded digital content by the computerized client device;

wherein the enablement of the selection of the encoded digital content by the computerized client device comprises:
an algorithmic comparison, by a computerized process of the content distribution network, of data relating to first digitally rendered content managed and data relating to second digitally rendered content from one or more content sources;
a modification, based on the algorithmic comparison, to one or more conditions relating to the first digitally rendered content; and
provision of respective options to the computerized client device to obtain use of the first digitally rendered content in accordance with the one or more modified conditions and the second digitally rendered content.

9. The computerized network apparatus of claim 7, wherein:
the at least one user is part of a subscriber group within the content distribution network, and members of the subscriber group are respectively associated with computerized client devices within a prescribed geographic boundary; and
the at least one computer program is further configured to, when executed on the digital processor apparatus, cause the computerized network apparatus to:
correlate a unique identifier associated with the computerized client device to the version of the encoded digital content to provide authorization for members of the subscriber group to access the version of the encoded digital content via the content distribution network.

10. The computerized network apparatus of claim 9, wherein the at least one computer program is further configured to, when executed on the digital processor apparatus, cause the computerized network apparatus to:
cause notification of at least one member of the subscriber group that the version of the encoded digital content is available for access by the at least one member, the causation of the notification comprising causation of delivery of an electronic message to a mobile wireless device of the at least one member via a cellular service provider network which serves the at least one member.

11. The computerized network apparatus of claim 7, wherein the at least one computer program is further configured to, when executed on the digital processor apparatus, cause the computerized network apparatus to:
associate the computerized client device with the subscriber, the association being determined based at least in part on authentication information, the authentication information configured to enable authentication of the subscriber to the content distribution network.

12. The computerized network apparatus of claim 11, wherein the authentication information comprises a cryptographic hash utilized to anonymously identify the subscriber and anonymously associate the subscriber to the encoded digital content to which the subscriber has obtained access.

13. The computerized network apparatus of claim 7, wherein the causation of the delivery of the version of the encoded digital content to the computerized client device comprises:
establishment of a session over at least one downstream transmission pathway from a server apparatus of the computerized network apparatus to the computerized client device; and
wherein the establishment of the session is restricted to at least one prescribed temporal coordinate.

14. The computerized network apparatus of claim 13, wherein the at least one prescribed temporal coordinate corresponds to at least one prescribed temporal coordinate associated with delivery of the version of the encoded digital content via another distribution channel.

15. Computer readable apparatus comprising a non-transitory storage medium, the non-transitory storage medium comprising at least one computer program having a plurality of instructions, the plurality of instructions configured to, when executed on a digital processing apparatus of a computerized network apparatus of a content distribution network, cause the computerized network apparatus to:
cause storage of encoded digital content at first storage location of a computerized storage entity;
cause transmission of the encoded digital content to the computerized client device, the computerized client device associated with at least one user, the computerized client device comprising an application computer program congfigured to execute on the computerized client device at least after decode of the encoded digital content and enable designation by a user of the computerized client device of one or more locations within the decoded digital content with marker data indicative of where at least one of an addition to, deletion from, or modification of the digital content is to be performed, the client device further configured to generate a data structure, the data structure comprising at least the marker data;
receive the data structure, the data structure having been uploaded by the computerized client device;
cause storage of the data structure at a second location of the computerized storage entity of the content distribution network, the second location comprising a separate storage location from the first storage location;
based at least on the data structure, apply the at least one of the addition, deletion or modification to the digital content to generate a version of the encoded digital content implementing the at least one of the addition, deletion or modification to the encoded digital content, wherein the application of the at least one of the addition, deletion or modification to the encoded digital content is not performed until data representative of a request to access the version of the encoded digital content is received; and
cause delivery of the version of the encoded digital content to the computerized client device.

16. The computer readable apparatus of claim 15, wherein the causation of the storage of the encoded digital content at the first storage location of the computerized storage entity comprising causation of storage of respective versions of the encoded digital content associated with individual ones of a plurality of users of the content distribution network at respective ones of user-specific locations of a multi-user partitioned cloud-based storage entity.

17. The computer readable apparatus of claim 15, wherein the at least one of the addition, deletion or modification to the digital content comprises one or more annotations added to one or more portions of the encoded digital content, the annotation being viewable on playback of the version of the encoded digital content.

18. The computer readable apparatus of claim 15, wherein:
the plurality of instructions are further configured to, when executed on the digital processing apparatus, cause the computerized network apparatus to:

receive data representative of a request for access to the version of the encoded digital content from the computerized client device; and establish a session over a first distribution channel from a computerized network- managed storage entity to the computerized client device based at least in part on the request for access to the version of the encoded digital content;

the access to the version of the encoded digital content comprises access to the version of the encoded digital content via the session;

the establishment of the session is based at least on at least one prescribed period of time; and the at least one prescribed period of time is related to delivery of at least the version of the encoded digital content via a second distribution channel different than the first distribution channel.

19. The computer readable apparatus of claim 15, wherein the delivery of the version of the encoded digital content comprises delivery of the version of the encoded digital content via one or more radio frequency (RF) carriers of the content distribution network that are not used for in-band content delivery.

20. The computer readable apparatus of claim 15, wherein the at least one of an addition to, deletion from, or modification of the digital content insertion of user-selected digital content at the one or more locations via at least use of the marker data.

* * * * *